(12) United States Patent
Das et al.

(10) Patent No.: US 12,135,420 B2
(45) Date of Patent: *Nov. 5, 2024

(54) SYSTEMS AND METHODS FOR OPERATING A HEAD-MOUNTED DISPLAY SYSTEM BASED ON USER IDENTITY

(71) Applicant: Magic Leap, Inc., Plantation, FL (US)

(72) Inventors: Shiuli Das, Milpitas, CA (US); Suraj Manjunath Shanbhag, San Jose, CA (US); Abhishek Narain, San Ramon, CA (US); Yan Xu, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,201

(22) Filed: Sep. 7, 2023

(65) Prior Publication Data

US 2023/0418054 A1 Dec. 28, 2023

Related U.S. Application Data

(63) Continuation of application No. 18/148,325, filed on Dec. 29, 2022, now Pat. No. 11,789,262, which is a
(Continued)

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0172* (2013.01); *G02B 27/0179* (2013.01);
(Continued)

(58) Field of Classification Search
CPC ............ G02B 27/0093; G02B 27/0172; G02B 27/0179; G02B 2027/0138;
(Continued)

(56) References Cited

U.S. PATENT DOCUMENTS 4,852,988 A    8/1989   Velez
6,433,760 B1   8/2002   Vaissie
(Continued)

FOREIGN PATENT DOCUMENTS

CA    2316473 A1    1/2001
CA    2362895 A1    12/2002
(Continued)

OTHER PUBLICATIONS

European Search Report mailed Dec. 2, 2022, for EP Application No. 20898665.3, nine pages.
(Continued)

*Primary Examiner* — Dmitriy Bolotin
(74) *Attorney, Agent, or Firm* — Morrison & Foerster LLP

(57) ABSTRACT

Systems and methods for depth plane selection in display system such as augmented reality display systems, including mixed reality display systems, are disclosed. A display(s) may present virtual image content via image light to an eye(s) of a user. The display(s) may output the image light to the eye(s) of the user, the image light to have different amounts of wavefront divergence corresponding to different depth planes at different distances away from the user. A camera(s) may capture images of the eye(s). An indication may be generated based on obtained images of the eye(s), indicating whether the user is identified. The display(s) may be controlled to output the image light to the eye(s) of the user, the image light to have the different amounts of wavefront divergence based at least in part on the generated indication indicating whether the user is identified.

20 Claims, 33 Drawing Sheets

Related U.S. Application Data continuation of application No. 17/581,593, filed on Jan. 21, 2022, now Pat. No. 11,592,665, which is a continuation of application No. 17/116,999, filed on Dec. 9, 2020, now Pat. No. 11,269,181.

(60) Provisional application No. 62/945,517, filed on Dec. 9, 2019.

(51) Int. Cl.
  *G06F 21/32* (2013.01)
  *G06V 40/18* (2022.01)

(52) U.S. Cl.
  CPC .............. *G06F 21/32* (2013.01); *G06V 40/18* (2022.01); *G02B 2027/0138* (2013.01); *G02B 2027/014* (2013.01); *G02B 2027/0178* (2013.01); *G02B 2027/0181* (2013.01)

(58) Field of Classification Search
  CPC ...... G02B 2027/014; G02B 2027/0178; G02B 2027/0181; G02B 2027/0185; G06F 21/32; G06F 21/34; G06V 40/18; G06V 20/20
  See application file for complete search history.

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,323,325 B2 | 4/2016 | Perez et al. | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,345,590 B2 | 7/2019 | Samec et al. | |
| 10,345,591 B2 | 7/2019 | Samec et al. | |
| 10,345,593 B2 | 7/2019 | Samec et al. | |
| 10,359,631 B2 | 7/2019 | Samec et al. | |
| 10,365,488 B2 | 7/2019 | Samec et al. | |
| 10,371,945 B2 | 8/2019 | Samec et al. | |
| 10,371,946 B2 | 8/2019 | Samec et al. | |
| 10,371,947 B2 | 8/2019 | Samec et al. | |
| 10,371,948 B2 | 8/2019 | Samec et al. | |
| 10,371,949 B2 | 8/2019 | Samec et al. | |
| 10,379,353 B2 | 8/2019 | Samec et al. | |
| 10,386,639 B2 | 8/2019 | Samec et al. | |
| 10,386,641 B2 | 8/2019 | Samec et al. | |
| 10,437,062 B2 | 10/2019 | Samec et al. | |
| 10,451,877 B2 | 10/2019 | Samec et al. | |
| 10,459,229 B2 | 10/2019 | Samec et al. | |
| 10,466,477 B2 | 11/2019 | Samec et al. | |
| 10,527,850 B2 | 1/2020 | Samec et al. | |
| 10,539,794 B2 | 1/2020 | Samec et al. | |
| 10,545,341 B2 | 1/2020 | Samec et al. | |
| 10,775,628 B2 | 9/2020 | Samec et al. | |
| 10,788,675 B2 | 9/2020 | Samec et al. | |
| 10,969,588 B2 | 4/2021 | Samec et al. | |
| 10,983,351 B2 | 4/2021 | Samec et al. | |
| 11,049,326 B2 | 6/2021 | Samec et al. | |
| 11,269,181 B2 * | 3/2022 | Das .................... | G02B 27/0179 |
| 11,592,665 B2 * | 2/2023 | Das .................... | G02B 27/0179 |
| 11,789,262 B2 * | 10/2023 | Das .................... | G02B 27/0179 345/206 |
| 2003/0030597 A1 | 2/2003 | Geist | |
| 2006/0023158 A1 | 2/2006 | Howell et al. | |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2013/0077147 A1 | 3/2013 | Efimov | |
| 2013/0169683 A1 | 7/2013 | Perez et al. | |
| 2014/0195918 A1 | 7/2014 | Friedlander | |
| 2015/0168731 A1 | 6/2015 | Robbins | |
| 2015/0206008 A1 | 7/2015 | Border | |
| 2016/0116740 A1 | 4/2016 | Takahashi | |
| 2017/0000324 A1 | 1/2017 | Samec et al. | |
| 2017/0000326 A1 | 1/2017 | Samec et al. | |
| 2017/0000329 A1 | 1/2017 | Samec et al. | |
| 2017/0000330 A1 | 1/2017 | Samec et al. | |
| 2017/0000331 A1 | 1/2017 | Samec et al. | |
| 2017/0000332 A1 | 1/2017 | Samec et al. | |
| 2017/0000334 A1 | 1/2017 | Samec et al. | |
| 2017/0000341 A1 | 1/2017 | Samec et al. | |
| 2017/0000343 A1 | 1/2017 | Samec et al. | |
| 2017/0000683 A1 | 1/2017 | Samec et al. | |
| 2017/0007111 A1 | 1/2017 | Samec et al. | |
| 2017/0007115 A1 | 1/2017 | Samec et al. | |
| 2017/0007116 A1 | 1/2017 | Samec et al. | |
| 2017/0276948 A1 | 9/2017 | Welch et al. | |
| 2017/0318019 A1 | 11/2017 | Gordon et al. | |
| 2017/0365101 A1 | 12/2017 | Samec et al. | |
| 2018/0025206 A1 | 1/2018 | Santos-villalobos et al. | |
| 2018/0268215 A1 | 9/2018 | Ovsiannikov et al. | |
| 2018/0284882 A1 | 10/2018 | Shipes et al. | |
| 2018/0356639 A1 | 12/2018 | Schaefer et al. | |
| 2019/0222830 A1 | 7/2019 | Edwin et al. | |
| 2019/0324276 A1 | 10/2019 | Edwin et al. | |
| 2019/0362063 A1 | 11/2019 | Wu | |
| 2019/0391399 A1 | 12/2019 | Samec et al. | |
| 2020/0041796 A1 | 2/2020 | Samec et al. | |
| 2020/0043236 A1 | 2/2020 | Miller et al. | |
| 2020/0081256 A1 | 3/2020 | Samec et al. | |
| 2020/0312038 A1 | 10/2020 | Samec et al. | |
| 2020/0319466 A1 | 10/2020 | Welch et al. | |

FOREIGN PATENT DOCUMENTS

| | | |
|---|---|---|
| CA | 2388766 A1 | 12/2003 |
| JP | 2014534655 A | 12/2014 |
| JP | 2017009777 A | 1/2017 |
| JP | 2019507902 A | 3/2019 |
| WO | 2013033195 A2 | 3/2013 |
| WO | 2017139667 A1 | 8/2017 |

OTHER PUBLICATIONS

International Preliminary Report on Patentability and Written Opinion mailed Jun. 23, 2022, for PCT Application No. PCT/US2020/064133, filed Dec. 9, 2020, fourteen pages.

International Search Report and Written Opinion mailed Feb. 25, 2021, for PCT Application No. PCT Application No. PCTUS2020064133, Filed Dec. 9, 2020, nineteen pages.

Jacob, R. "Eye Tracking in Advanced Interface Design", Virtual Environments and Advanced Interface Design, Oxford University Press, Inc. (Jun. 1995).

Non-Final Office Action mailed Apr. 27, 2023, for U.S. Appl. No. 18/148,325, filed Dec. 29, 2022, 17 pages.

Non-Final Office Action mailed Aug. 18, 2021, for U.S. Appl. No. 17/116,999, filed Dec. 9, 2020, 19 pages.

Non-Final Office Action mailed Sep. 16, 2022, for U.S. Appl. No. 17/581,593, filed Jan. 21, 2022, 9 pages.

Notice of Allowability mailed Dec. 21, 2021, for U.S. Appl. No. 17/116,999, filed Dec. 9, 2020, 6 pages.

Notice of Allowance mailed Aug. 17, 2023, for U.S. Appl. No. 18/148,325, filed Dec. 29, 2022, six pages.

Notice of Allowance mailed Jul. 28, 2021, for U.S. Appl. No. 17/116,999, filed Dec. 9, 2020, ten pages.

(56) References Cited

OTHER PUBLICATIONS

Notice of Allowance mailed Nov. 30, 2022, for U.S. Appl. No. 17/581,593, filed Jan. 21, 2022, five pages.
Rolland, J. et al., "High- resolution inset head- mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Japanese Office Action mailed Mar. 4, 2024, for JP Application No. 2022-534697, with English translation, 4 pages.
Japanese Office Action mailed Jul. 12, 2024, for JP Application No. 2022-534697, with English translation, 5 pages.

* cited by examiner

SYSTEMS AND METHODS FOR OPERATING A HEAD-MOUNTED DISPLAY SYSTEM BASED ON USER IDENTITY

CROSS-REFERENCE TO RELATED APPLICATIONS

This application is a continuation of U.S. patent application Ser. No. 18/148,325, filed Dec. 29, 2022, which is a continuation of U.S. patent application Ser. No. 17/581,593, filed Jan. 21, 2022, now U.S. Pat. No. 11,592,665, issued Feb. 28, 2023, which is a continuation of U.S. patent application Ser. No. 17/116,999, filed Dec. 9, 2020, now U.S. Pat. No. 11,269,181, issued Mar. 8, 2022, which claims priority under 35 U.S.C. § 119(e) from U.S. Provisional Patent Application No. 62/945,517, filed Dec. 9, 2019, entitled "SYSTEMS AND METHODS FOR OPERATING A HEAD-MOUNTED DISPLAY SYSTEM BASED ON USER IDENTITY," all of which are hereby incorporated by reference in their entirety.

INCORPORATION BY REFERENCE

This application incorporates by reference the entirety of each of the following patent applications and publications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 15/927,808 filed on Mar. 21, 2018; U.S. application Ser. No. 15/291,929 filed on Oct. 12, 2016, published on Apr. 20, 2017 as U.S. Publication No. 2017/0109580; U.S. application Ser. No. 15/408,197 filed on Jan. 17, 2017, published on Jul. 20, 2017 as U.S. Publication No. 2017/0206412; U.S. application Ser. No. 15/469,369 filed on Mar. 24, 2017, published on Sep. 28, 2017 as U.S. Publication No. 2017/0276948; U.S. Provisional Application No. 62/618,559 filed on Jan. 17, 2018; U.S. application Ser. No. 16/250,931 filed on Jan. 17, 2019; U.S. application Ser. No. 14/705,741 filed on May 6, 2015, published on Apr. 21, 2016 as U.S. Publication No. 2016/0110920; U.S. patent publication No. 2017/0293145, published Oct. 12, 2017; U.S. patent application Ser. No. 15/993,371 filed on May 30, 2018, published on Dec. 6, 2018, as U.S. Publication No. 2018/0348861; U.S. patent application Ser. No. 15/155,013 filed on May 14, 2016, published on Dec. 8, 2016 as U.S. Publication No. 2016/0358181; U.S. patent application Ser. No. 15/934,941 filed on Mar. 23, 2018, published on Sep. 27, 2018 as U.S. Publication No. 2018/0276467; U.S. Provisional Application No. 62/644,321 filed on Mar. 16, 2018; U.S. application Ser. No. 16/251,017 filed on Jan. 17, 2019; U.S. Provisional Application No. 62/702,866 filed on Jul. 24, 2018; International Patent Application No. PCT/US2019/043096 filed on Jul. 23, 2019; U.S. Provisional Application No. 62/714,649 filed on Aug. 3, 2018; U.S. Provisional Application No. 62/875,474 filed on Jul. 17, 2019; and U.S. application Ser. No. 16/530,904 filed on Aug. 2, 2019.

FIELD

The present disclosure relates to display systems, virtual reality, and augmented reality imaging and visualization systems and, more particularly, to depth plane selection based in part on a user's identity.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time.

The human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various examples of systems and methods for depth plane selection in display system such as augmented reality display systems, including mixed reality display systems, are disclosed.

A wearable system may include one or more displays, one or more cameras, and one or more processors. The one or more displays may be configured to present virtual image content via image light to one or both eyes of a user, wherein the one or more displays are configured for outputting the image light to one or both eyes of the user, the image light to have different amounts of wavefront divergence corresponding to different depth planes at different distances away from the user. The one or more cameras may be configured for capturing images of one or both eyes of the user. The one or more processors may be configured for: obtaining one or more images of one or both eyes of the user as captured by the one or more cameras; generating an indication based on the one or more obtained images of one or both eyes of the user, the generated indication indicating whether the user is identified; and controlling the one or more displays to output the image light to one or both eyes of the user, the image light to have the different amounts of wavefront divergence based at least in part on the generated indication indicating whether the user is identified.

In some system embodiments, generating the indication indicating whether the user is identified may include performing one or more iris scanning operations or one or more iris authentication operations.

In some system embodiments, the generated indication indicates that the user is identified as a registered user and, in response to the generated indication indicating that the user is identified as a registered user, the one or more processors may be configured for performing the controlling the one or more displays to output image light to one or both eyes of the user to include controlling the one or more displays to output the image light to one or both eyes of the user, the image light to have the different amounts of wavefront divergence based at least in part on settings associated with the registered user.

In some system embodiments, the generated indication indicates that the user is not identified as a registered user and, in response to the generating indication indicating that the user is not identified as a registered user, the one or more processors may be configured for performing the controlling the one or more displays to output the image light to one or both eyes of the user to include controlling the one or more displays to output the image light to one or both eyes of the user, the image light to have the different amounts of wavefront divergence based at least in part on a set of default settings.

In some system embodiments, the generated indication indicates that the user is not identified as a registered user and, in response to the generating indication indicating that the user is not identified as a registered user, the one or more processors may be configured for: performing a set of one or more operations to enroll the user in iris authentication or generate a calibration profile for the user; and determining settings for the user based at least in part on information obtained through performing the set of one or more operations. The controlling the one or more displays to output image light to one or both eyes of the user may include controlling the one or more displays to output the image light to one or both eyes of the user, the image light to have the different amounts of wavefront divergence based at least in part on the settings determined for the user.

In some system embodiments, the one or more processors may be configured for controlling the one or more displays to present a virtual target to the user. The obtaining one or more images of one or both eyes of the user as captured by the one or more cameras may include obtaining the one or more images of one or both eyes of the user as captured by the one or more cameras while the virtual target is being presented to the user.

In some system embodiments, the one or more processors may be configured for performing one or more operations to attempt to improve an accuracy or a reliability of user identification in the generating the indication indicating whether the user is identified.

A method may include presenting, by one or more displays, virtual image content via image light to one or both eyes of a user, wherein the one or more displays are configured for outputting the image light to one or both eyes of the user, the image light to have different amounts of wavefront divergence corresponding to different depth planes at different distances away from the user. The method may include capturing, by one or more cameras, images of one or both eyes of the user; and obtaining one or more images of one or both eyes of the user as captured by the one or more cameras. The method may include generating an indication based on the one or more obtained images of one or both eyes of the user, the generated indication indicating whether the user is identified; and controlling the one or more displays to output the image light to one or both eyes of the user, the image light to have the different amounts of wavefront divergence based at least in part on the generated indication indicating whether the user is identified.

In some method embodiments, generating the indication indicating whether the user is identified may include performing one or more iris scanning operations or one or more iris authentication operations.

In some method embodiments, the generated indication indicates that the user is identified as a registered user. The method may include, in response to the generated indication indicating that the user is identified as a registered user, performing the controlling the one or more displays to output image light to one or both eyes of the user to include controlling the one or more displays to output the image light to one or both eyes of the user, the image light to have the different amounts of wavefront divergence based at least in part on settings associated with the registered user.

In some method embodiments, the generated indication indicates that the user is not identified as a registered user. The method may include, in response to the generating indication indicating that the user is not identified as a registered user, performing the controlling the one or more displays to output the image light to one or both eyes of the user to include controlling the one or more displays to output the image light to one or both eyes of the user, the image light to have the different amounts of wavefront divergence based at least in part on a set of default settings.

In some method embodiments, wherein the generated indication indicates that the user is not identified as a registered user. The method may include, in response to the generating indication indicating that the user is not identified as a registered user, performing a set of one or more operations to enroll the user in iris authentication or generate a calibration profile for the user; and determining settings for the user based at least in part on information obtained through performing the set of one or more operations. The controlling the one or more displays to output image light to one or both eyes of the user may include controlling the one or more displays to output the image light to one or both eyes of the user, the image light to have the different amounts of wavefront divergence based at least in part on the settings determined for the user.

In some method embodiments, the method may include controlling the one or more displays to present a virtual target to the user. The obtaining one or more images of one or both eyes of the user as captured by the one or more cameras may include obtaining the one or more images of one or both eyes of the user as captured by the one or more cameras while the virtual target is being presented to the user.

In some method embodiments, the method may include performing one or more operations to attempt to improve an accuracy or a reliability of user identification in the generating the indication indicating whether the user is identified.

A non-transitory computer-readable medium may store instructions that, when executed by one or more processors of a wearable system, cause the wearable system to perform a method. The method may include presenting, by one or more displays of the wearable system, virtual image content via image light to one or both eyes of a user, wherein the one or more displays are configured for outputting the image light to one or both eyes of the user, the image light to have different amounts of wavefront divergence corresponding to different depth planes at different distances away from the user. The method may include capturing, by one or more cameras of the wearable system, images of one or both eyes of the user; and obtaining one or more images of one or both eyes of the user as captured by the one or more cameras. The method may include generating an indication based on the one or more obtained images of one or both eyes of the user, the generated indication indicating whether the user is identified; and controlling the one or more displays to output the image light to one or both eyes of the user, the image light to have the different amounts of wavefront divergence based at least in part on the generated indication indicating whether the user is identified.

In some non-transitory computer-readable medium embodiments, generating the indication indicating whether the user is identified may include performing one or more iris scanning operations or one or more iris authentication operations.

In some non-transitory computer-readable medium embodiments, the generated indication indicates that the user is identified as a registered user. The method may include, in response to the generated indication indicating that the user is identified as a registered user, performing the controlling the one or more displays to output image light to one or both eyes of the user to include controlling the one or more displays to output the image light to one or both eyes of the user, the image light to have the different amounts of wavefront divergence based at least in part on settings associated with the registered user.

In some non-transitory computer-readable medium embodiments, the generated indication indicates that the user is not identified as a registered user. The method may include, in response to the generating indication indicating that the user is not identified as a registered user, performing the controlling the one or more displays to output the image light to one or both eyes of the user to include controlling the one or more displays to output the image light to one or both eyes of the user, the image light to have the different amounts of wavefront divergence based at least in part on a set of default settings.

In some non-transitory computer-readable medium embodiments, the generated indication indicates that the user is not identified as a registered user. The method may include, in response to the generating indication indicating that the user is not identified as a registered user, performing a set of one or more operations to enroll the user in iris authentication or generate a calibration profile for the user; and determining settings for the user based at least in part on information obtained through performing the set of one or more operations. The controlling the one or more displays to output image light to one or both eyes of the user may include controlling the one or more displays to output the image light to one or both eyes of the user, the image light to have the different amounts of wavefront divergence based at least in part on the settings determined for the user.

In some non-transitory computer-readable medium embodiments, the method may include controlling the one or more displays to present a virtual target to the user. The obtaining one or more images of one or both eyes of the user as captured by the one or more cameras may include obtaining the one or more images of one or both eyes of the user as captured by the one or more cameras while the virtual target is being presented to the user.

Figure 1:
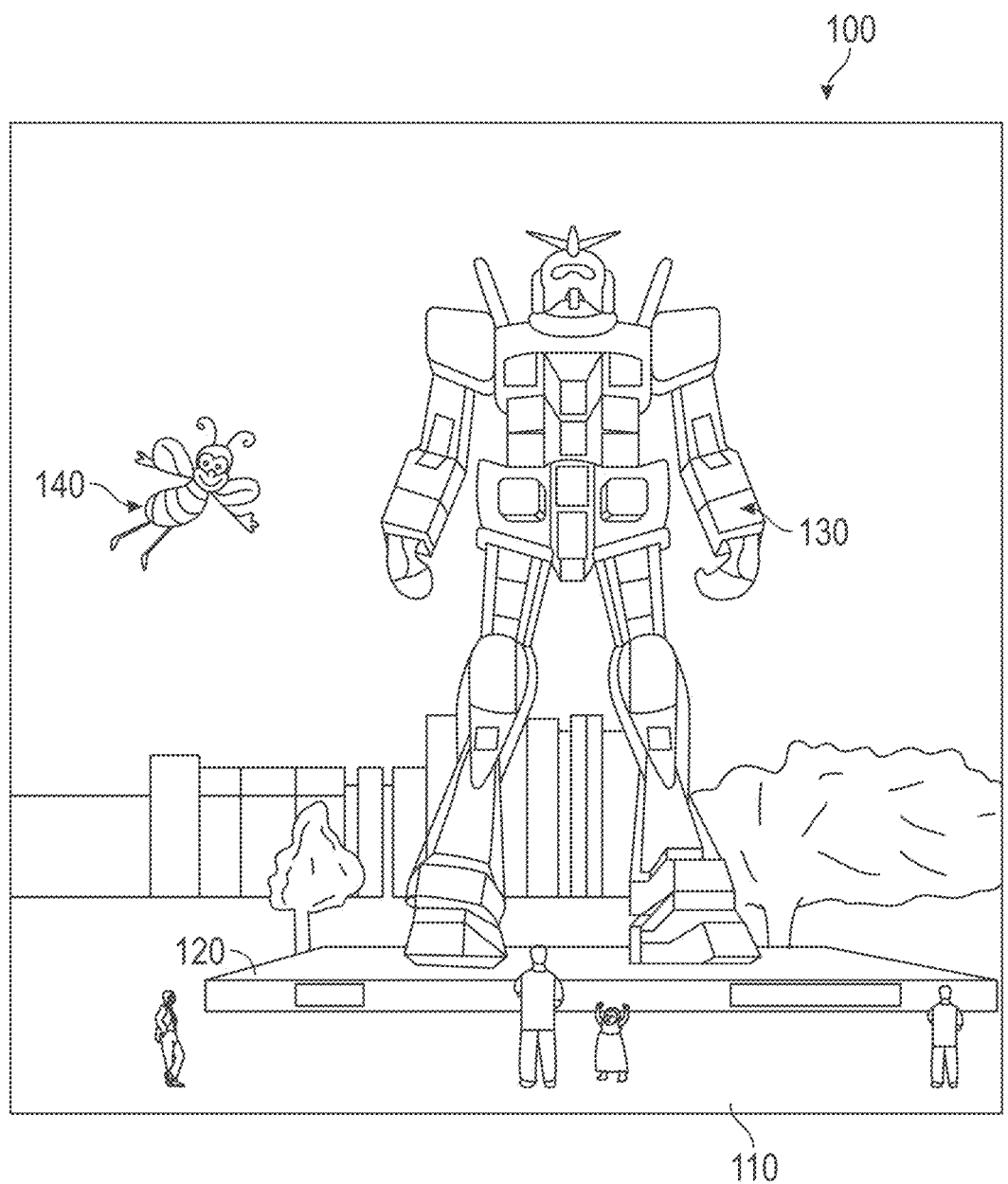
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described herein, display systems (e.g., augmented reality or virtual reality display systems) may render virtual content for presentation to a user at different perceived depths from the user. In augmented reality display systems, different depth planes may be utilized to project virtual content with each depth plane being associated with a particular perceived depth from the user. For example, a stack of waveguides configured to output light with different wavefront divergences may be utilized, with each depth plane having a corresponding wavefront divergence and being associated with at least one waveguide. As virtual content moves about the user's field of view, the virtual content may be adjusted along three discrete axes. For example, the virtual content may be adjusted along the X, Y, and Z axes such that the virtual content may be presented at different perceived depths from the user. The display system may switch between depth planes as the virtual content is perceived to be moved further from, or closer to, the user. It will be appreciated that switching depth planes may involve changing the wavefront divergence of light forming the virtual content in a discrete step. In a waveguide-based system, in some embodiments, such a depth plane switch may involve switching the waveguide outputting light to form the virtual content.

In some embodiments, the display system may be configured to monitor the gaze of a user's eyes and determine a three-dimensional fixation point at which the user is fixating. The fixation point may be determined based upon, among other things, the distance between the user's eyes and the gaze direction of each eye. It will be appreciated that these variables may be understood to form a triangle with the fixation point at one corner of the triangle and the eyes at the other corners. It will also be appreciated that a calibration may be performed to accurately track the orientations of the user's eyes and determine or estimate the gaze of those eyes to determine the fixation point. Thus, after undergoing a full calibration, the display device may have a calibration file or calibration information for the main user of that device. The main user may also be referred to as a calibrated user herein. Further details regarding calibration and eye tracking may be found in, e.g., U.S. patent application Ser. No. 15/993, 371, entitled "EYE TRACKING CALIBRATION TECHNIQUES," which is incorporated herein by reference in its entirety.

The display system may occasionally be used by guest users that have not completed the full calibration. In addition, these guest users may not have the time or the desire to perform a full calibration. However, if the display system does not actually track the fixation point of the guest user, then the depth plane switching may not be appropriate for providing a realistic and comfortable viewing experience for the user.

Thus, it will be appreciated that the current user of the display system may be categorized as a calibrated user or as a guest user. In some embodiments, the display system may be configured to categorize the current user by determining whether or not the current user is a calibrated user by performing an identification, or authentication, process, e.g., to determine whether information provided by and/or obtained from the current user matches information associated with the calibrated user. For example, the authentication or identification process may be one or more of: asking for and verifying a username and/or password, conducting iris scanning (e.g., by comparing a current image of the user's iris with a reference image), conducting voice recognition (e.g., by comparing a current sample of the user's voice with a reference voice file), and IPD matching. In some embodiments, IPD matching may include determining whether the current user's IPD matches the calibrated user's IPD. If there is a match, the current user may be assumed to be the calibrated user in some embodiments. If there is no match, the current user may be assumed to not be the calibrated user (e.g., to be a guest user) in some embodiments. In some other embodiments, multiple authentication processes may be conducted for a current user to increase the accuracy of the determination of whether the current user is a calibrated user.

In some embodiments, if the current user is determined to not be a calibrated user (e.g., a guest user), the display system may use content-based depth plane switching; for example, rather than determining the fixation point of the user's eyes and switch depth planes based on the depth plane in which the fixation point is location, the display system may be configured to display content with the appropriate amount of wavefront divergence for where, in 3D space, that content (e.g., a virtual object) is specified to be placed. It will be appreciated that virtual objects may have associated locations or coordinates in the three-dimensional volume around the user, and the display system may be configured to present the object using light with the amount of wavefront divergence appropriate for the object's depth, relative to the user, within that three-dimensional volume.

In cases where multiple virtual objects at different depths are to be displayed, content-based depth plane switching may involve making a rough determination as to which virtual object is being fixated on and then using the location of that virtual object to establish the plane to which depth plane switching should switch; for example, upon determining that the user is roughly fixating on a particular virtual object, the display system may be configured to output light with wavefront divergence corresponding to the depth plane associated with that virtual object. In some embodiments, this rough determination of whether the user is fixating on an object may involve determining whether the fixation point is within a display system-defined volume unique to the object and, if yes, switching to the depth plane associated with that object, irrespective of the depth of the determined fixation point (so that, if the volume extends across multiple depth planes, the display system will switch to the depth plane associated with the object).

In some embodiments, if the current user is determined to not be a calibrated user (e.g., a guest user) the display system may perform a rough calibration by measuring the guest user's interpupillary distance (IPD). This rough calibration may also be referred to as a dynamic calibration. Preferably, the IPD is measured while the user's eyes are directed to, or focused on an object at, optical infinity. In some embodiments, this IPD value may be understood to be the maximum IPD value. The maximum IPD value may be used or a lesser value selected within a distribution of sampled values (e.g., the value at the $95^{th}$ percentile of sampled IPD values) may be utilized as a reference value for determining the fixation point. For example, this IPD value may constitute one side (e.g., the base) of the imaginary triangle of which the fixation point forms a corner (e.g., the apex).

Thus, in some embodiments, the display system may be configured to monitor for whether the user is a main or guest user. If the user is a main user, then the calibration file may be accessed. If the user is a guest user, then content-based depth plane switching may be utilized, and/or a rough calibration involving determining IPD may be performed to establish a reference IPD value. The display system may be configured to use this reference IPD value to determine or estimate the guest user's fixation point and, thus, make decisions regarding when to switch depth planes (e.g. when to switch the wavefront divergence of light used to form virtual content).

In some embodiments, the display system may transition from performing content-based depth plane switching to performing depth plane switching based on a dynamic calibration of the current user. For example, such a transition may occur in situations where data obtained in connection with the content-based depth plane switching scheme is deemed to be unreliable (e.g., where values for the virtual object that the user is roughly fixating on have high levels of uncertainty or variability), or where content is provided at a range of different depths spanning multiple depth planes (e.g., wherein the virtual content spans greater than a threshold number of depth planes).

Reference will now be made to the drawings, in which like reference numerals refer to like parts throughout. Unless indicated otherwise, the drawings are schematic not and necessarily drawn to scale.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
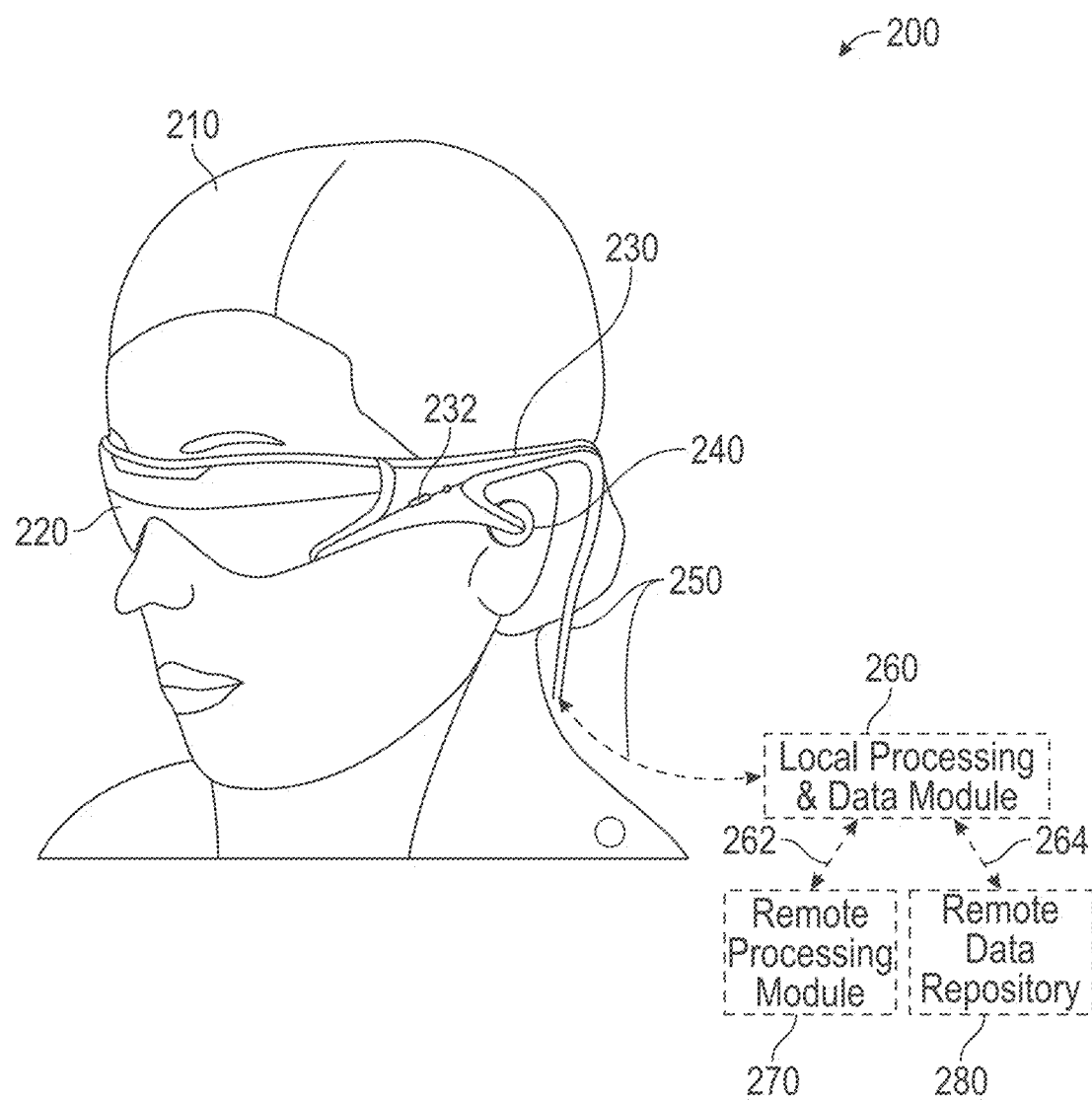
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of A Wearable System

Figure 3:
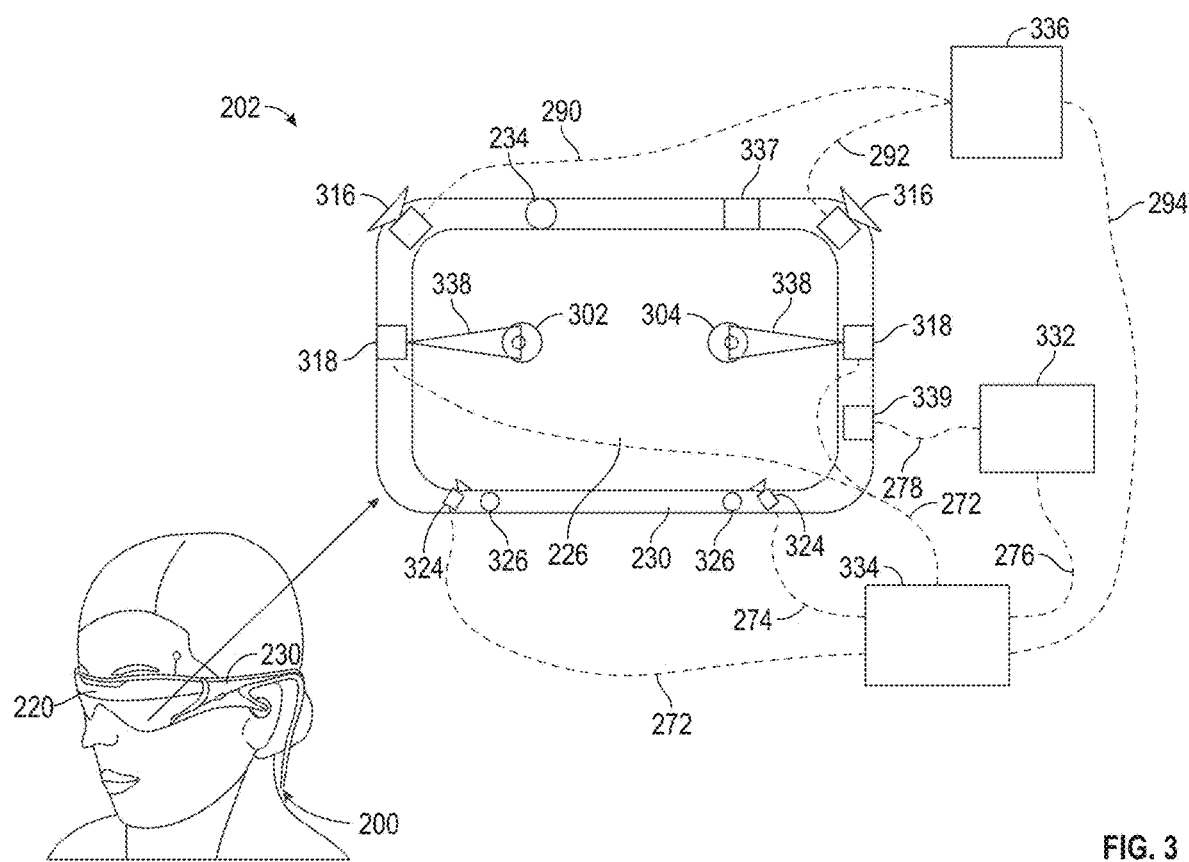
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light sources 326 (such as light emitting diodes "LED"s), which are configured to be able to track the eyes 302, 304 of the user to support rendering and user input. The cameras 324 may be part of the inward-facing imaging system 462 shown in FIG. 4. The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
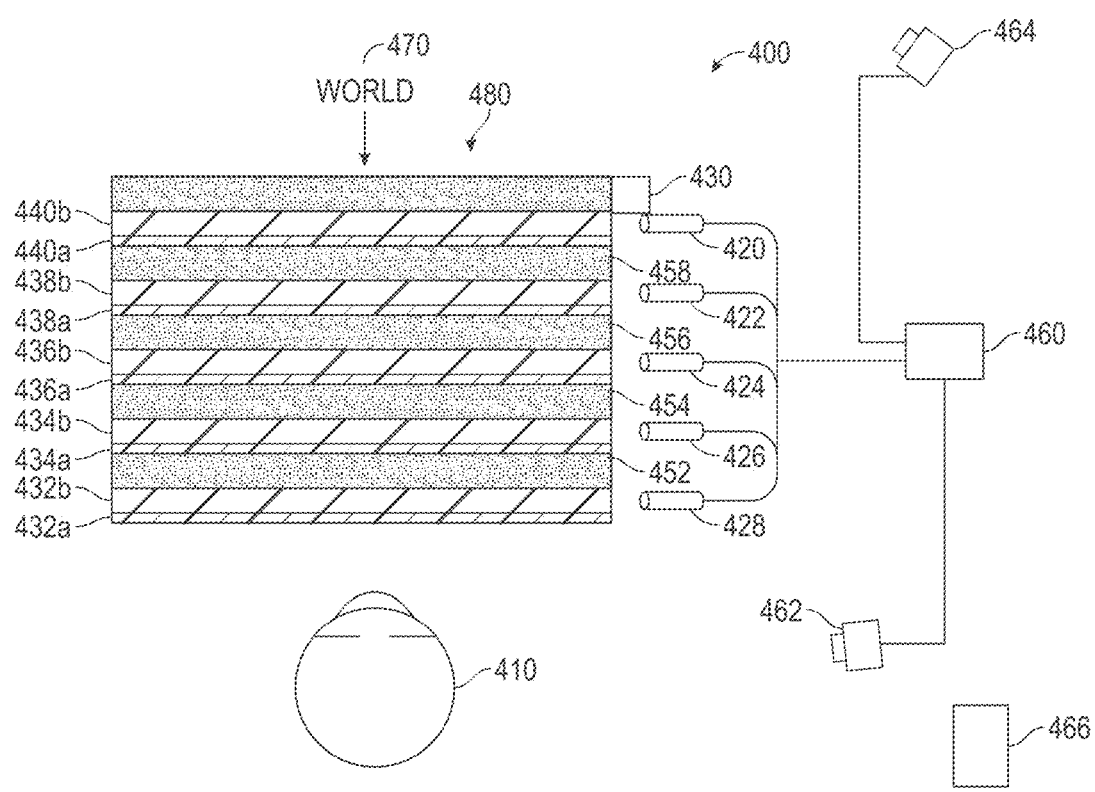
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 440b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In some embodiments, the lens may be variable focus elements (VFEs). For example, in some embodiments, the waveguide assembly 480 may simply include two variable focus elements and one or more waveguides in between those two variable focus elements. Examples of waveguide assemblies with VFEs are disclosed in US patent publication No. 2017/0293145, published Oct. 12, 2017, the entire disclosure of which is incorporated herein by reference. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. (Compensating lens layer 430 and the stacked waveguide assembly 480 as a whole may be configured such that light coming from the world 470 is conveyed to the eye 410 at substantially the same level of divergence (or collimation) as the light had when it was initially received by the stacked waveguide assembly 480.) Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example of an Eye Image

Figure 5:
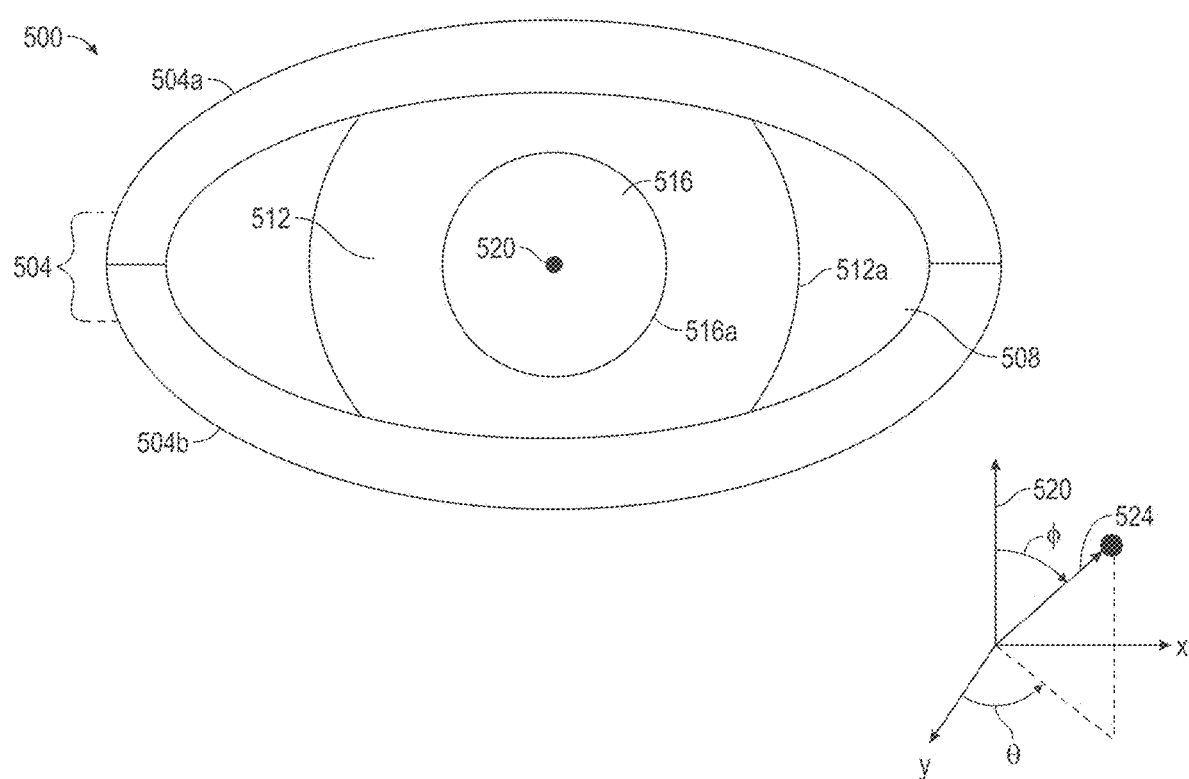
FIG. 5 schematically illustrates an example of an eye, as well as an example coordinate system for determining an eye pose of an eye.

FIG. 5 illustrates an image of an eye 500 with eyelids 504, sclera 508 (the "white" of the eye), iris 512, and pupil 516. Curve 516a shows the pupillary boundary between the pupil 516 and the iris 512, and curve 512a shows the limbic boundary between the iris 512 and the sclera 508. The eyelids 504 include an upper eyelid 504a and a lower eyelid 504b. The eye 500 is illustrated in a natural resting pose (e.g., in which the user's face and gaze are both oriented as they would be toward a distant object directly ahead of the user). The natural resting pose of the eye 500 can be indicated by a natural resting direction 520, which is a direction orthogonal to the surface of the eye 500 when in the natural resting pose (e.g., directly out of the plane for the eye 500 shown in FIG. 5) and in this example, centered within the pupil 516.

As the eye 500 moves to look toward different objects, the eye pose will change relative to the natural resting direction 520. The current eye pose can be determined with reference to an eye pose direction 524, which is a direction orthogonal to the surface of the eye (and centered in within the pupil 516) but oriented toward the object at which the eye is currently directed. With reference to an example coordinate system shown in FIG. 5A, the pose of the eye 500 can be expressed as two angular parameters indicating an azimuthal deflection and a zenithal deflection of the eye pose direction 524 of the eye, both relative to the natural resting direction 520 of the eye. For purposes of illustration, these angular parameters can be represented as $\theta$ (azimuthal deflection, determined from a fiducial azimuth) and $\phi$ (zenithal deflection, sometimes also referred to as a polar deflection). In some implementations, angular roll of the eye around the eye pose direction 524 can be included in the determination of eye pose, and angular roll can be included in the following analysis. In other implementations, other techniques for determining the eye pose can be used, for example, a pitch, yaw, and optionally roll system.

An eye image can be obtained from a video using any appropriate process, for example, using a video processing algorithm that can extract an image from one or more sequential frames. The pose of the eye can be determined from the eye image using a variety of eye-tracking techniques. For example, an eye pose can be determined by considering the lensing effects of the cornea on light sources that are provided. Any suitable eye tracking technique can be used for determining eye pose in the eyelid shape estimation techniques described herein.

Example of an Eye Tracking System

Figure 6:
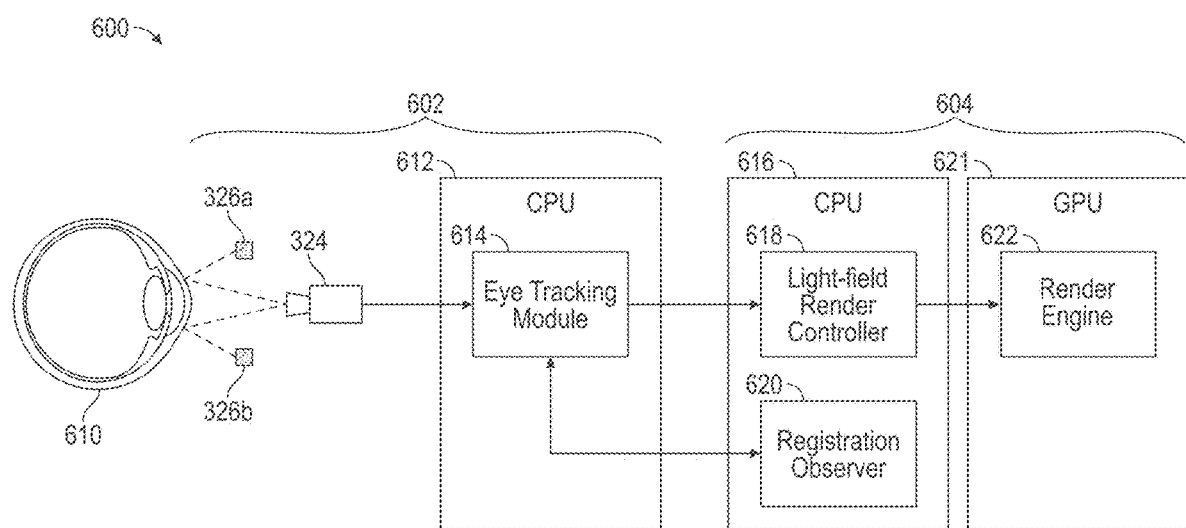
FIG. 6 is a schematic diagram of a wearable system that includes an eye tracking system.

FIG. 6 illustrates a schematic diagram of a wearable system 600 that includes an eye tracking system. The wearable system 600 may, in at least some embodiments, include components located in a head-mounted unit 602 and components located in a non-head-mounted unit 604. Non-head mounted unit 604 may be, as examples, a belt-mounted component, a hand-held component, a component in a backpack, a remote component, etc. Incorporating some of the components of the wearable system 600 in non-head-mounted unit 604 may help to reduce the size, weight, complexity, and cost of the head-mounted unit 602. In some implementations, some or all of the functionality described as being performed by one or more components of head-mounted unit 602 and/or non-head mounted 604 may be provided by way of one or more components included elsewhere in the wearable system 600. For example, some or all of the functionality described below in association with a CPU 612 of head-mounted unit 602 may be provided by way of a CPU 616 of non-head mounted unit 604, and vice versa. In some examples, some or all of such functionality may be provided by way of peripheral devices of wearable system 600. Furthermore, in some implementations, some or all of such functionality may be provided by way of one or more cloud computing devices or other remotely-located computing devices in a manner similar to that which has been described above with reference to FIG. 2.

As shown in FIG. 6, wearable system 600 can include an eye tracking system including a camera 324 that captures images of a user's eye 610. If desired, the eye tracking system may also include light sources 326a and 326b (such as light emitting diodes "LED"s). The light sources 326a and 326b may generate glints (i.e., reflections off of the user's eyes that appear in images of the eye captured by camera 324). The positions of the light sources 326a and 326b relative to the camera 324 may be known and, as a consequence, the positions of the glints within images captured by camera 324 may be used in tracking the user's eyes (as will be discussed in more detail below in connection with FIGS. 7-11). In at least one embodiment, there may be one light source 326 and one camera 324 associated with a single one of the user's eyes 610. In another embodiment, there may be one light source 326 and one camera 324 associated with each of a user's eyes. 610. In yet other embodiments, there may be one or more cameras 324 and one or more light sources 326 associated with one or each of a user's eyes 610. As a specific example, there may be two light sources 326a and 326b and one or more cameras 324 associated with each of a user's eyes 610. As another example, there may be three or more light sources such as light sources 326a and 326b and one or more cameras 324 associated with each of a user's eyes 610.

Eye tracking module 614 may receive images from eye tracking camera(s) 324 and may analyze the images to extract various pieces of information. As examples, the eye tracking module 614 may detect the user's eye poses, a three-dimensional position of the user's eye relative to the eye tracking camera 324 (and to the head-mounted unit 602), the direction one or both of the user's eyes 610 are focused on, the user's vergence depth (i.e., the depth from the user at which the user is focusing on), the positions of the user's pupils, the positions of the user's cornea and cornea sphere, the center of rotation of each of the user's eyes, and the center of perspective of each of the user's eyes. The eye tracking module 614 may extract such information using techniques described below in connection with FIGS. 7-11. As shown in FIG. 6, eye tracking module 614 may be a software module implemented using a CPU 612 in a head-mounted unit 602. Further details discussing the creation, adjustment, and use of eye tracking module components are provided in U.S. patent application Ser. No. 15/993,371, entitled "EYE TRACKING CALIBRATION TECHNIQUES," which is incorporated herein by reference in its entirety.

Data from eye tracking module 614 may be provided to other components in the wearable system. As example, such data may be transmitted to components in a non-head-mounted unit 604 such as CPU 616 including software modules for a light-field render controller 618 and a registration observer 620.

Render controller 618 may use information from eye tracking module 614 to adjust images displayed to the user by render engine 622 (e.g., a render engine that may be a software module in GPU 620 and that may provide images to display 220). As an example, the render controller 618 may adjust images displayed to the user based on the user's center of rotation or center of perspective. In particular, the render controller 618 may use information on the user's center of perspective to simulate a render camera (i.e., to simulate collecting images from the user's perspective) and may adjust images displayed to the user based on the simulated render camera.

A "render camera," which is sometimes also referred to as a "pinhole perspective camera" (or simply "perspective camera") or "virtual pinhole camera" (or simply "virtual camera"), is a simulated camera for use in rendering virtual image content possibly from a database of objects in a virtual world. The objects may have locations and orientations relative to the user or wearer and possibly relative to real objects in the environment surrounding the user or wearer. In other words, the render camera may represent a perspective within render space from which the user or wearer is to view 3D virtual contents of the render space (e.g., virtual objects). The render camera may be managed by a render engine to render virtual images based on the database of virtual objects to be presented to the eye. The virtual images may be rendered as if taken from the perspective the user or wearer. For example, the virtual images may be rendered as if captured by a pinhole camera (corresponding to the "render camera") having a specific set of intrinsic parameters (e.g., focal length, camera pixel size, principal point coordinates, skew/distortion parameters, etc.), and a specific set of extrinsic parameters (e.g., translational components and rotational components relative to the virtual world). The virtual images are taken from the perspective of such a camera having a position and orientation of the render camera (e.g., extrinsic parameters of the render camera). It follows that the system may define and/or adjust intrinsic and extrinsic render camera parameters. For example, the system may define a particular set of extrinsic render camera parameters such that virtual images may be rendered as if captured from the perspective of a camera having a specific location with respect to the user's or wearer's eye so as to provide images that appear to be from the perspective of the user or wearer. The system may later dynamically adjust extrinsic render camera parameters on-the-fly so as to maintain registration with the specific location. Similarly, intrinsic render camera parameters may be defined and dynamically adjusted over time. In some implementations, the images are rendered as if captured from the perspective of a camera having an aperture (e.g., pinhole) at a specific location with respect to the user's or wearer's eye (such as the center of perspective or center of rotation, or elsewhere).

In some embodiments, the system may create or dynamically reposition and/or reorient one render camera for the user's left eye, and another render camera for the user's right eye, as the user's eyes are physically separated from one another and thus consistently positioned at different locations. It follows that, in at least some implementations, virtual content rendered from the perspective of a render camera associated with the viewer's left eye may be presented to the user through an eyepiece on the left side of a head-mounted display (e.g., head-mounted unit 602), and that virtual content rendered from the perspective of a render camera associated with the user's right eye may be presented to the user through an eyepiece on the right side of such a head-mounted display. Further details discussing the creation, adjustment, and use of render cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

In some examples, one or more modules (or components) of the system 600 (e.g., light-field render controller 618, render engine 620, etc.) may determine the position and orientation of the render camera within render space based on the position and orientation of the user's head and eyes (e.g., as determined based on head pose and eye tracking data, respectively). For example, the system 600 may effectively map the position and orientation of the user's head and eyes to particular locations and angular positions within a 3D virtual environment, place and orient render cameras at the particular locations and angular positions within the 3D virtual environment, and render virtual content for the user as it would be captured by the render camera. Further details discussing real world to virtual world mapping processes are provided in U.S. patent application Ser. No. 15/296,869, entitled "SELECTING VIRTUAL OBJECTS IN A THREE-DIMENSIONAL SPACE," which is expressly incorporated herein by reference in its entirety for all purposes. As an example, the render controller 618 may adjust the depths at which images are displayed by selecting which depth plane (or depth planes) are utilized at any given time to display the images. In some implementations, such a depth plane switch may be carried out through an adjustment of one or more intrinsic render camera parameters.

Registration observer 620 may use information from eye tracking module 614 to identify whether the head-mounted unit 602 is properly positioned on a user's head. As an example, the eye tracking module 614 may provide eye location information, such as the positions of the centers of rotation of the user's eyes, indicative of the three-dimensional position of the user's eyes relative to camera 324 and head-mounted unit 602 and the eye tracking module 614 may use the location information to determine if display 220 is properly aligned in the user's field of view, or if the head-mounted unit 602 (or headset) has slipped or is otherwise misaligned with the user's eyes. As examples, the registration observer 620 may be able to determine if the head-mounted unit 602 has slipped down the user's nose bridge, thus moving display 220 away and down from the user's eyes (which may be undesirable), if the head-mounted unit 602 has been moved up the user's nose bridge, thus moving display 220 closer and up from the user's eyes, if the head-mounted unit 602 has been shifted left or right relative the user's nose bridge, if the head-mounted unit 602 has been lifted above the user's nose bridge, or if the head-mounted unit 602 has been moved in these or other ways away from a desired position or range of positions. In general, registration observer 620 may be able to determine if head-mounted unit 602, in general, and displays 220, in particular, are properly positioned in front of the user's eyes. In other words, the registration observer 620 may determine if a left display in display system 220 is appropriately aligned with the user's left eye and a right display in display system 220 is appropriately aligned with the user's right eye. The registration observer 620 may determine if the head-mounted unit 602 is properly positioned by determining if the head-mounted unit 602 is positioned and oriented within a desired range of positions and/or orientations relative to the user's eyes.

In at least some embodiments, registration observer 620 may generate user feedback in the form of alerts, messages, or other content. Such feedback may be provided to the user to inform the user of any misalignment of the head-mounted unit 602, along with optional feedback on how to correct the misalignment (such as a suggestion to adjust the head-mounted unit 602 in a particular manner).

Example registration observation and feedback techniques, which may be utilized by registration observer 620, are described in U.S. patent application Ser. No. 15/717,747, filed Sep. 27, 2017, which is incorporated by reference herein in its entirety.

Example of an Eye Tracking Module

Figure 7A:
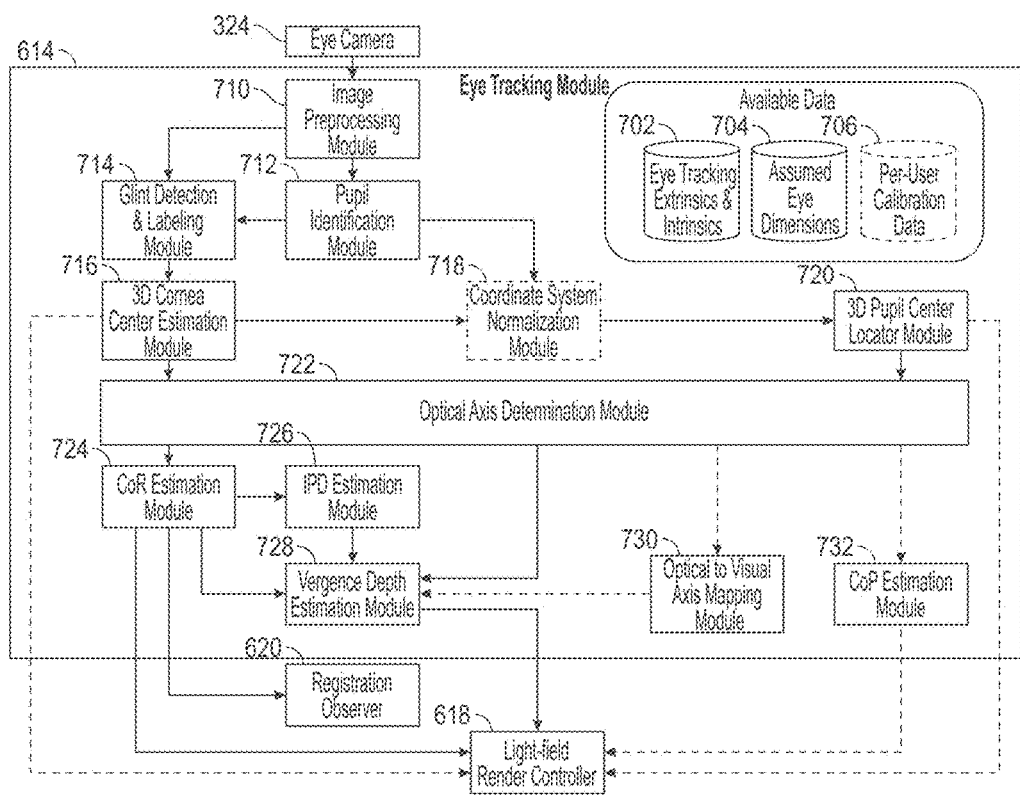
FIG. 7A is a block diagram of a wearable system that may include an eye tracking system.

A detailed block diagram of an example eye tracking module 614 is shown in FIG. 7A. As shown in FIG. 7A, eye tracking module 614 may include a variety of different submodules, may provide a variety of different outputs, and may utilize a variety of available data in tracking the user's eyes. As examples, eye tracking module 614 may utilize available data including eye tracking extrinsics and intrinsics, such as the geometric arrangements of the eye tracking camera 324 relative to the light sources 326 and the head-mounted-unit 602; assumed eye dimensions 704 such as a typical distance of approximately 4.7 mm between a user's center of cornea curvature and the average center of rotation of the user's eye or typical distances between a user's center of rotation and center of perspective; and per-user calibration data 706 such as a particular user's interpupillary distance. Additional examples of extrinsics, intrinsics, and other information that may be employed by the eye tracking module 614 are described in U.S. patent application Ser. No. 15/497,726, filed Apr. 26, 2017, which is incorporated by reference herein in its entirety.

Image preprocessing module 710 may receive images from an eye camera such as eye camera 324 and may perform one or more preprocessing (i.e., conditioning) operations on the received images. As examples, image preprocessing module 710 may apply a Gaussian blur to the images, may down sample the images to a lower resolution, may applying an unsharp mask, may apply an edge sharpening algorithm, or may apply other suitable filters that assist with the later detection, localization, and labelling of glints, a pupil, or other features in the images from eye camera 324. The image preprocessing module 710 may apply a low-pass filter or a morphological filter such as an open filter, which can remove high-frequency noise such as from the pupillary boundary 516a (see FIG. 5), thereby removing noise that can hinder pupil and glint determination. The image preprocessing module 710 may output preprocessed images to the pupil identification module 712 and to the glint detection and labeling module 714.

Pupil identification module 712 may receive preprocessed images from the image preprocessing module 710 and may identify regions of those images that include the user's pupil. The pupil identification module 712 may, in some embodiments, determine the coordinates of the position, or coordinates, of the center, or centroid, of the user's pupil in the eye tracking images from camera 324. In at least some embodiments, pupil identification module 712 may identify contours in eye tracking images (e.g., contours of pupil iris boundary), identify contour moments (i.e., centers of mass), apply a starburst pupil detection and/or a canny edge detection algorithm, reject outliers based on intensity values, identify sub-pixel boundary points, correct for eye-camera distortion (i.e., distortion in images captured by eye camera 324), apply a random sample consensus (RANSAC) iterative algorithm to fit an ellipse to boundaries in the eye tracking images, apply a tracking filter to the images, and identify sub-pixel image coordinates of the user's pupil centroid. The pupil identification module 712 may output pupil identification data, which may indicate which regions of the preprocessing images module 712 identified as showing the user's pupil, to glint detection and labeling module 714. The pupil identification module 712 may provide the 2D coordinates of the user's pupil (i.e., the 2D coordinates of the centroid of the user's pupil) within each eye tracking image to glint detection module 714. In at least some embodiments, pupil identification module 712 may also provide pupil identification data of the same sort to coordinate system normalization module 718.

Pupil detection techniques, which may be utilized by pupil identification module 712, are described in U.S. Patent Publication No. 2017/0053165, published Feb. 23, 2017 and in U.S. Patent Publication No. 2017/0053166, published Feb. 23, 2017, each of which is incorporated by reference herein in its entirety.

Glint detection and labeling module 714 may receive preprocessed images from module 710 and pupil identification data from module 712. Glint detection module 714 may use this data to detect and/or identify glints (i.e., reflections off of the user's eye of the light from light sources 326) within regions of the preprocessed images that show the user's pupil. As an example, the glint detection module 714 may search for bright regions within the eye tracking image, sometimes referred to herein as "blobs" or local intensity maxima, that are in the vicinity of the user's pupil. In at least some embodiments, the glint detection module 714 may rescale (e.g., enlarge) the pupil ellipse to encompass additional glints. The glint detection module 714 may filter glints by size and/or by intensity. The glint detection module 714 may also determine the 2D positions of each of the glints within the eye tracking image. In at least some examples, the glint detection module 714 may determine the 2D positions of the glints relative to the user's pupil, which may also be referred to as the pupil-glint vectors. Glint detection and labeling module 714 may label the glints and output the preprocessing images with labeled glints to the 3D cornea center estimation module 716. Glint detection and labeling module 714 may also pass along data such as preprocessed images from module 710 and pupil identification data from module 712.

Pupil and glint detection, as performed by modules such as modules 712 and 714, can use any suitable techniques. As examples, edge detection can be applied to the eye image to identify glints and pupils. Edge detection can be applied by various edge detectors, edge detection algorithms, or filters. For example, a Canny Edge detector can be applied to the image to detect edges such as in lines of the image. Edges may include points located along a line that correspond to the local maximum derivative. For example, the pupillary boundary 516a (see FIG. 5) can be located using a Canny edge detector. With the location of the pupil determined, various image processing techniques can be used to detect the "pose" of the pupil 116. Determining an eye pose of an eye image can also be referred to as detecting an eye pose of the eye image. The pose can also be referred to as the gaze, pointing direction, or the orientation of the eye. For example, the pupil may be looking leftwards towards an object, and the pose of the pupil could be classified as a leftwards pose. Other methods can be used to detect the location of the pupil or glints. For example, a concentric ring can be located in an eye image using a Canny Edge detector. As another example, an integro-differential operator can be used to find the pupillary or limbus boundaries of the iris. For example, the Daugman integro-differential operator, the Hough transform, or other iris segmentation techniques can be used to return a curve that estimates the boundary of the pupil or the iris.

3D cornea center estimation module 716 may receive preprocessed images including detected glint data and pupil identification data from modules 710, 712, 714. 3D cornea center estimation module 716 may use these data to estimate the 3D position of the user's cornea. In some embodiments, the 3D cornea center estimation module 716 may estimate the 3D position of an eye's center of cornea curvature or a user's corneal sphere, i.e., the center of an imaginary sphere having a surface portion generally coextensive with the user's cornea. The 3D cornea center estimation module 716 may provide data indicating the estimated 3D coordinates of the corneal sphere and/or user's cornea to the coordinate system normalization module 718, the optical axis determination module 722, and/or the light-field render controller 618. Further details of the operation of the 3D cornea center estimation module 716 are provided herein in connection with FIGS. 8A-8E. Techniques for estimating the positions of eye features such as a cornea or corneal sphere, which may be utilized by 3D cornea center estimation module 716 and other modules in the wearable systems of the present disclosure are discussed in U.S. patent application Ser. No. 15/497,726, filed Apr. 26, 2017, which is incorporated by reference herein in its entirety.

Coordinate system normalization module 718 may optionally (as indicated by its dashed outline) be included in eye tracking module 614. Coordinate system normalization module 718 may receive data indicating the estimated 3D coordinates of the center of the user's cornea (and/or the center of the user's corneal sphere) from the 3D cornea center estimation module 716 and may also receive data from other modules. Coordinate system normalization module 718 may normalize the eye camera coordinate system, which may help to compensate for slippages of the wearable device (e.g., slippages of the head-mounted component from its normal resting position on the user's head, which may be identified by registration observer 620). Coordinate system normalization module 718 may rotate the coordinate system to align the z-axis (i.e., the vergence depth axis) of the coordinate system with the cornea center (e.g., as indicated by the 3D cornea center estimation module 716) and may translate the camera center (i.e., the origin of the coordinate system) to a predetermined distance away from the cornea center such as 30 mm (i.e., module 718 may enlarge or shrink the eye tracking image depending on whether the eye camera 324 was determined to be nearer or further than the predetermined distance). With this normalization process, the eye tracking module 614 may be able to establish a consistent orientation and distance in the eye tracking data, relatively independent of variations of headset positioning on the user's head. Coordinate system normalization module 718 may provide 3D coordinates of the center of the cornea (and/or corneal sphere), pupil identification data, and preprocessed eye tracking images to the 3D pupil center locator module 720. Further details of the operation of the coordinate system normalization module 718 are provided herein in connection with FIGS. 9A-9C.

3D pupil center locator module 720 may receive data, in the normalized or the unnormalized coordinate system, including the 3D coordinates of the center of the user's cornea (and/or corneal sphere), pupil location data, and preprocessed eye tracking images. 3D pupil center locator module 720 may analyze such data to determine the 3D coordinates of the center of the user's pupil in the normalized or unnormalized eye camera coordinate system. The 3D pupil center locator module 720 may determine the location of the user's pupil in three-dimensions based on the 2D position of the pupil centroid (as determined by module 712), the 3D position of the cornea center (as determined by module 716), assumed eye dimensions 704 such as the size of the a typical user's corneal sphere and the typical distance from the cornea center to the pupil center, and optical properties of eyes such as the index of refraction of the cornea (relative to the index of refraction of air) or any combination of these. Further details of the operation of the 3D pupil center locator module 720 are provided herein in connection with FIGS. 9D-9G. Techniques for estimating the positions of eye features such as a pupil, which may be utilized by 3D pupil center locator module 720 and other modules in the wearable systems of the present disclosure are discussed in U.S. patent application Ser. No. 15/497,726, filed Apr. 26, 2017, which is incorporated by reference herein in its entirety.

Optical axis determination module 722 may receive data from modules 716 and 720 indicating the 3D coordinates of the center of the user's cornea and the user's pupil. Based on such data, the optical axis determination module 722 may identify a vector from the position of the cornea center (i.e., from the center of the corneal sphere) to the center of the user's pupil, which may define the optical axis of the user's eye. Optical axis determination module 722 may provide outputs specifying the user's optical axis to modules 724, 728, 730, and 732, as examples.

Center of rotation (CoR) estimation module 724 may receive data from module 722 including parameters of the optical axis of the user's eye (i.e., data indicating the direction of the optical axis in a coordinate system with a known relation to the head-mounted unit 602). CoR estimation module 724 may estimate the center of rotation of a user's eye (i.e., the point around which the user's eye rotates when the user eye rotates left, right, up, and/or down). While eyes may not rotate perfectly around a singular point, assuming a singular point may be sufficient. In at least some embodiments, CoR estimation module 724 may estimate an eye's center of rotation by moving from the center of the pupil (identified by module 720) or the center of curvature of the cornea (as identified by module 716) toward the retina along the optical axis (identified by module 722) a particular distance. This particular distance may be an assumed eye dimension 704. As one example, the particular distance between the center of curvature of the cornea and the CoR may be approximately 4.7 mm. This distance may be varied for a particular user based on any relevant data including the user's age, sex, vision prescription, other relevant characteristics, etc.

In at least some embodiments, the CoR estimation module 724 may refine its estimate of the center of rotation of each of the user's eyes over time. As an example, as time passes, the user will eventually rotate their eyes (to look somewhere else, at something closer, further, or sometime left, right, up, or down) causing a shift in the optical axis of each of their eyes. CoR estimation module 724 may then analyze two (or more) optical axes identified by module 722 and locate the 3D point of intersection of those optical axes. The CoR estimation module 724 may then determine the center of rotation lies at that 3D point of intersection. Such a technique may provide for an estimate of the center of rotation, with an accuracy that improves over time. Various techniques may be employed to increase the accuracy of the CoR estimation module 724 and the determined CoR positions of the left and right eyes. As an example, the CoR estimation module 724 may estimate the CoR by finding the average point of intersection of optical axes determined for various different eye poses over time. As additional examples, module 724 may filter or average estimated CoR positions over time, may calculate a moving average of estimated CoR positions over time, and/or may apply a Kalman filter and known dynamics of the eyes and eye tracking system to estimate the CoR positions over time. As a specific example, module 724 may calculate a weighted average of determined points of optical axes intersection and assumed CoR positions (such as 4.7 mm from an eye's center of cornea curvature), such that the determined CoR may slowly drift from an assumed CoR position (i.e., 4.7 mm behind an eye's center of cornea curvature) to a slightly different location within the user's eye over time as eye tracking data for the user is obtain and thereby enables per-user refinement of the CoR position.

Interpupillary distance (IPD) estimation module 726 may receive data from CoR estimation module 724 indicating the estimated 3D positions of the centers of rotation of the user's left and right eyes. IPD estimation module 726 may then estimate a user's IPD by measuring the 3D distance between the centers of rotation of the user's left and right eyes. In general, the distance between the estimated CoR of the user's left eye and the estimated CoR of the user's right eye may be roughly equal to the distance between the centers of a user's pupils, when the user is looking at optical infinity (i.e., the optical axes of the user's eyes are substantially parallel to one another), which is the typical definition of interpupillary distance (IPD). A user's IPD may be used by various components and modules in the wearable system. As example, a user's IPD may be provided to registration observer 620 and used in assessing how well the wearable device is aligned with the user's eyes (e.g., whether the left and right display lenses are properly spaced in accordance with the user's IPD). As another example, a user's IPD may be provided to vergence depth estimation module 728 and be used in determining a user's vergence depth. Module 726 may employ various techniques, such as those discussed in connection with CoR estimation module 724, to increase the accuracy of the estimated IPD. As examples, IPD estimation module 724 may apply filtering, averaging over time, weighted averaging including assumed IPD distances, Kalman filters, etc. as part of estimating a user's IPD in an accurate manner.

In some embodiments, IPD estimation module 726 may receive data from 3D pupil center locator module and/or 3D cornea center estimation modulation 716 indicating the estimated 3D positions of the user's pupils and/or corneas. IPD estimation module 726 may then estimate a user's IPD by reference to the distances between the pupils and corneas. In general, these distances will vary over time as a user rotates their eyes and changes the depth of their vergence. In some cases, the IPD estimation module 726 may look for the largest measured distance between the pupils and/or corneas, which should occur while the user is looking near optical infinity and should generally correspond to the user's interpupillary distance. In other cases, the IPD estimation module 726 may fit the measured distances between the user's pupils (and/or corneas) to a mathematical relationship of how a person's interpupil distance changes as a function of their vergence depth. In some embodiments, using these or other similar techniques, the IPD estimation module 726 may be able to estimate the user's IPD even without an observation of the user looking at optical infinity (e.g., by extrapolating out from one or more observations in which the user was verging at distances closer than optical infinity).

Vergence depth estimation module 728 may receive data from various modules and submodules in the eye tracking module 614 (as shown in connection with FIG. 7A). In particular, vergence depth estimation module 728 may employ data indicating estimated 3D positions of pupil centers (e.g., as provided by module 720 described above), one or more determined parameters of optical axes (e.g., as provided by module 722 described above), estimated 3D positions of centers of rotation (e.g., as provided by module 724 described above), estimated IPD (e.g., Euclidean distance(s) between estimated 3D positions of centers of rotations) (e.g., as provided by module 726 described above), and/or one or more determined parameters of optical and/or visual axes (e.g., as provided by module 722 and/or module 730 described below). Vergence depth estimation module 728 may detect or otherwise obtain a measure of a user's vergence depth, which may be the distance from the user at which the user's eyes are focused. As examples, when the user is looking at an object three feet in front of them, the user's left and right eyes have a vergence depth of three feet; and, while when the user is looking at a distant landscape (i.e., the optical axes of the user's eyes are substantially parallel to one another such that the distance between the centers of the user's pupils may be roughly equal to the distance between the centers of rotation of the user's left and right eyes), the user's left and right eyes have a vergence depth of infinity. In some implementations, the vergence depth estimation module 728 may utilize data indicating the estimated centers of the user's pupils (e.g., as provided by module 720) to determine the 3D distance between the estimated centers of the user's pupils. The vergence depth estimation module 728 may obtain a measure of vergence depth by comparing such a determined 3D distance between pupil centers to estimated IPD (e.g., Euclidean distance(s) between estimated 3D positions of centers of rotations) (e.g., as indicated by module 726 described above). In addition to the 3D distance between pupil centers and estimated IPD, the vergence depth estimation module 728 may utilize known, assumed, estimated, and/or determined geometries to calculate vergence depth. As an example, module 728 may combine 3D distance between pupil centers, estimated IPD, and 3D CoR positions in a trigonometric calculation to estimate (i.e., determine) a user's vergence depth. Indeed, an evaluation of such a determined 3D distance between pupil centers against estimated IPD may serve to indicate a measure of the user's current vergence depth relative to optical infinity. In some examples, the vergence depth estimation module 728 may simply receive or access data indicating an estimated 3D distance between the estimated centers of the user's pupils for purposes of obtaining such a measure of vergence depth. In some embodiments, the vergence depth estimation module 728 may estimate vergence depth by comparing a user's left and right optical axis. In particular, vergence depth estimation module 728 may estimate vergence depth by locating the distance from a user at which the user's left and right optical axes intersect (or where projections of the user's left and right optical axes on a plane such as a horizontal plane intersect). Module 728 may utilize a user's IPD in this calculation, by setting the zero depth to be the depth at which the user's left and right optical axes are separated by the user's IPD. In at least some embodiments, vergence depth estimation module 728 may determine vergence depth by triangulating eye tracking data together with known or derived spatial relationships.

In some embodiments, vergence depth estimation module 728 may estimate a user's vergence depth based on the intersection of the user's visual axes (instead of their optical axes), which may provide a more accurate indication of the distance at which the user is focused on. In at least some embodiments, eye tracking module 614 may include optical to visual axis mapping module 730. As discussed in further detail in connection with FIG. 10, a user's optical and visual axis are generally not aligned. A visual axis is the axis along which a person is looking, while an optical axis is defined by the center of that person's lens and pupil, and may go through the center of the person's retina. In particular, a user's visual axis is generally defined by the location of the user's fovea, which may be offset from the center of a user's retina, thereby resulting in different optical and visual axis. In at least some of these embodiments, eye tracking module 614 may include optical to visual axis mapping module 730. Optical to visual axis mapping module 730 may correct for the differences between a user's optical and visual axis and provide information on the user's visual axis to other components in the wearable system, such as vergence depth estimation module 728 and light-field render controller 618. In some examples, module 730 may use assumed eye dimensions 704 including a typical offset of approximately 5.2° inwards (nasally, towards a user's nose) between an optical axis and a visual axis. In other words, module 730 may shift a user's left optical axis (nasally) rightwards by 5.2° towards the nose and a user's right optical axis (nasally) leftwards by 5.2° towards the nose in order to estimate the directions of the user's left and right optical axes. In other examples, module 730 may utilize per-user calibration data 706 in mapping optical axes (e.g., as indicated by module 722 described above) to visual axes. As additional examples, module 730 may shift a user's optical axes nasally by between 4.0° and 6.5°, by between 4.5° and 6.0°, by between 5.0° and 5.4°, etc., or any ranges formed by any of these values. In some arrangements, the module 730 may apply a shift based at least in part upon characteristics of a particular user such as their age, sex, vision prescription, or other relevant characteristics and/or may apply a shift based at least in part upon a calibration process for a particular user (i.e., to determine a particular user's optical-visual axis offset). In at least some embodiments, module 730 may also shift the origins of the left and right optical axes to correspond with the user's CoP (as determined by module 732) instead of the user's CoR.

Optional center of perspective (CoP) estimation module 732, when provided, may estimate the location of the user's left and right centers of perspective (CoP). A CoP may be a useful location for the wearable system and, in at least some embodiments, is a position just in front of a pupil. In at least some embodiments, CoP estimation module 732 may estimate the locations of a user's left and right centers of perspective based on the 3D location of a user's pupil center, the 3D location of a user's center of cornea curvature, or such suitable data or any combination thereof. As an example, a user's CoP may be approximately 5.01 mm in front of the center of cornea curvature (i.e., 5.01 mm from the corneal sphere center in a direction that is towards the eye's cornea and that is along the optical axis) and may be approximately 2.97 mm behind the outer surface of a user's cornea, along the optical or visual axis. A user's center of perspective may be just in front of the center of their pupil. As examples, a user's CoP may be less than approximately 2.0 mm from the user's pupil, less than approximately 1.0 mm from the user's pupil, or less than approximately 0.5 mm from the user's pupil or any ranges between any of these values. As another example, the center of perspective may correspond to a location within the anterior chamber of the eye. As other examples, the CoP may be between 1.0 mm and 2.0 mm, about 1.0 mm, between 0.25 mm and 1.0 mm, between 0.5 mm and 1.0 mm, or between 0.25 mm and 0.5 mm.

The center of perspective described herein (as a potentially desirable position for a pinhole of a render camera and an anatomical position in a user's eye) may be a position that serves to reduce and/or eliminate undesired parallax shifts. In particular, the optical system of a user's eye is very roughly equivalent to theoretical system formed by a pinhole in front of a lens, projecting onto a screen, with the pinhole, lens, and screen roughly corresponding to a user's pupil/iris, lens, and retina, respectively. Moreover, it may be desirable for there to be little or no parallax shift when two point light sources (or objects) at different distances from the user's eye are rigidly rotated about the opening of the pinhole (e.g., rotated along radii of curvature equal to their respective distance from the opening of the pinhole). Thus, it would seem that the CoP should be located at the center of the pupil of an eye (and such a CoP may be used in some embodiments). However, the human eye includes, in addition to the lens and pinhole of the pupil, a cornea that imparts additional optical power to light propagating toward the retina). Thus, the anatomical equivalent of the pinhole in the theoretical system described in this paragraph may be a region of the user's eye positioned between the outer surface of the cornea of the user's eye and the center of the pupil or iris of the user's eye. For instance, the anatomical equivalent of the pinhole may correspond to a region within the anterior chamber of a user's eye. For various reasons discussed herein, it may be desired to set the CoP to such a position within the anterior chamber of the user's eye. The derivation and significance of the CoP are discussed in additional detail in Appendix (Parts I and II), which forms part of this application.

As discussed above, eye tracking module 614 may provide data, such as estimated 3D positions of left and right eye centers of rotation (CoR), vergence depth, left and right eye optical axis, 3D positions of a user's eye, 3D positions of a user's left and right centers of cornea curvature, 3D positions of a user's left and right pupil centers, 3D positions of a user's left and right center of perspective, a user's IPD, etc., to other components, such as light-field render controller 618 and registration observer 620, in the wearable system. Eye tracking module 614 may also include other submodules that detect and generate data associated with other aspects of a user's eye. As examples, eye tracking module 614 may include a blink detection module that provides a flag or other alert whenever a user blinks and a saccade detection module that provides a flag or other alert whenever a user's eye saccades (i.e., quickly shifts focus to another point).

Example of a Render Controller

Figure 7B:
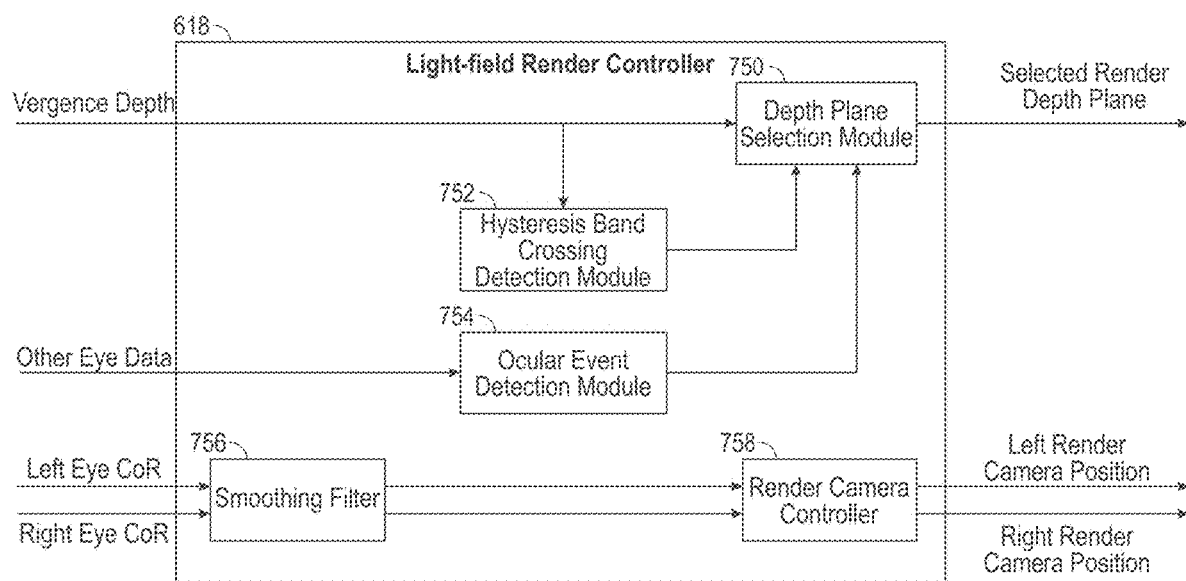
FIG. 7B is a block diagram of a render controller in a wearable system.

A detailed block diagram of an example light-field render controller 618 is shown in FIG. 7B. As shown in FIGS. 6 and 7B, render controller 618 may receive eye tracking information from eye tracking module 614 and may provide outputs to render engine 622, which may generate images to be displayed for viewing by a user of the wearable system. As examples, render controller 618 may receive a vergence depth, left and right eye centers of rotation (and/or centers of perspective), and other eye data such as blink data, saccade data, etc.

Depth plane selection module 750 may receive vergence depth information and other eye data and, based on such data, may cause render engine 622 to convey content to a user with a particular depth plane (i.e., at a particular accommodation or focal distance). As discussed in connection with FIG. 4, a wearable system may include a plurality of discrete depth planes formed by a plurality of waveguides, each conveying image information with a varying level of wavefront curvature. In some embodiments, a wearable system may include one or more variable depth planes, such as an optical element that conveys image information with a level of wavefront curvature that varies over time. In these and other embodiments, depth plane selection module 750 may cause render engine 622 to convey content to a user at a selected depth (i.e., cause render engine 622 to direct display 220 to switch depth planes), based in part of the user's vergence depth. In at least some embodiments, depth plane selection module 750 and render engine 622 may render content at different depths and also generate and/or provide depth plane selection data to display hardware such as display 220. Display hardware such as display 220 may perform an electrical depth plane switching in response to depth plane selection data (which may be control signals) generated by and/or provided by modules such as depth plane selection module 750 and render engine 622.

In general, it may be desirable for depth plane selection module 750 to select a depth plane matching the user's current vergence depth, such that the user is provided with accurate accommodation cues. However, it may also be desirable to switch depth planes in a discreet and unobtrusive manner. As examples, it may be desirable to avoid excessive switching between depth planes and/or it may be desire to switch depth planes at a time when the user is less likely to notice the switch, such as during a blink or eye saccade.

Hysteresis band crossing detection module 752 may help to avoid excessive switching between depth planes, particularly when a user's vergence depth fluctuates at the midpoint or transition point between two depth planes. In particular, module 752 may cause depth plane selection module 750 to exhibit hysteresis in its selection of depth planes. As an example, modules 752 may cause depth plane selection module 750 to switch from a first farther depth plane to a second closer depth plane only after a user's vergence depth passes a first threshold. Similarly, module 752 may cause depth plane selection module 750 (which may in turn direct displays such as display 220) to switch to the first farther depth plane only after the user's vergence depth passes a second threshold that is farther from the user than the first threshold. In the overlapping region between the first and second thresholds, module 750 may cause depth plane selection module 750 to maintain whichever depth plane is currently select as the selected depth plane, thus avoiding excessive switching between depth planes.

Ocular event detection module 750 may receive other eye data from the eye tracking module 614 of FIG. 7A and may cause depth plane selection module 750 to delay some depth plane switches until an ocular event occurs. As an example, ocular event detection module 750 may cause depth plane selection module 750 to delay a planned depth plane switch until a user blink is detected; may receive data from a blink detection component in eye tracking module 614 that indicates when the user is currently blinking; and, in response, may cause depth plane selection module 750 to execute the planned depth plane switch during the blink event (such by causing module 750 to direct display 220 to execute the depth plane switch during the blink event). In at least some embodiments, the wearable system may be able to shift content onto a new depth plane during a blink event such that the user is unlikely to perceive the shift. As another example, ocular event detection module 750 may delay planned depth plane switches until an eye saccade is detected. As discussed in connection with eye blinks, such as an arrangement may facilitate the discretely shifting of depth planes.

If desired, depth plane selection module 750 may delay planned depth plane switches only for a limited period of time before executing the depth plane switch, even in the absence of an ocular event. Similarly, depth plane selection module 750 may execute a depth plane switch when the user's vergence depth is substantially outside of a currently-selected depth plane (i.e., when the user's vergence depth has exceeded a predetermined threshold beyond the regular threshold for a depth plane switch), even in the absence of an ocular event. These arrangements may help ensure that ocular event detection module 754 does not indefinitely delay depth plane switches and does not delay depth plane switches when a large accommodation error is present. Further details of the operation of depth plane selection module 750, and how the module may time depth plane switches, are provided herein in connection with FIG. 13.

Render camera controller 758 may provide information to render engine 622 indicating where the user's left and right eyes are. Render engine 622 may then generate content by simulating cameras at the positions of the user's left and right eyes and generating content based on the perspectives of the simulated cameras. As discussed above, the render camera is a simulated camera for use in rendering virtual image content possibly from a database of objects in a virtual world. The objects may have locations and orientations relative to the user or wearer and possibly relative to real objects in the environment surrounding the user or wearer. The render camera may be included in a render engine to render virtual images based on the database of virtual objects to be presented to the eye. The virtual images may be rendered as if taken from the perspective the user or wearer. For example, the virtual images may be rendered as if captured by a camera (corresponding to the "render camera") having an aperture, lens, and detector viewing the objects in the virtual world. The virtual images are taken from the perspective of such a camera having a position of the "render camera." For example, the virtual images may be rendered as if captured from the perspective of a camera having a specific location with respect to the user's or wearer's eye so as to provide images that appear to be from the perspective of the user or wearer. In some implementations, the images are rendered as if captured from the perspective of a camera having an aperture at a specific location with respect to the user's or wearer's eye (such as the center of perspective or center of rotation as discussed herein, or elsewhere).

Render camera controller 758 may determine the positions of the left and right cameras based on the left and right eye centers of rotation (CoR), determined by CoR estimation module 724, and/or based on the left and right eye centers of perspective (CoP), determined by CoP estimation module 732. In some embodiments, render camera controller 758 may switch between the CoR and CoP locations based on various factors. As examples, the render camera controller 758 may, in various modes, register the render camera to the CoR locations at all times, register the render camera to the CoP locations at all times, toggle or discretely switch between registering the render camera to the CoR locations and registering the render camera to the CoP locations over time based on various factors, or dynamically register the render camera to any of a range of different positions along the optical (or visual) axis between the CoR and CoP locations over time based on various factors. The CoR and CoP positions may optionally pass through smoothing filter 756 (in any of the aforementioned modes for render camera positioning) which may average the CoR and CoP locations over time to reduce noise in these positions and prevent jitter in the render simulated render cameras.

In at least some embodiments, the render camera may be simulated as a pinhole camera with the pinhole disposed at the position of the estimated CoR or CoP identified by eye tracking module 614. As the CoP is offset from the CoR, the location of the render camera and its pinhole both shift as the user's eye rotates, whenever the render camera's position is based on a user's CoP. In contrast, whenever the render camera's position is based on a user's CoR, the location of the render camera's pinhole does not move with eye rotations, although the render camera (which is behind the pinhole) may, in some embodiments, move with eye rotation. In other embodiments where the render camera's position is based on a user's CoR, the render camera may not move (i.e., rotate) with a user's eye.

Example of a Registration Observer

Figure 7C:
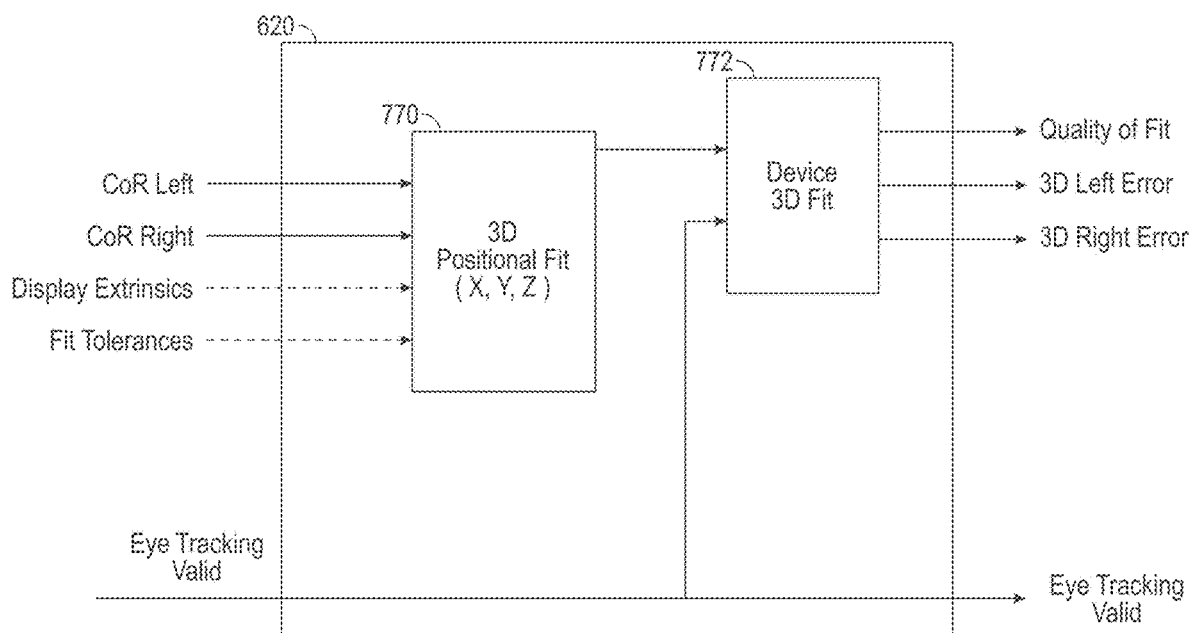
FIG. 7C is a block diagram of a registration observer in a head-mounted display system.

A block diagram of an example registration observer 620 is shown in FIG. 7C. As shown in FIGS. 6, 7A, and 7C, registration observer 620 may receive eye tracking information from eye tracking module 614 (FIGS. 6 and 7A). As examples, registration observer 620 may receive information on a user's left and right eye centers of rotation (e.g., the three-dimensional positions of the user's left and right eye centers of rotations, which may be on a common coordinate system or have a common frame of reference with the head-mounted display system 600). As other examples, registration observer 620 may receive display extrinsics, fit tolerances, and an eye-tracking valid indicator. The display extrinsics may include information on the display (e.g., display 200 of FIG. 2) such as the field of view of the display, the size of one or more display surfaces, and the positions of the display surfaces relative to the head-mounted display system 600. The fit tolerances may include information on display registration volumes, which may indicate how far the user's left and right eyes may move from nominal positions before display performance is impacted. In addition, the fit tolerances may indicate the amount of display performance impact that is expected as a function of the positions of the user's eyes.

As shown in FIG. 7C, registration observer 620 may include a 3D positional fit module 770. The positional fit module 770 may obtain and analyze various pieces of data including, as examples, a left eye center of rotation 3D position (e.g., CoR Left), a right eye center of rotation 3D position (e.g., CoR Right), display extrinsics, and fit tolerances. The 3D positional fit module 770 may determine how far the user's left and right eyes are from the respective left and right eye nominal positions (e.g., may calculate 3D left error and 3D right error) and may provide the error distances (e.g., 3D left error and 3D right error) to device 3D fit module 772.

3D positional fit module 770 may also compare the error distances to the display extrinsics and the fit tolerances to determine if the users eye are within a nominal volume, a partially-degraded volume (e.g., a volume in which the performance of display 220 is partially degraded), or in a fully degraded or nearly fully degraded volume (e.g., a volume in which display 220 is substantially unable to provide content to the user's eyes). In at least some embodiments, 3D positional fit module 770 or 3D fit module 772 may provide an output qualitatively describing the fit of the HMD on the user, such as the Quality of Fit output shown in FIG. 7C. As an example, module 770 may provide an output indicating whether the current fit of the HMD on the user is good, marginal, or failed. A good fit may correspond to a fit that enables the user to view at least a certain percentage of the image (such as 90%), a marginal fit may enable the user to view at least a lower percentage of the image (such as 80%), while a failed fit may be a fit in which only an even lower percentage of the image is visible to the user.

As another example, the 3D positional fit module 770 and/or device 3D fit module 772 may calculate a visible area metric, which may be a percentage of the overall area (or pixels) of images display by display 220 that are visible to the user. Modules 770 and 772 may calculate the visible area metric by evaluating the positions of the user's left and right eyes (e.g., which may be based on the centers of rotation of the user's eyes) relative to display 220 and using one or more models (e.g., a mathematical or geometric model), one or more look-up tables, or other techniques or combinations of these and other techniques to determine what percentage of the images are visible to the user as a function of the positions of the user's eyes. Additionally, modules 770 and 772 may determine which regions or portions of the images display by display 220 are expected to be visible to the user as a function of the positions of the user's eyes.

Registration observer 620 may also include a device 3D fit module 772. Module 772 may receive data from 3D positional fit module 770 and may also receive an eye tracking valid indicator, which may be provided by eye tracking module 614 and may indicate whether the eye tracking system is currently tracking the positions of the user's eyes or if eye tracking data is unavailable or in an error condition (e.g., determined to be no reliable). Device 3D fit module 772 may, if desired, modify quality of fit data received from 3D positional fit module 770 depending on the state of the eye tracking valid data. For example, if the data from the eye tracking system is indicated to not be available or to have an error, the device 3D fit module 772 may provide a notification that there is an error and/or not provide output to the user regarding fit quality or fit errors.

In at least some embodiments, registration observer 620 may provide feedback to users on the quality of fit as well as details of the nature and magnitude of the error. As examples, the head-mounted display system may provide feedback to the user during calibration or fitting processes (e.g., as part of a setup procedure) and may provide feedback during operation (e.g., if the fit degrades due to slippage, the registration observer 620 may prompt the user to readjust the head-mounted display system). In some embodiments, the registration analysis may be performed automatically (e.g., during use of the head-mounted display system) and the feedback may be provided without user input. These are merely illustrative examples.

Example of Locating a User's Cornea with an Eye Tracking System

Figure 8A:
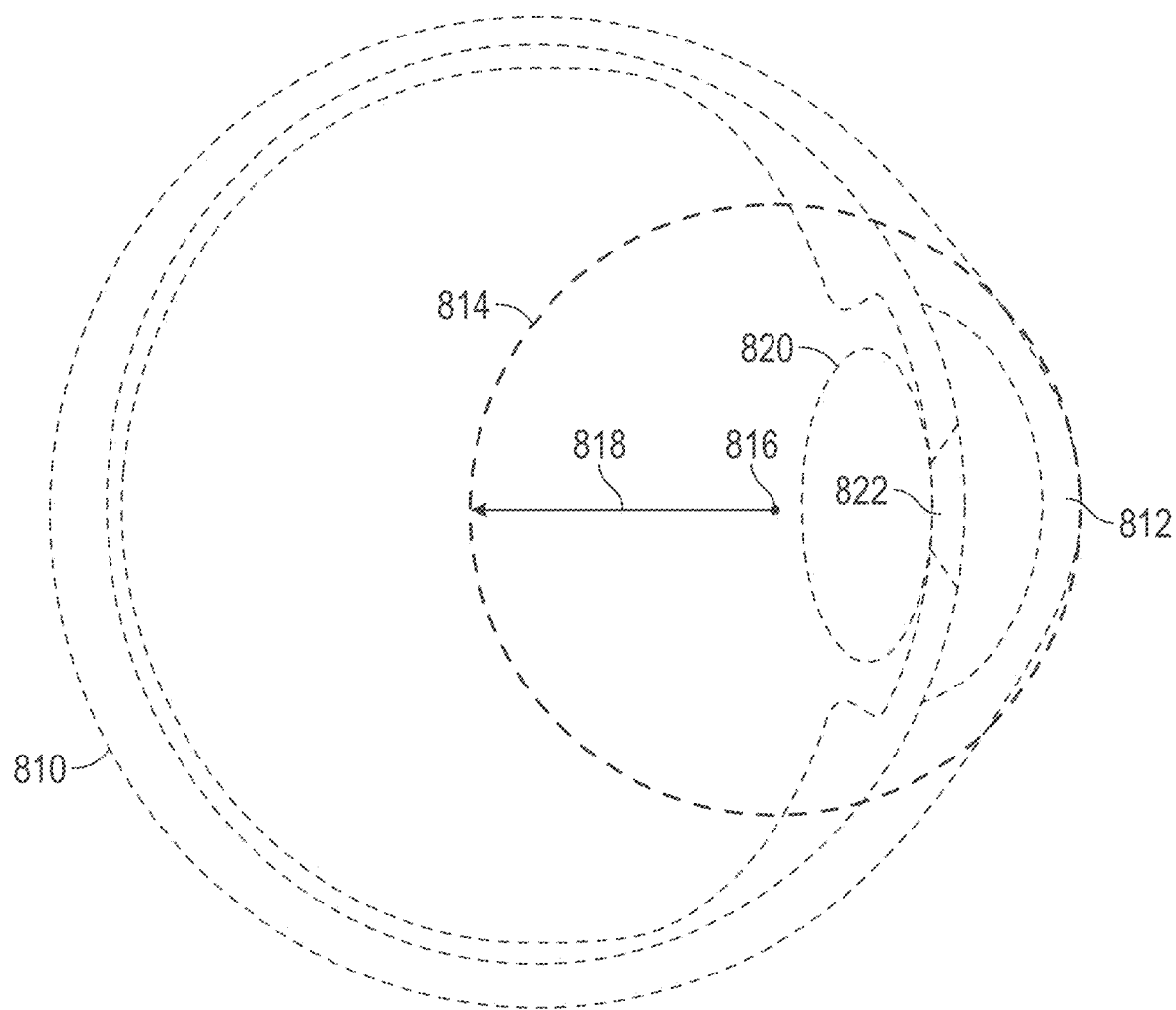
FIG. 8A is a schematic diagram of an eye showing the eye's corneal sphere.

FIG. 8A is a schematic diagram of an eye showing the eye's corneal sphere. As shown in FIG. 8A, a user's eye 810 may have a cornea 812, a pupil 822, and a lens 820. The cornea 812 may have an approximately spherical shape, shown by corneal sphere 814. Corneal sphere 814 may have a center point 816, also referred to as a corneal center, and a radius 818. The semispherical cornea of a user's eye may curve around the corneal center 816.

FIGS. 8B-8E illustrate an example of locating a user's corneal center 816 using 3D cornea center estimation module 716 and eye tracking module 614.

Figure 8B:
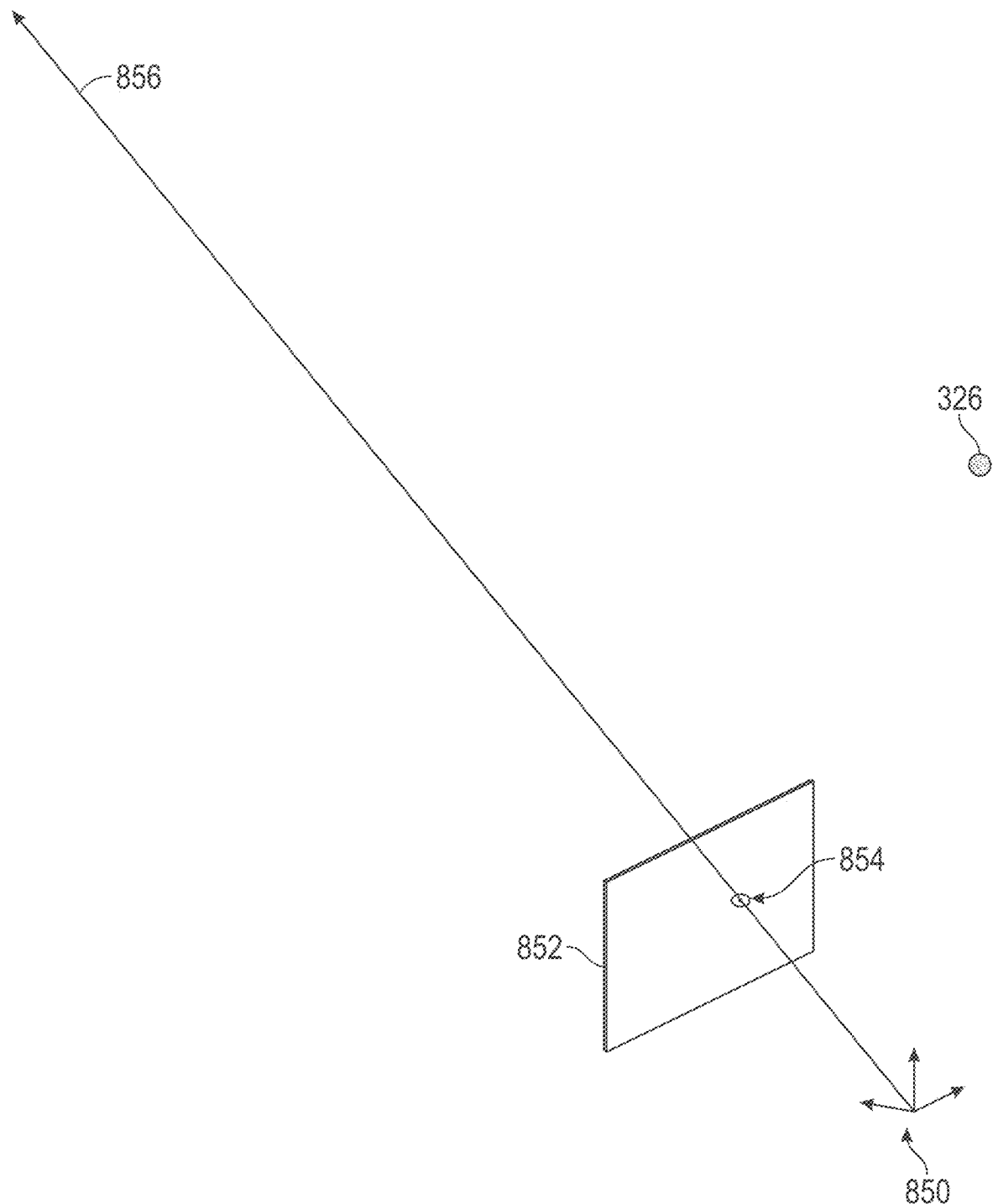
FIG. 8B illustrates an example corneal glint detected by an eye tracking camera.

As shown in FIG. 8B, 3D cornea center estimation module 716 may receive an eye tracking image 852 that includes a corneal glint 854. The 3D cornea center estimation module 716 may then simulate, in an eye camera coordinate system 850, the known 3D positions of the eye camera 324 and light source 326 (which may be based on data in eye tracking extrinsics & intrinsics database 702, assumed eye dimensions database 704, and/or per-user calibration data 706) in order to cast a ray 856 in the eye camera coordinate system. In at least some embodiments, the eye camera coordinate system 850 may have its origin at the 3D position of the eye tracking camera 324.

Figure 8C:
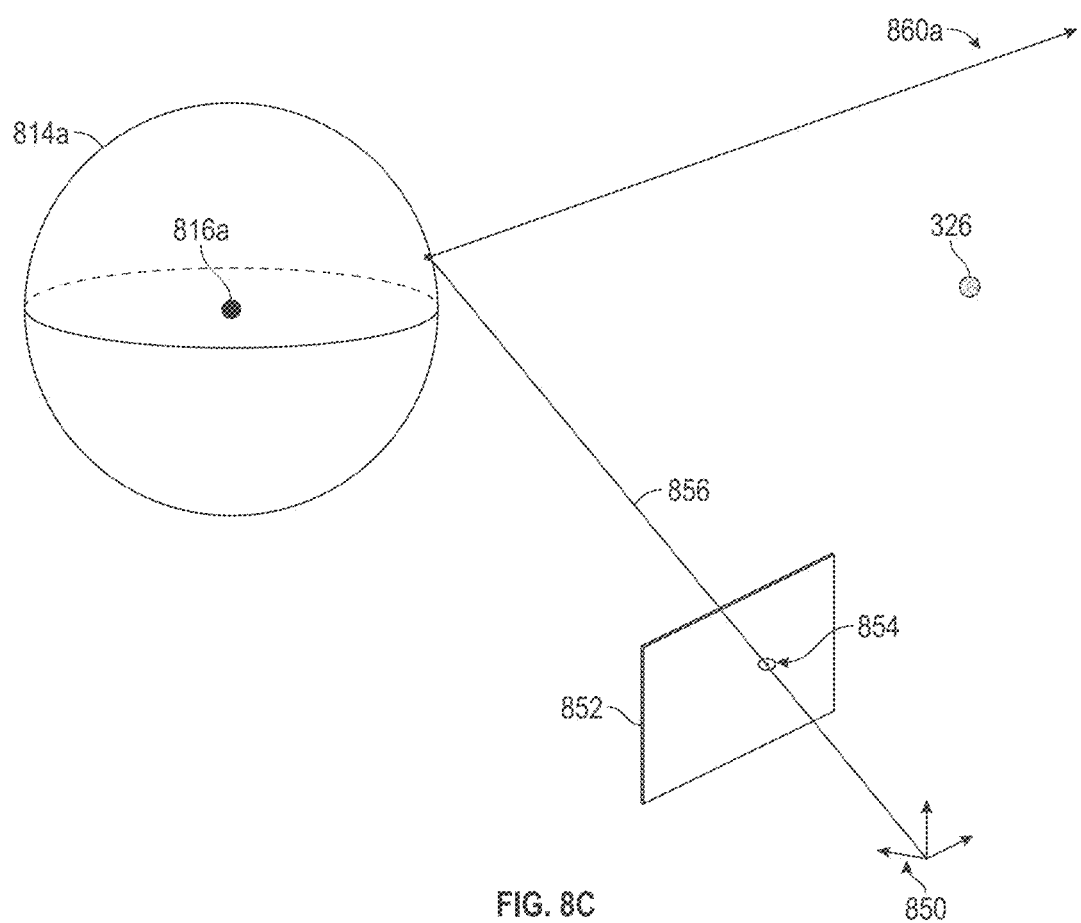
FIGS. 8C-8E illustrate example stages of locating a user's corneal center with an eye tracking module in a wearable system.

In FIG. 8C, 3D cornea center estimation module 716 simulates a corneal sphere 814a (which may be based on assumed eye dimensions from database 704) and corneal curvature center 816a at a first position. The 3D cornea center estimation module 716 may then check to see whether the corneal sphere 814a would properly reflect light from the light source 326 to the glint position 854. As shown in FIG. 8C, the first position is not a match as the ray 860a does not intersect light source 326.

Figure 8D:
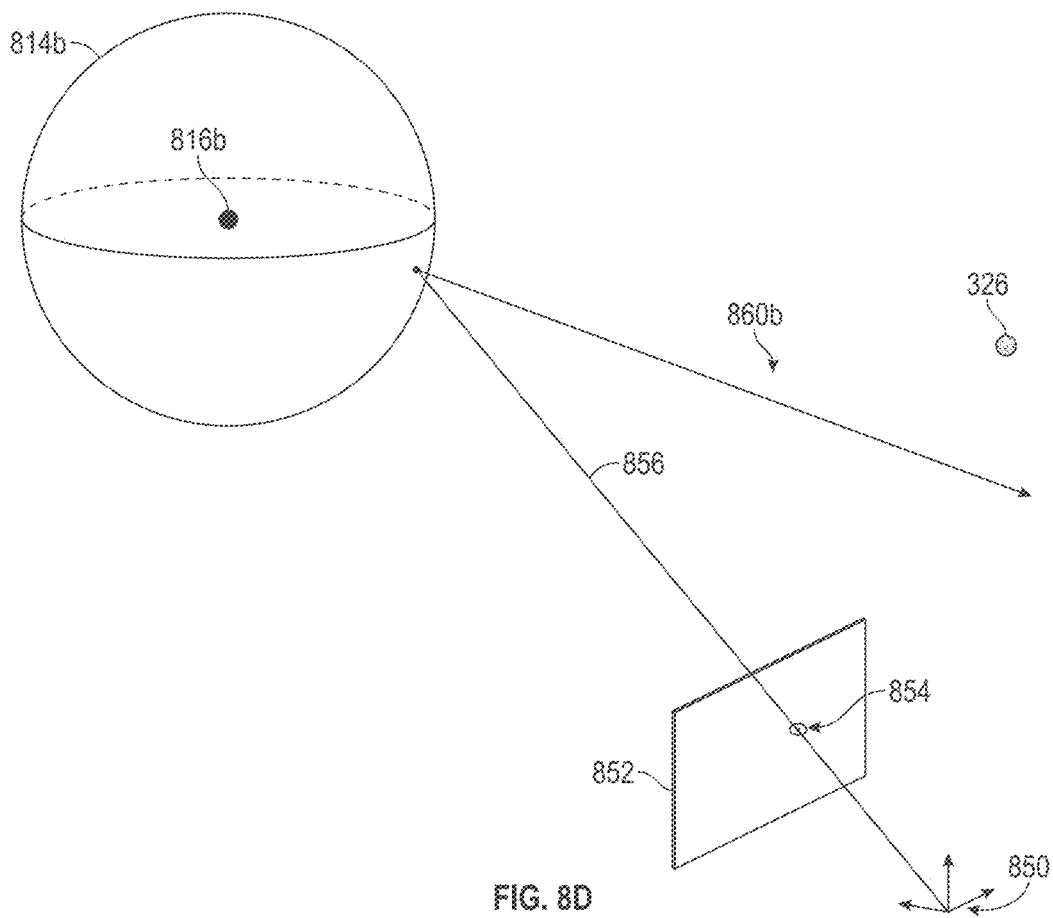

Similarly in FIG. 8D, 3D cornea center estimation module 716 simulates a corneal sphere 814b and corneal curvature center 816b at a second position. The 3D cornea center estimation module 716 then checks to see whether the corneal sphere 814b properly reflects light from the light source 326 to the glint position 854. As shown in FIG. 8D, the second position is also not a match.

Figure 8E:
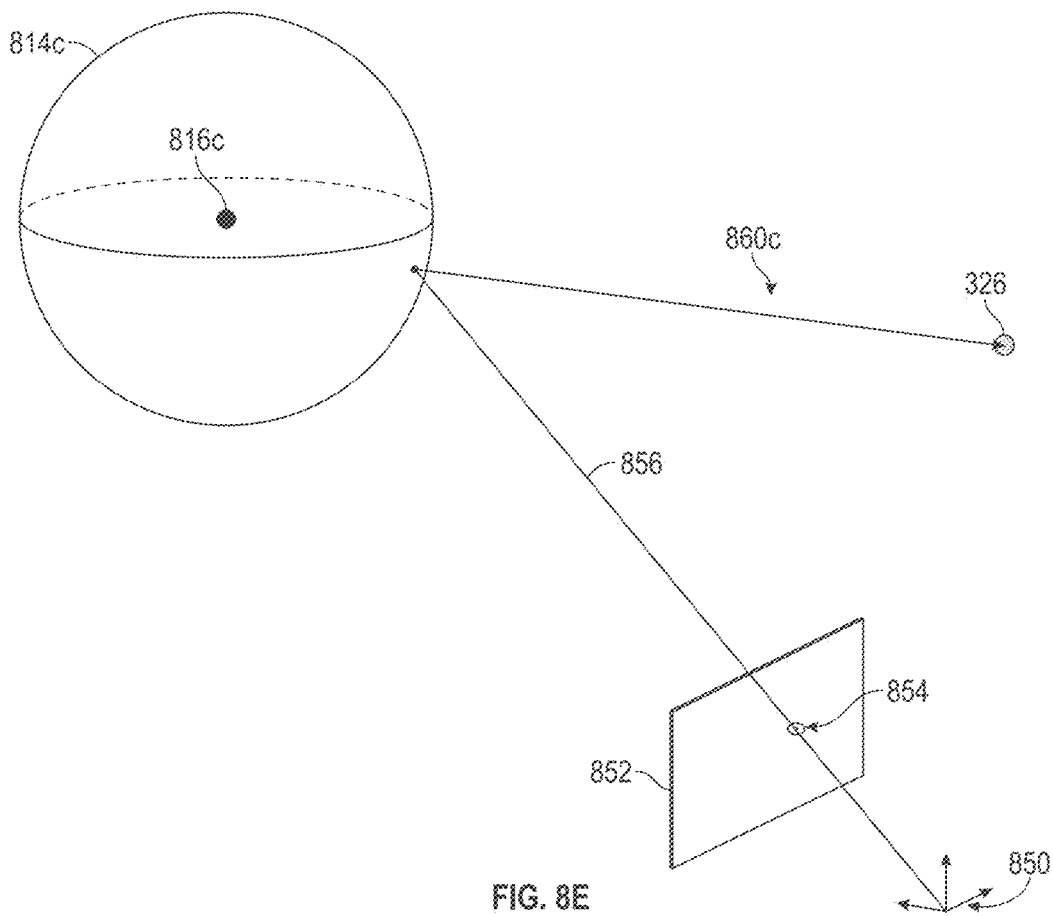

As shown in FIG. 8E, the 3D cornea center estimation module 716 eventually is able to determine the correct position of the corneal sphere is corneal sphere 814c and corneal curvature center 816c. The 3D cornea center estimation module 716 confirms the illustrated position is correct by checking that light from source 326 will properly reflect off of the corneal sphere and be imaged by camera 324 at the correct location of glint 854 on image 852. With this arrangement and with the known 3D positions of the light source 326, the camera 324, and the optical properties of the camera (focal length, etc.), the 3D cornea center estimation module 716 can determine the 3D location of the cornea's center of curvature 816 (relative to the wearable system).

The processes described herein in connection with at least FIGS. 8C-8E may effectively be an iterative, repetitious, or optimization process to identify the 3D position of the user's cornea center. As such, any of a plurality of techniques (e.g., iterative, optimization techniques, etc.) may be used to efficiently and quickly prune or reduce the search space of possible positions. Moreover, in some embodiments, the system may include two, three, four, or more light sources such as light source 326 and some of all of these light sources may be disposed at different positions, resulting in multiple glints such as glint 854 located at different positions on image 852 and multiple rays such as ray 856 having different origins and directions. Such embodiments may enhance the accuracy of the 3D cornea center estimation module 716, as the module 716 may seek to identify a cornea position that results in some or all of the glints & rays being properly reflected between their respective light sources and their respective positions on image 852. In other words and in these embodiments, the positions of some or all of the light sources may be relied upon in the 3D cornea position determination (e.g., iterative, optimization techniques, etc.) processes of FIGS. 8B-8E.

Example of Normalizing the Coordinate System of Eye Tracking Images

Figure 9A:
FIGS. 9A-9C illustrate an example normalization of the coordinate system of eye tracking images.
Figure 9A:
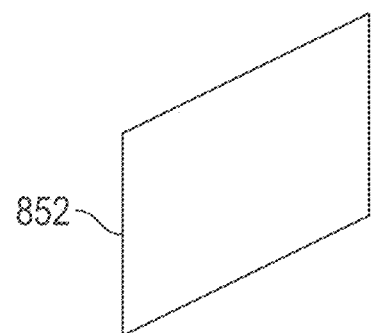
Figure 9A:
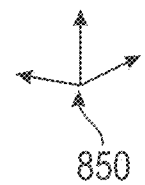
Figure 9B:
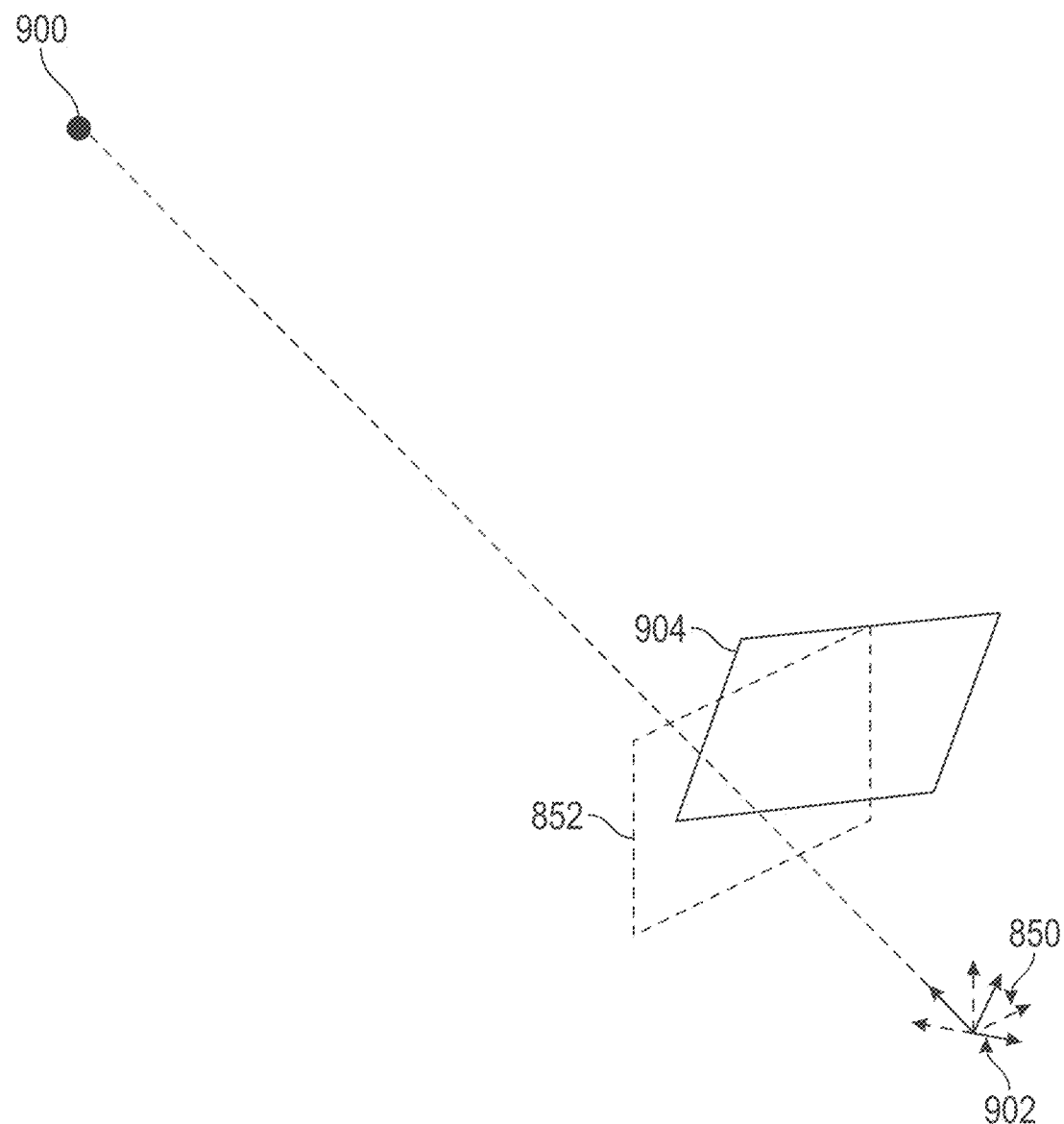
Figure 9C:
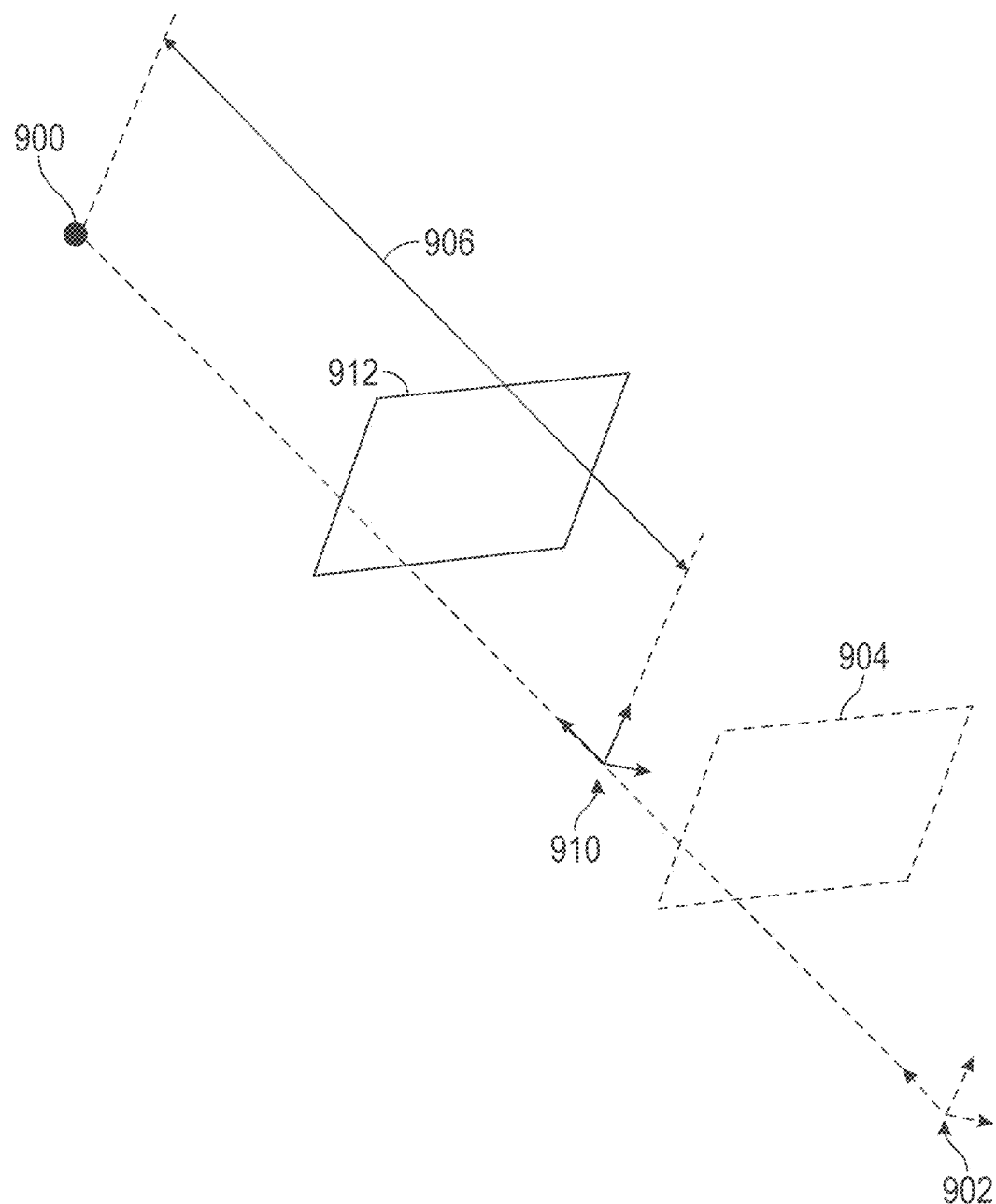

FIGS. 9A-9C illustrate an example normalization of the coordinate system of eye tracking images, by a component in the wearable system such as coordinate system normalization module 718 of FIG. 7A. Normalizing the coordinate system of eye tracking images relative to a user's pupil location may compensate for slippage of the wearable system relative to a user's face (i.e., headset slippage) and such normalization may establish a consistent orientation and distance between eye tracking images and a user's eyes.

As shown in FIG. 9A, coordinate system normalization module 718 may receive estimated 3D coordinates 900 of a user's center of corneal rotation and may receive un-normalized eye tracking images such as image 852. Eye tracking image 852 and coordinates 900 may be in an un-normalized coordinate system 850 that is based on the location of eye tracking camera 324, as an example.

As a first normalization step, coordinate system normalization module 718 may rotate coordinate system 850 into rotated coordinate system 902, such that the z-axis (i.e., the vergence depth axis) of the coordinate system may be aligned with a vector between the origin of the coordinate system and cornea center of curvature coordinates 900, as shown in FIG. 9B. In particular, coordinate system normalization module 718 may rotate eye tracking image 850 into rotated eye tracking image 904, until the coordinates 900 of the user's corneal center of curvature are normal to the plane of the rotated image 904.

As a second normalization step, coordinate system normalization module 718 may translate rotated coordinate system 902 into normalized coordinate system 910, such that cornea center of curvature coordinates 900 are a standard, normalized distance 906 from the origin of normalized coordinate system 910, as shown in FIG. 9C. In particular, coordinate system normalization module 718 may translate rotated eye tracking image 904 into normalized eye tracking image 912. In at least some embodiments, the standard, normalized distance 906 may be approximately 30 millimeters. If desired, the second normalization step may be performed prior to the first normalization step.

Example of Locating a User's Pupil Centroid with an Eye Tracking System

FIGS. 9D-9G illustrate an example of locating a user's pupil center (i.e., the center of a user's pupil 822 as shown in FIG. 8A) using 3D pupil center locator module 720 and eye tracking module 614.

Figure 9D:
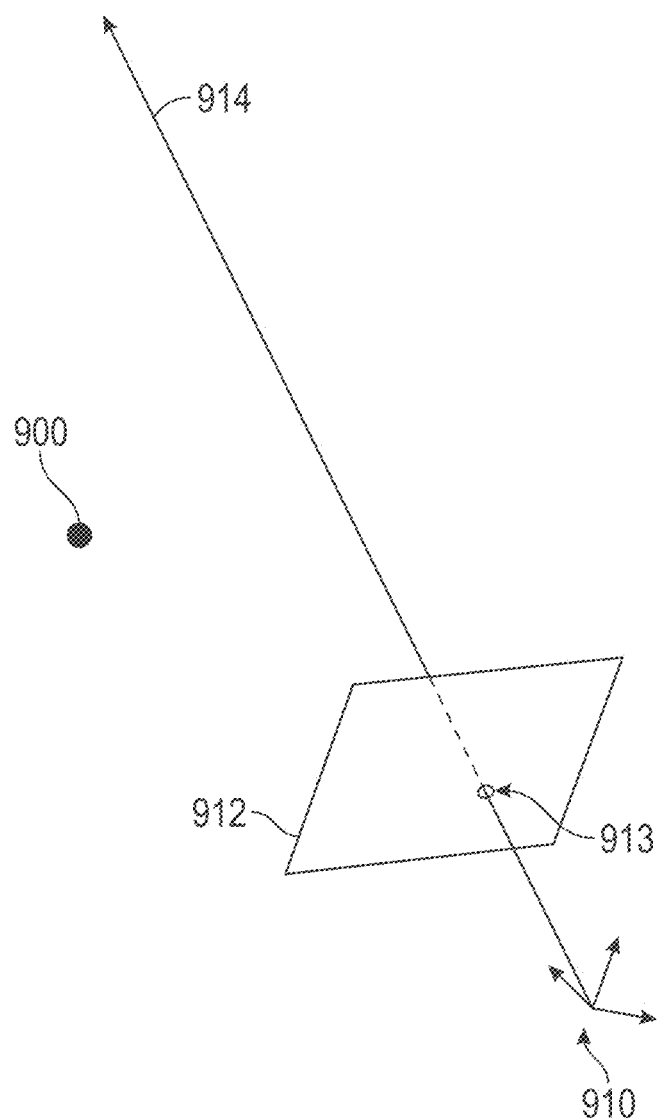
FIGS. 9D-9G illustrate example stages of locating a user's pupil center with an eye tracking module in a wearable system.

As shown in FIG. 9D, 3D pupil center locator module 720 may receive a normalized eye tracking image 912 that includes a pupil centroid 913 (i.e., a center of a user's pupil as identified by pupil identification module 712). The 3D pupil center locator module 720 may then simulate the normalized 3D position 910 of eye camera 324 to cast a ray 914 in the normalized coordinate system 910, through the pupil centroid 913.

Figure 9E:
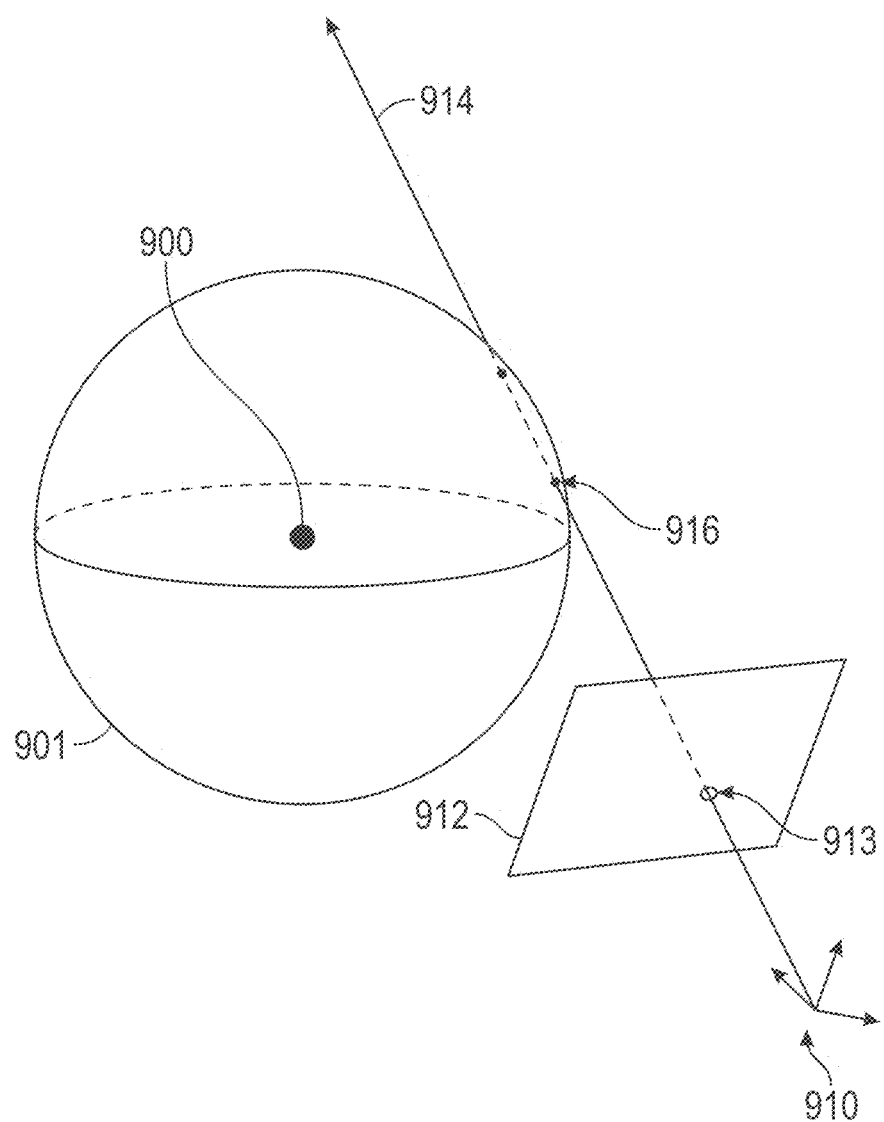

In FIG. 9E, 3D pupil center locator module 720 may simulate a corneal sphere such as corneal sphere 901 having center of curvature 900 based on data from 3D cornea center estimation module 716 (and as discussed in more detail in connection with FIGS. 8B-8E). As an example, the corneal sphere 901 may be positioned in the normalized coordinate system 910 based on the location of the center of curvature 816c identified in connection with FIG. 8E and based on the normalization processes of FIGS. 9A-9C. Additionally, 3D pupil center locator module 720 may identify a first intersection 916 between ray 914 (i.e., a ray between the origin of normalized coordinate system 910 and the normalized location of a user's pupil) and the simulated cornea, as shown in FIG. 9E.

Figure 9F:
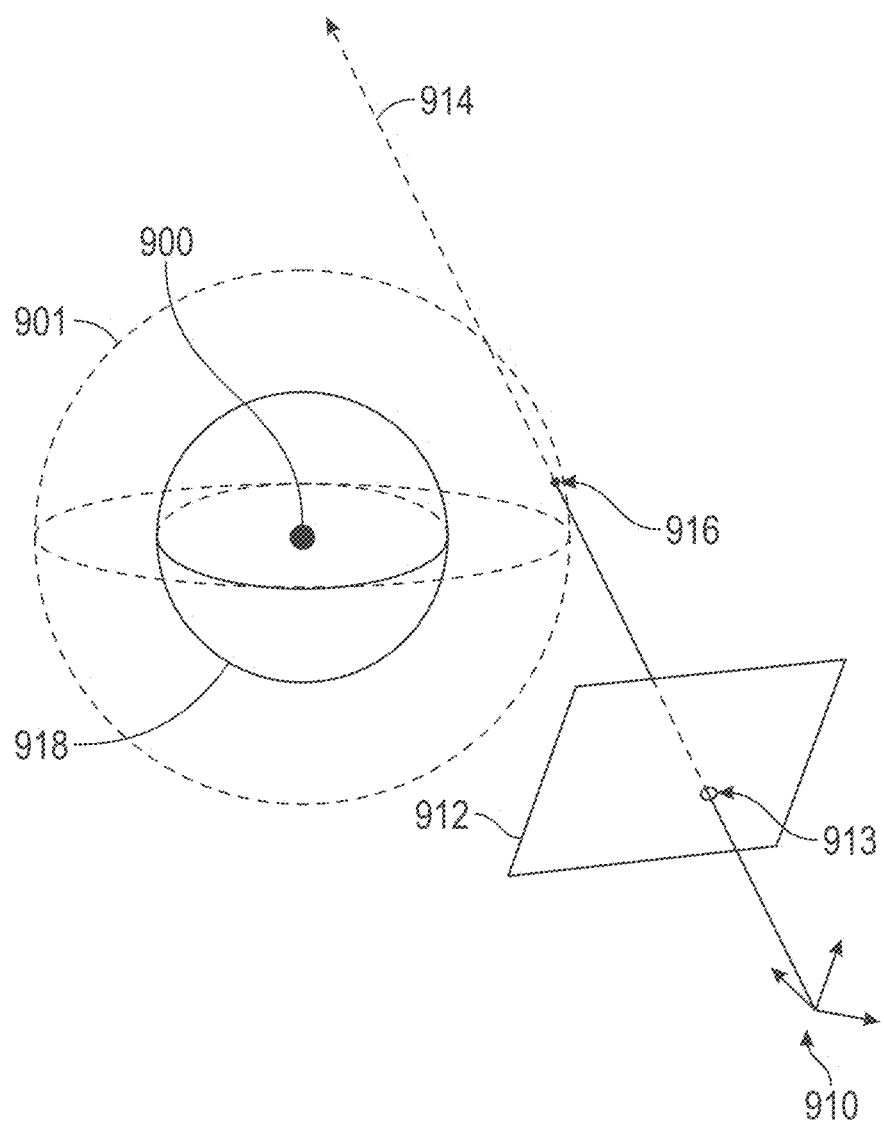

As shown in FIG. 9F, 3D pupil center locator module 720 may determine pupil sphere 918 based on corneal sphere 901. Pupil sphere 918 may share a common center of curvature with corneal sphere 901, but have a small radius. 3D pupil center locator module 720 may determine a distance between cornea center 900 and pupil sphere 918 (i.e., a radius of pupil sphere 918) based on a distance between the corneal center and the pupil center. In some embodiments, the distance between a pupil center and a corneal center of curvature may be determined from assumed eye dimensions 704 of FIG. 7A, from eye tracking extrinsics and intrinsics database 702, and/or from per-user calibration data 706. In other embodiments, the distance between a pupil center and a corneal center of curvature may be determined from per-user calibration data 706 of FIG. 7A.

Figure 9G:
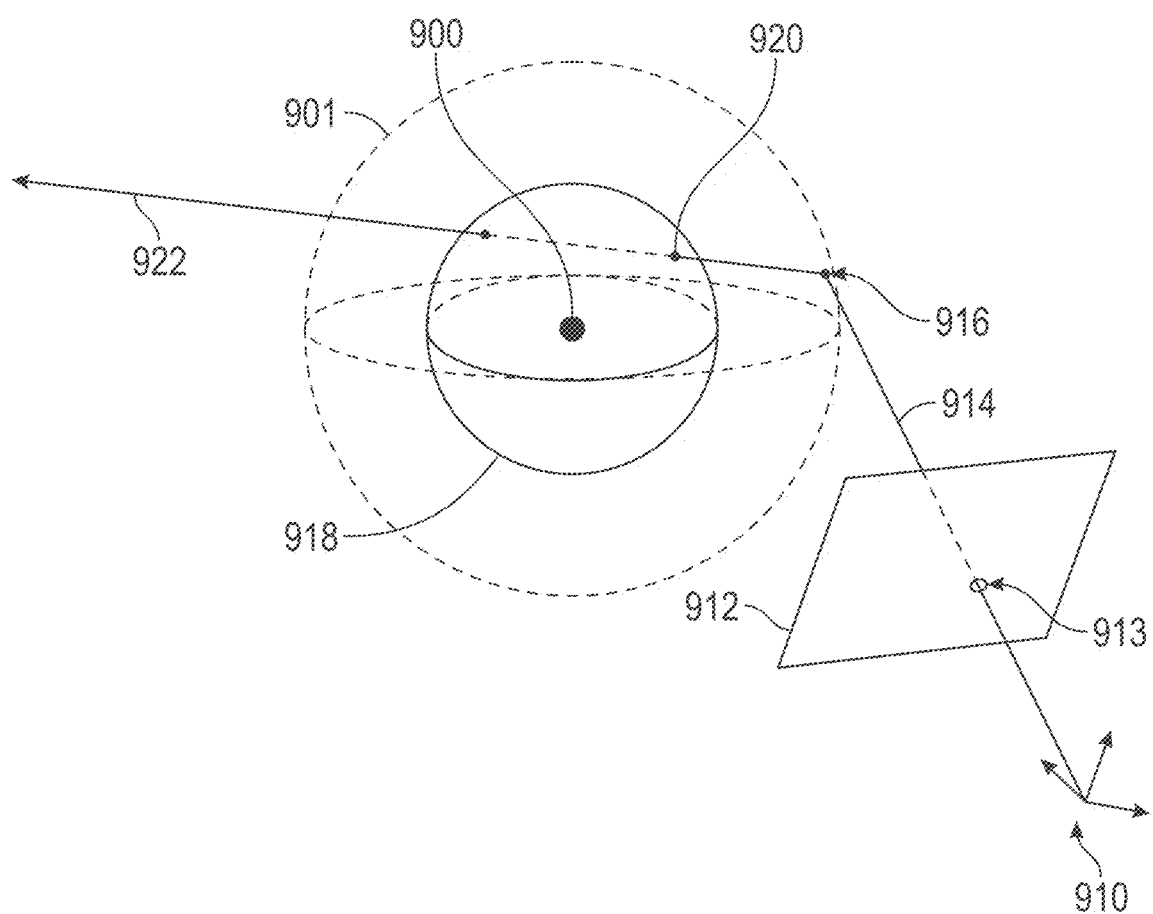

As shown in FIG. 9G, 3D pupil center locator module 720 may locate the 3D coordinates of a user's pupil center based on variety of inputs. As examples, the 3D pupil center locator module 720 may utilize the 3D coordinates and radius of the pupil sphere 918, the 3D coordinates of the intersection 916 between a simulated cornea sphere 901 and a ray 914 associated with a pupil centroid 913 in a normalized eye tracking image 912, information on the index of refraction of a cornea, and other relevant information such as the index of refraction of air (which may be stored in eye tracking extrinsics & intrinsics database 702) to determine the 3D coordinates of the center of a user's pupil. In particular, the 3D pupil center locator module 720 may, in simulation, bend ray 916 into refracted ray 922 based on refraction difference between air (at a first index of refraction of approximately 1.00) and corneal material (at a second index of refraction of approximately 1.38). After taking into account refraction caused by the cornea, 3D pupil center locator module 720 may determine the 3D coordinates of the first intersection 920 between refracted ray 922 and pupil sphere 918. 3D pupil center locator module 720 may determine that a user's pupil center 920 is located at approximately the first intersection 920 between refracted ray 922 and pupil sphere 918. With this arrangement, the 3D pupil center locator module 720 can determine the 3D location of the pupil center 920 (relative to the wearable system), in the normalized coordinate system 910. If desired, the wearable system can un-normalize the coordinates of the pupil center 920 into the original eye camera coordinate system 850. The pupil center 920 may be used together with the corneal curvature center 900 to determine, among other things, a user's optical axis using optical axis determination module 722 and a user's vergence depth by vergence depth estimation module 728.

Example of Differences Between Optical and Visual Axes

Figure 10:
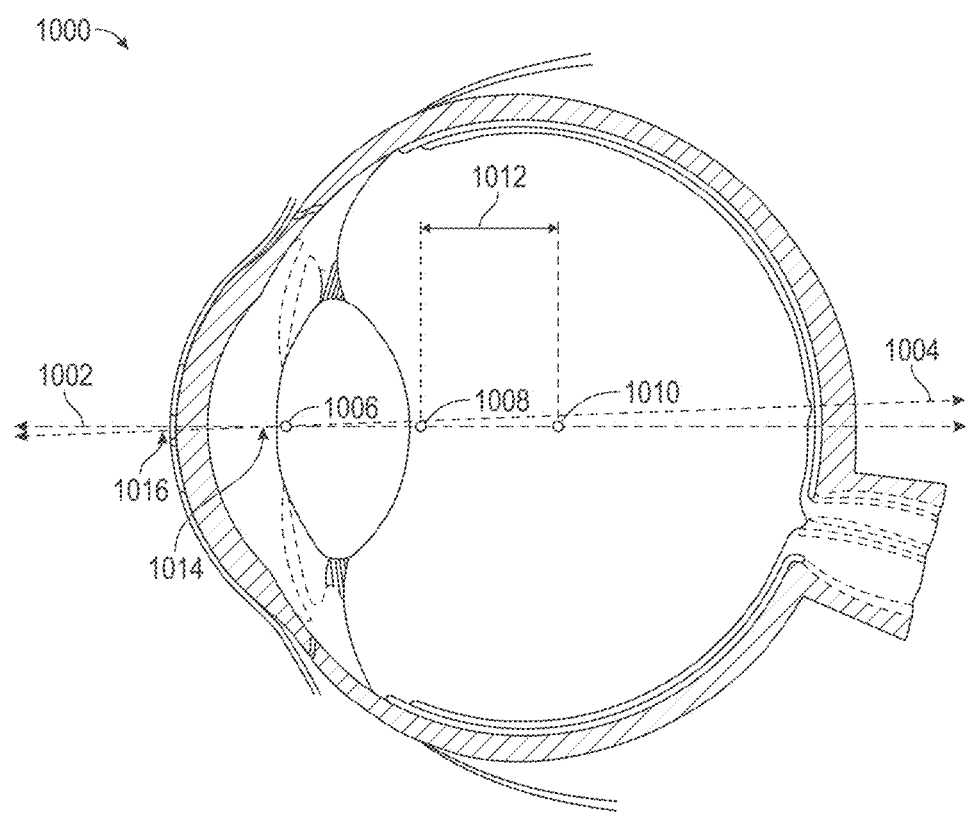
FIG. 10 illustrates an example of an eye including the eye's optical and visual axes and the eye's center of rotation.

As discussed in connection with optical to visual mapping module 730 of FIG. 7A, a user's optical and visual axes are generally not aligned, due in part to a user's visual axis being defined by their fovea and that foveae are not generally in the center of a person's retina. Thus, when a person desires to concentrate on a particular object, the person aligns their visual axis with that object to ensure that light from the object falls on their fovea while their optical axis (defined by the center of their pupil and center of curvature of their cornea) is actually slightly offset from that object. FIG. 10 is an example of an eye 1000 illustrating the eye's optical axis 1002, the eye's visual axis 1004, and the offset between these axes. Additionally, FIG. 10 illustrates the eye's pupil center 1006, the eye's center of cornea curvature 1008, and the eye's average center of rotation (CoR) 1010. In at least some populations, the eye's center of cornea curvature 1008 may lie approximately 4.7 mm in front, as indicated by dimension 1012, of the eye's average center of rotation (CoR) 1010. Additionally, the eye's center of perspective (CoP) 1014 may lie approximately 5.01 mm in front of the eye's center of cornea curvature 1008, about 2.97 mm behind the outer surface 1016 of the user's cornea, and/or just in front of the user's pupil center 1006 (e.g., corresponding to a location within the anterior chamber of eye 1000). As additional examples, dimension 1012 may between 3.0 mm and 7.0 mm, between 4.0 and 6.0 mm, between 4.5 and 5.0 mm, or between 4.6 and 4.8 mm or any ranges between any values and any values in any of these ranges. The eye's center of perspective (CoP) 1014 may be a useful location for the wearable system as, in at least some embodiments, registering a render camera at the CoP may help to reduce or eliminate parallax artifacts.

FIG. 10 also illustrates such a within a human eye 1000 with which the pinhole of a render camera can be aligned. As shown in FIG. 10, the pinhole of a render camera may be registered with a location 1014 along the optical axis 1002 or visual axis 1004 of the human eye 1000 closer to the outer surface of the cornea than both (a) the center of the pupil or iris 1006 and (b) the center of cornea curvature 1008 of the human eye 1000. For example, as shown in FIG. 10, the pinhole of a render camera may be registered with a location 1014 along the optical axis 1002 of the human eye 1000 that is about 2.97 millimeters rearward from the outer surface of the cornea 1016 and about 5.01 millimeters forward from the center of cornea curvature 1008. The location 1014 of the pinhole of the render camera and/or the anatomical region of the human eye 1000 to which the location 1014 corresponds can be seen as representing the center of perspective of the human eye 1000. The optical axis 1002 of the human eye 1000 as shown in FIG. 10 represents the most direct line through the center of cornea curvature 1008 and the center of the pupil or iris 1006. The visual axis 1004 of the human eye 1000 differs from the optical axis 1002, as it represents a line extending from the fovea of the human eye 1000 to the center of the pupil or iris 1006.

Figure 11:
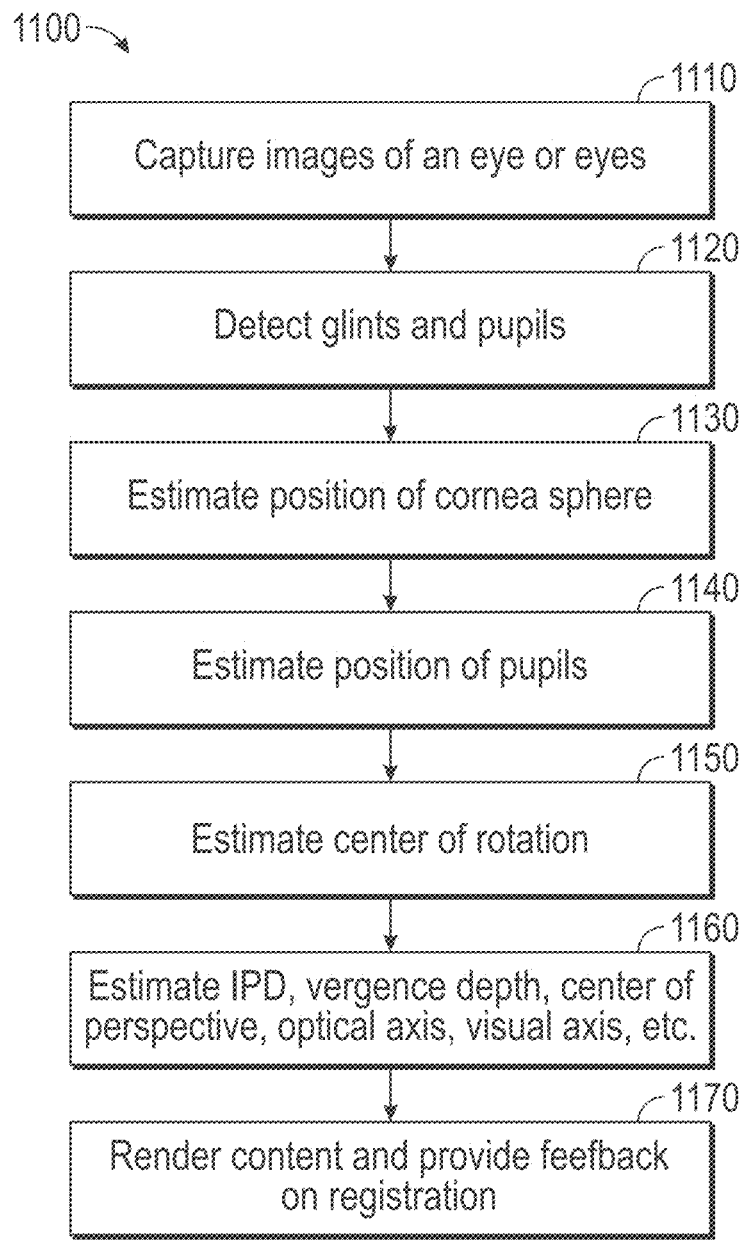
FIG. 11 is a process flow diagram of an example of a method for using eye tracking in rendering content and providing feedback on registration in a wearable device.

Example Processes of Rendering Content and Checking Registration based on Eye Tracking FIG. 11 is a process flow diagram of an example method 1100 for using eye tracking in rendering content and providing feedback on registration in a wearable device. The method 1100 may be performed by the wearable system described herein. Embodiments of the method 1100 can be used by the wearable system to render content and provide feedback on registration (i.e., fit of the wearable device to the user) based on data from an eye tracking system.

At block 1110, the wearable system may capture images of a user's eye or eyes. The wearable system may capture eye images using one or more eye cameras 324, as shown at least in the example of FIG. 3. If desired, the wearable system may also include one or more light sources 326 configured to shine IR light on a user's eyes and produce corresponding glints in the eye images captured by eye cameras 324. As discussed herein, the glints may be used by an eye tracking module 614 to derive various pieces of information about a user's eye including where the eye is looking.

At block 1120, the wearable system may detect glints and pupils in the eye images captured in block 1110. As an example, block 1120 may include processing the eye images by glint detection & labeling module 714 to identify the two-dimensional positions of glints in the eye images and processing the eye images by pupil identification module 712 to identify the two-dimensional positions of pupils in the eye images.

At block 1130, the wearable system may estimate the three-dimensional positions of a user's left and right corneas relative to the wearable system. As an example, the wearable system may estimate the positions of the center of curvature of a user's left and right corneas as well as the distances between those centers of curvature and the user's left and right corneas. Block 1130 may involve 3D cornea center estimation module 716 identifying the position of the centers of curvature as described herein at least in connection with FIGS. 7A and 8A-8E.

At block 1140, the wearable system may estimate the three-dimensional positions of a user's left and right pupil centers relative to the wearable system. As an example, the wearable system and 3D pupil center locator module 720 in particular, may estimate the positions of the user's left and right pupil centers as described at least in connection with FIGS. 7A and 9D-9G, as part of block 1140.

At block 1150, the wearable system may estimate the three-dimensional positions of a user's left and right centers or rotation (CoR) relative to the wearable system. As an example, the wearable system and CoR estimation module 724 in particular, may estimate the positions of the CoR for the user's left and right eyes as described at least in connection with FIGS. 7A and 10. As a particular example, the wearable system may find the CoR of an eye by walking back along the optical axis from the center of curvature of a cornea towards the retina.

At block 1160, the wearable system may estimate a user's IPD, vergence depth, center of perspective (CoP), optical axis, visual axis, and other desired attributes from eye tracking data. As examples, IPD estimation module 726 may estimate a user's IPD by comparing the 3D positions of the left and right CoRs, vergence depth estimation module 728 may estimate a user's depth by finding an intersection (or near intersection) of the left and right optical axes or an intersection of the left and right visual axes, optical axis determination module 722 may identify the left and right optical axes over time, optical to visual axis mapping module 730 may identify the left and right visual axes over time, and the CoP estimation module 732 may identify the left and right centers of perspective, as part of block 1160.

At block 1170, the wearable system may render content and may, optionally, provide feedback on registration (i.e., fit of the wearable system to the user's head) based in part on the eye tracking data identified in blocks 1120-1160. As an example, the wearable system may identify a suitable location for a render camera and then generate content for a user based on the render camera's location, as discussed in connection with light-field render controller 618, FIG. 7B, and render engine 622. As another example, the wearable system may determine if it is properly fitted to the user, or has slipped from its proper location relative to the user, and may provide optional feedback to the user indicating whether the fit of the device needs adjustment, as discussed in connection with registration observer 620. In some embodiments, the wearable system may adjust rendered content based on improper or less than ideal registration in an attempt to reduce, minimize or compensate for the effects of improper or mis-registration.

Example of a Registration Coordinate System

Figure 12A:
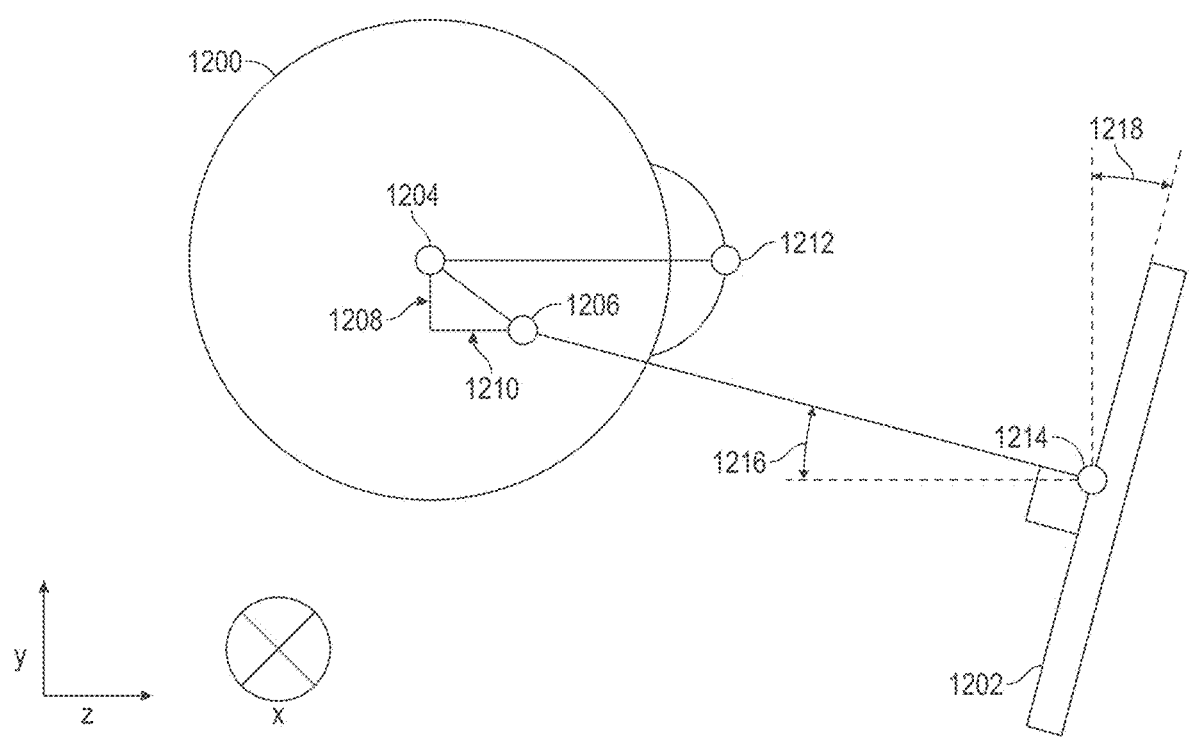
FIGS. 12A and 12B illustrate a nominal position of a display element relative to a user's eye and illustrate a coordinate system for describing the positions of the display element and the user's eye relative to one another.
Figure 12B:
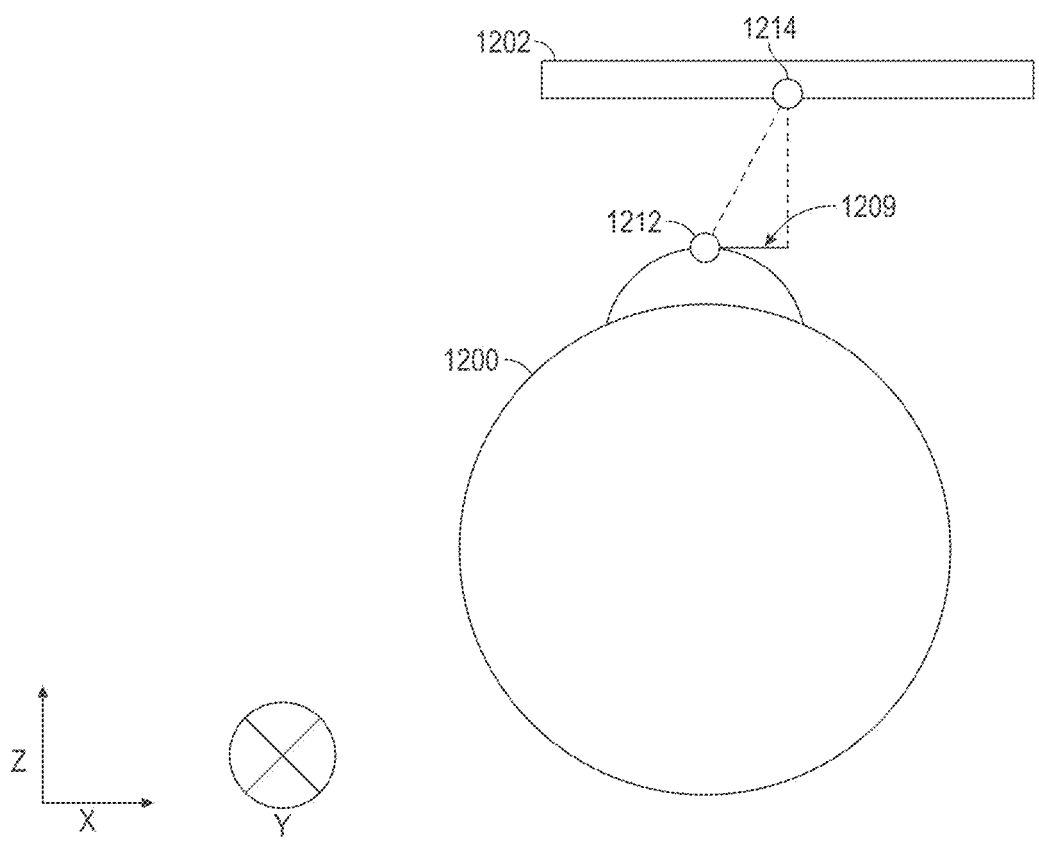

FIGS. 12A-12B illustrate an example eye position coordinate system, which may be used for defining three-dimensional positions of a user's left and right eyes relative to the display of the wearable system described herein. As examples, the coordinate system may include axis x, y, and z. Axis z of the coordinate system may correspond to depth, such the distance between the plane a user's eyes lie in and the plane that display 220 lies in (e.g., the direction normal to the plane of the front of a user's face). Axis x of the coordinate system may correspond to a left-right direction, such as the distance between the users left and right eyes. Axis y of the coordinate system may correspond to an up-down direction, which may be a vertical direction when the user is upright.

FIG. 12A illustrates a side view of a user's eye 1200 and a display surface 1202 (which may be a part of display 220 of FIG. 2), while FIG. 12B illustrates a top down view of the user's eye 1200 and the display surface 1202. Display surface 1202 may be located in front of the user's eyes and may output image light to the user's eyes. As an example, display surface 1202 may comprise one or more out-coupling light elements, active or pixel display elements, and may be part of a stack of waveguides, such as stacked waveguide assembly 480 of FIG. 4. In some embodiments, the display surface 1202 may be planar. In some other embodiments, the display surface 1202 may have other topologies (e.g., be curved). It will be appreciated that the display surface 1202 may be a physical surface of the display, or simply a plane or other imaginary surface from which image light is understood to propagate from the display 220 to the user's eyes.

As shown in FIG. 12A, the user's eye 1200 may have an actual position 1204 offset from a nominal position 1206 and the display surface 1202 may be at position 1214. FIG. 12A also illustrates the corneal apex 1212 of the user's eye 1200. The user's line of sight (e.g., their optical and/or visual axis) may be substantially along the line between the actual position 1204 and the corneal apex 1212. As shown in FIGS. 12A and 12B, the actual position 1204 may be offset from the nominal position 1206 by an z-offset 1210, a y-offset 1208, and an x-offset 1209. The nominal position 1206 may represent a preferred position (sometimes referred to as a design position, which may be generally centered within a desired volume) for the user's eye 1200 with respect to the display surface 1202. As the user's eye 1200 moves away from the nominal position 1206, the performance of display surface 1202 may be degraded, as discussed herein in connection with FIG. 14 for example.

It will be appreciated that a point or volume associated with the user's eye 1200 may be used to represent the position of the user's eye in analyses of registration herein. The representative point or volume may be any point or volume associated with the eye 1200, and preferably is consistently used. For example, the point or volume may be on or in the eye 1200, or may be disposed away from the eye 1200. In some embodiments, the point or volume is the center of rotation of the eye 1200. The center of rotation may be determined as described herein and may have advantages for simplifying the registration analyses, since it is roughly symmetrically disposed on the various axes within the eye 1200 and allows a single display registration volume aligned with the optical axis to be utilized for the analyses.

FIG. 12A also illustrates that the display surface 1202 may be centered below the user's horizon (as seen along the y-axis when the user is looking straight ahead, with their optical axis parallel to the ground) and may be tilted (with respect to the y-axis). In particular, the display surface 1202 may be disposed somewhat below the user's horizon such that the user would have to look downward, at approximately the angle 1216, to look at the center of the display surface 1202, when the eye 1200 is at position 1206. This may facilitate a more natural and comfortable interaction with the display surface 1202, particularly when viewing content rendered at shorter depths (or distances from the user), as users may be more comfortable viewing content below their horizon than above their horizon. Additionally, display surface 1202 may be tilted, such as at angle 1218 (with respect to the y-axis) such that, when the user is looking at the center of the display surface 1202 (e.g., looking slightly below the user's horizon), the display surface 1202 is generally perpendicular to the user's line of sight. In at least some embodiments, the display surface 1202 may also be shifted left or right (e.g., along the x-axis) relative to the nominal position of the user's eye. As an example, a left-eye display surface may be shifted rightwards and a right-eye display surface may be shifted leftwards (e.g., display surfaces 1202 may be shifted towards each other) such that the user's lines of sight hits the centers of the display surfaces when focused at some distance less than infinity, which may increase user comfort during typical usage on the wearable device.

Example Graphs of Rendering Content in Response to User Eye Movements

Figure 13:
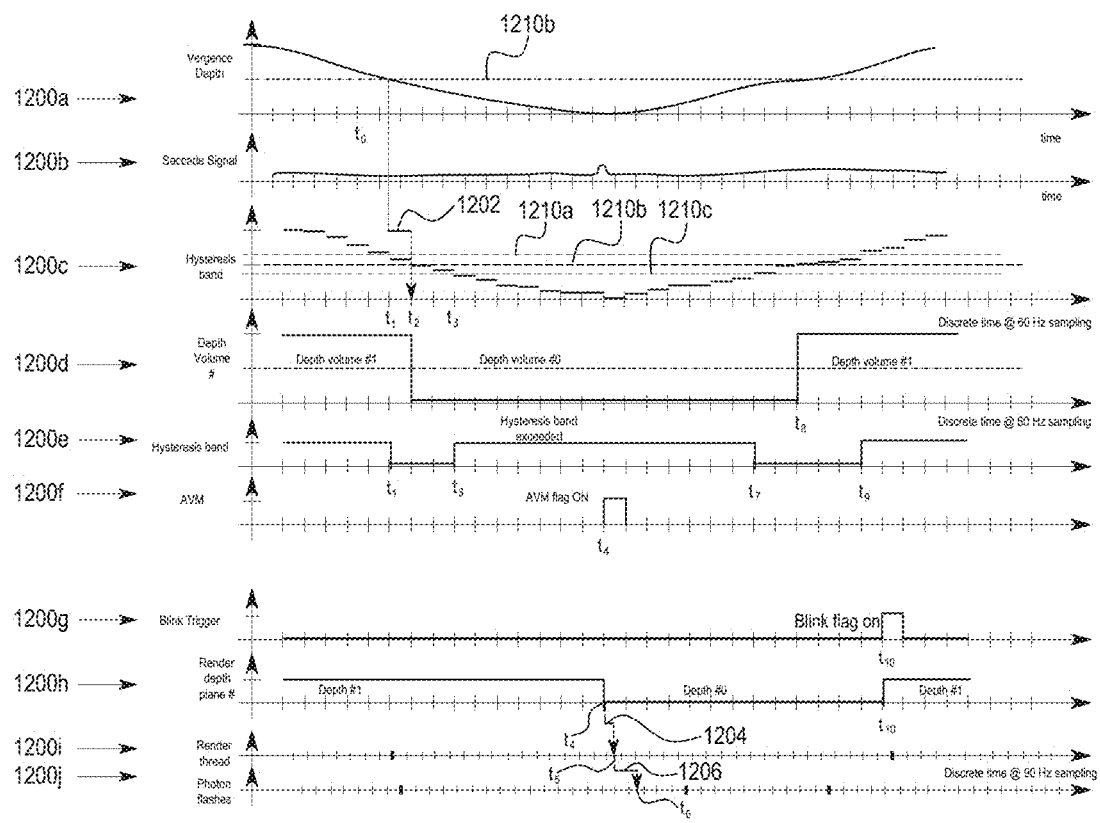
FIG. 13 is a set of example graphs illustrating how the wearable system may switch depth planes in response to the user's eye movements.

FIG. 13 includes a set of example graphs 1200a-1200j which illustrate how the wearable system may switch depth planes in response to the user's eye movements. As discussed herein in connection with FIGS. 4 and 7, the wearable system may include multiple depth planes, where the various depth planes are configured to present content to a user at a different simulated depth or with a different accommodation cue (i.e., with various levels of wavefront curvature or light ray divergence). As an example, the wearable system may include a first depth plane configured to simulate a first range of depths and a second depth plane configured to simulate a second range of depths and, while these two ranges may desirably overlap to facilitate hysteresis in switching, the second range of depths may generally extend to greater distances from the user. In such embodiments, the wearable system may track a user's vergence depth, saccade movements, and blinks to switch between the first and second depth planes in a manner that avoid excessive depth plane switching, excessive accommodation-vergence mismatches, and excessive periods of accommodation-vergence mismatch and that seek to reduce the visibility of depth plane switches (i.e., by shifting depth planes during blinks and saccades).

Graph 1200a illustrates an example of a user's vergence depth over time. Graph 1200b illustrates an example of a user's saccade signal or velocity of eye movements over time.

Graph 1200c may illustrate vergence depth data generated by eye tracking module 614 and, in particular, data generated by vergence depth estimation module 728. As shown in graphs 1200c-1200h, eye tracking data may be sampled within eye tracking module 614 at a rate of approximately 60 Hz. As shown between graphs 1200b and 1200c, eye tracking data within eye tracking module 614 may lag behind a user's actual eye movements by a delay 1202. As an example, at time $t_1$ a user's vergence depth may cross a hysteresis threshold 1210a, but the eye tracking module 614 may not recognize the event until time $t_2$ after delay 1202.

Graph 1200c also illustrates various thresholds 1210a, 1210b, 1210c in a hysteresis band, which may be associated with transitions between first and second depth planes (i.e., depth planes #1 and #0 in FIG. 13). In some embodiments, the wearable system may try to display content with depth plane #1 whenever a user's vergence depth is greater than threshold 1210b and to display content with depth plane #0 whenever a user's vergence depth is less than threshold 1210b. However, to avoid excessive switching, the wearable system may implement hysteresis, whereby the wearable system will not switch from depth plane #1 to depth plane #0 until the user's vergence depth crosses outer threshold 1210c. Similarly, the wearable system may not switch from depth plane #0 to depth plane #1 until the user's vergence depth crosses outer threshold 1210a.

Graph 1200d illustrates an internal flag that may be generated by depth plane selection module 750, or hysteresis band crossing detection module 752, indicating whether the user's vergence depth is in the volume generally associated with depth plane #1 or the volume generally associated with depth plane #2 (i.e., whether the user's vergence depth is greater or less than threshold 1210b).

Graph 1200e illustrates an internal hysteresis band flag that may be generated by depth plane section module 750, or hysteresis band crossing detection module 752, indicating whether a user's vergence depth has cross an outer threshold such as threshold 1210a or 1210c. In particular, graph 1200e illustrates a flag indicative of whether the user's vergence depth has completely crossed a hysteresis band and into a region outside of the active depth plane's volume (i.e., into a region associated with a depth plane other than an active depth plane), thus potentially leading to undesirable accommodation-vergence mismatch (AVM).

Graph 1200f illustrates an internal AVM flag that may be generated by depth plane selection module 750, or hysteresis band crossing detection module 752, indicating whether a user's vergence has been in outside of the active depth plane's volume for greater than a predetermined time. The AVM flag may therefore identify when the user may have been subjected to an undesirable accommodation-vergence mismatch for a nearly-excessive or excessive period of time. Additionally or alternatively, the internal AVM flag may also indicate whether a user's vergence has gone a predetermined distance beyond the active depth plane's volume, thus creating a potentially-excessive accommodation-vergence mismatches. In other words, the AVM flag may indicate when a user's vergence has exceeded an additional threshold even further from threshold 1210b than thresholds 1210a and 1210c.

Graph 1200g illustrates an internal blink flag that may be generated by ocular event detection module 754, which may determine when a user has or is blinking. As noted herein, it may be desired to switch depth planes upon user blink, to reduce the likelihood of the user perceiving the switch in depth planes.

Graph 1200h illustrates an example output from depth plane selection module 750. In particular, graph 1200h shows that depth plane selection module 750 may output an instruction to utilize a selected depth plane, which may change over time, to a render engine such as render engine 622 (see FIG. 6).

Graphs 1200i and 1200j illustrate delays that may be present in the wearable system including a delay by render engine 622 to switch depth planes and a delay by the display 220, which may need to provide light associated with a new image frame in a new depth plane to effectuate a change in depth planes.

Reference will now be made to the events illustrated in graphs 1200a-1200j at various times ($t_0$-$t_{10}$).

Sometime around time $t_0$, a user's vergence depth may cross threshold 1210a, which may be an outer hysteresis threshold. After a delay associated with image capture and signal processing, the wearable system may generate a signal, as indicated in graph 1200e, that indicates that the user's vergence depth lies within the hysteresis band. In the example of graph 1200e, the eye tracking module 614 may present a hysteresis band exceeded flag at approximately time $t_1$ in connection with the user's vergence depth crossing threshold 1210a.

The user's vergence depth may continue to decrease from time to until approximately time $t_4$ and may thereafter increase.

At time $t_1$, a user's vergence depth may cross threshold 1210b, which may be a midpoint between two depth planes such as depth planes #1 and #0. After processing delay 1202, eye tracking module 614 may alter an internal flag indicating that the user's vergence depth has moved from a volume generally associated with depth plane #1 into a volume generally associated with depth plane #0, as illustrated in graph 1200d.

At time $t_3$, the eye tracking module 614 may determine that the user's vergence depth, as shown in graph 1200a, has moved entirely through the hysteresis band and cross outer threshold 1210c. As a result, the eye tracking module 614 may generate a signal, as indicated in graph 1200e, that indicates that the user's vergence depth lies outside the hysteresis band. In at least some embodiments, the eye tracking module 614 may switch between first and second depth planes only when a user's vergence depth is outside of the hysteresis band between those two depth planes.

In at least some embodiments, the eye tracking module 614 may be configured to switch depth planes at time $t_3$. In particular, the eye tracking module 614 may be configured to switch depth planes based on a determination that the vergence depth has moved from the volume of the currently selected depth plane (depth plane #1 as indicated by graph 1200h) into the volume of another depth plane (depth plane #0) and entirely crossed a hysteresis band. In other words, the eye tracking module 614 may implement a depth plane switch whenever the hysteresis band is exceeded (graph 1200e is high) and an accommodation-vergence mismatch based on time or magnitude of mismatch is detected (graph 1200f is high). In such embodiments, the eye tracking module 614 may provide a signal to render engine 622 instructing render engine 622 to switch to the other depth plane (depth plane #0). In the example of FIG. 13, however, the eye tracking module 614 may be configured to delay depth plane switches until at least one other condition has been satisfied. These additional conditions may include, as examples, a blink condition, an accommodation-vergence mismatch timeout condition, and an accommodation-vergence magnitude condition.

At time $t_4$ and in the example of FIG. 13, the eye tracking module 614 may be configured to switch depth planes. In particular, eye tracking module 614 may determine that the user's vergence has been in the volume associated with depth plane #0 for longer than a predetermined threshold of time (and optionally, also outside of the hysteresis band for that period of time). Examples of predetermined thresholds of time include 5 seconds, 10 seconds, 20 seconds, 30 seconds, 1 minute, and 90 seconds and any range between any of these values. Upon such a determination, the eye tracking module 614 may generate an AVM flag, as indicated in graph 1200f, and direct render engine 622 to switch to depth plane #0, as indicated in graph 1200h. In some embodiments, the eye tracking module 614 may generate an AVM flag and direct render engine 622 to switch depth planes if the user's vergence depth is detected to be more than a threshold distance from the current selected depth volume.

At time $t_5$ and after delay 1204, the render engine 622 may start rendering content at the newly-selected depth plane #0. After a delay 1206 associated with rendering and conveying light to a user through the display 220, the display 220 may be fully switched to the newly-selected depth plane #0 by time $t_6$.

Thus, graphs 1200a-j illustrates, between times $t_0$ and $t_6$, how the system may respond to a user's changing vergence and may switch depth planes after the user's vergence has moved away from a prior depth volume for more than a predetermined period of time. Graphs 1200a-j, between times $t_0$ and $t_{10}$, may illustrate how the system responds to a user's changing vergence and may switch depth planes upon detection of the user blinking, which may be prior to the predetermined period of time.

At time $t_7$, the eye tracking module 614 may detect that the user's vergence depth has entered the hysteresis region between depth planes #0 and #1 (i.e., that the user's vergence depth has crossed outer threshold 1210c). In response, the eye tracking module 614 may alter a hysteresis flag as shown in graph 1200e.

At time $t_8$, the eye tracking module 614 may detect that the user's vergence depth has cross threshold 1210b and moved from the volume generally associated with depth plane #0 into the volume generally associated with depth plane #1. As such, the eye tracking module 614 may alter a depth volume flag, as shown in graph 1200d.

At time $t_9$, the eye tracking module 614 may detect that the user's vergence depth has crossed threshold 1210a and moved out of the hysteresis volume into the volume generally associated exclusively with depth plane #1. In response, the eye tracking module 614 may alter a hysteresis flag as shown in graph 1200e.

At around time $t_{10}$, the user may blink and the eye tracking module 614 may detect that blink. As one example, ocular event detection module 754 may detect a user's blink. In response, the eye tracking module 614 may generate a blink flag, as shown in graph 1200h. In at least some embodiments, the eye tracking module 614 may implement a depth plane switch whenever the hysteresis band is exceeded (graph 1200e is high) and a blink is detected (graph 1200g is high). Thus, the eye tracking module 614 may instruct render engine 622 to switch depth planes at time $t_{10}$.

Example Processes of Calibration of Depth Plane Selection

As discussed herein, a head-mounted display such as display 220 of FIG. 2 may include a plurality of depth planes, each of which provides a different amount of wavefront divergence to provide a different accommodation cue to a user's eyes. The depth planes may be formed from optical elements such the waveguides 432b, 434b, 436b, and 440b of FIG. 4, which may be configured to send image information to user's eyes with desired levels of wavefront divergence, as examples.

In at least some embodiments, the wearable system including display 220 may be configured to display image content having an accommodation cue based on the current fixation point or vergence depth of the user's gaze (e.g., to reduce or minimize accommodation-vergence mismatches). In other words, the wearable system may be configured to identify the vergence depth of the user's gaze (e.g., using vergence depth estimation module 728 of FIG. 7A, as an example) and then display image content on the depth plane that provides an accommodation cue associated with the current vergence depth. Thus, when a user is looking at optical infinity, the wearable system may display image content on a first depth plane that provides an accommodation cue of optical infinity. In contrast, when the user is looking in the near field (e.g., within a meter), the wearable system may display image content on a second depth plane that provides an accommodation cue within or at least closer to the near field.

As previously noted, vergence depth estimation, which may be performed by vergence depth estimation module 728 of FIG. 7A, may be based in part upon the interpupillary distance (IPD) of the current user. In particular and in some embodiments, determining the vergence depth may involve projecting the optical and/or visual axes of the user's left and right eyes (to determine their respective gazes) and determining where those axes intersect in space and thus where the user's fixation point or vergence depth is. Geometrically, the optical and/or visual axes are the legs of a triangle, where the base of the triangle is the user's IPD and the tip of the triangle is the user's fixation point or vergence depth. Thus, it should be understood that user's IPD is useful in determining the vergence depth.

In various embodiments, the wearable system may be calibrated to a particular main user. The calibration may include various processes and may include determining how the user's eyes move as the user focuses on objects at different locations and depths. The calibration may also include identifying the IPD of the user (e.g., the distance between the user's pupils when the user is focused on optical infinity). The calibration may also include determining the user's pupil distance when the user is focused at objects closer than optical infinity, such as an object in the near field (e.g., less than 2.0 meters) and objects in an intermediate field (e.g., between about 2.0 and 3.0 meters). Based on such calibration data, the wearable system may be able to determine the depth the user is looking at by monitoring the pupil distance of the user. In other words, when the user's pupil distance is at its maximum (e.g., is equal to or close to the user's IPD), the wearable system may be able to infer that the user's vergence distance is at or near optical infinity. In contrast, when the user's pupil distance is near its minimum, the wearable system may be able to infer that the user's vergence distance is close to the user, at a distance determined by the calibration.

In some embodiments, the wearable system may utilize one or more alternative processes for depth plane selection. As one example, the wearable system may implement a content-based switching scheme. It will be appreciated that virtual content may include information about the location in virtual space at which that content should be located. Given this location, the virtual content may effectively specify an associated amount of wavefront divergence. Consequently, rather than determining the fixation point of the user's eyes to switch depth planes (e.g., to switch the amount of wavefront divergence of light for forming the virtual object), the display system may be configured to switch depth planes based upon the desired location in virtual space in which to place virtual content.

In some embodiments, the wearable system may still make a determination as to whether the user is looking at the virtual content in order to switch to the depth plane specified for that virtual content. For example, the display system may still track a gaze of the user to determine whether they are looking at a virtual object, and once that determination is made, may use the depth information associated with the virtual content to determine whether to switch depth planes. As another example, the wearable system may identify the most likely real or virtual object that the user is looking at based on an assumption that the user would look at a particular real or virtual object. For example, the wearable system may present a video to the user on a 2D virtual screen 1 meter away from the user. While the user could be looking away from the screen at another object, it may be reasonable to assume that the user would be looking at the video screen. In some embodiments, the wearable system may be configured to make the assumption that the user is looking at real or virtual content that has movement or visible changes, or more movement or changes than other real or virtual content; for example, the wearable system may assign a score to movement or the amount of change in visual appearance by real or virtual content within the user's field of view and make the assumption that the user is looking at the real or virtual content with the highest score (e.g., the most movement or visual change, such as a virtual screen displaying a video).

Another example of an alternative depth plane selection process is dynamic calibration. Dynamic calibration may be beneficial when a current user has not (or has not yet) performed a dedicated calibration process. As an example, dynamic calibration may be utilized when a guest user is wearing the device. In one example of a dynamic calibration system, the wearable system may collect eye tracking data in order to estimate a current user's IPD and may then estimate the user's vergence depth using the estimated IPD (and their eye gaze directions as discussed in connection with module 728 of FIG. 7A). IPD estimation may be performed by IPD estimation module 726 of FIG. 7A and additional details and example embodiments are discussed herein in connection with module 726. Dynamic calibration may occur as a background process, requiring no specific action from users. In addition, dynamic calibration may continuously obtain samples or images of the user's eyes to further refine IPD estimates. As discussed in further detail below, the wearable system may estimate a user's IPD as the $95^{th}$ percentile (or other percentile) of all measured IPD values. In other words, the largest 5% of the measured IPD values may be excluded, and then the largest remaining measured IPD value may be taken as the user's IPD. An IPD value calculated in this manner may be referred to herein as IPD_95.

It will be appreciated that the display system may be configured to continually monitor IPD. As such, the number of samples or individual IPD measurements used to determine a value associated with a particular percentile may increase over time and potentially increase the accuracy of the IPD determination. In some embodiments, the IPD value (e.g., IPD 95) may be continually or periodically updated. For example, the IPD value may be updated after a predefined amount of time has elapsed and/or after a predefined number of individual IPD measurements has been made.

In some embodiments, a dynamic calibration process may seek to identify the user's IPD (e.g., the maximum pupil distance of the user, such as when the user is looking at optical infinity). In such embodiments, the wearable system may be able to calibrate depth plane selection based on the IPD alone.

As a particular example, it has been determined that if a user's pupil distance is reduced from their maximum IPD by 0.6 mm, the user is likely focused at a depth of approximately 78 mm. 78 mm may correspond to a switch point between depth planes in some embodiments disclosed herein (e.g., the system may prefer to utilize a first depth plane when the user is focused at less than 78 mm and utilize a second depth plane when the user is focused at greater than 78 mm). In embodiments with a switch point that occurs at a different depth of focus, the associated pupil distance reduction relative to their maximum IPD will change in relation to the change in the switch point (e.g., from 78 mm to whatever the switch point is in such embodiments).

In some instances, the wearable system may refine its calculation of the user's vergence depth by considering not just the difference between the user's current pupil distance and their maximum IPD, but also by considering how such relationships change in relation to the user's maximum IPD. In particular, the 0.6 mm number discussed above may be an average number that applies to a population as a whole and that takes into account various biases in the wearable system (e.g., on average, a user having a current pupil distance 0.6 mm less than their maximum IPD may be verging at a distance of 78 mm). However, the actual IPD difference (between maximum and current) associated with a vergence distance of 78 mm (or other switch point distance as discussed in the preceding paragraph) may be larger or greater than 0.6 mm and may be a function of the user's anatomical IPD. As particular examples, a person with an IPD of 54 mm may have a vergence distance of 78 mm when their current IPD is 0.73 mm less than their max IPD (e.g., their IPD when looking at distances of at least 10 meters), a person with an IPD of 64 mm may have a vergence distance of 78 mm when their current IPD is 0.83 mm less than their max IPD, and a person with an IPD of 72 mm may have a vergence distance of 78 mm when their current IPD is 0.93 mm less than their max IPD. These numbers may differ from the 0.6 mm number for a variety of reasons including, but not limited to, the 0.6 mm number does not distinguish between users with different IPDs and the 0.6 mm number may be in reference to an IPD_95 value (e.g., may be in reference to an IPD value that is actually slightly lower than the user's anatomical IPD when looking at optical infinity). In some embodiments, the 0.6 mm number may vary depending upon the user's max IPD. For example, a predefined number of the deviations from the 0.6 mm number may be available and may be associated with different ranges of max IPD values.

Using such relations, the wearable system may be able to determine the user's current vergence depth by comparing their maximum IPD with a current interpupillary distance (which may be reduced according to one or more mathematical functions as their vergence distance decreases). Determining the user's maximum IPD may involve, as an example, collecting a data on the user's IPD over time and identifying the maximum IPD within the collected data. In other embodiments, the wearable system may use heuristics or other processes to determine a user's maximum IPD even when the user does not look to optical infinity. In particular, the wearable system may extrapolate the user's maximum IPD from a plurality of pupil distances associated with closer vergence depth. The wearable system may also encourage the user to look at optical infinity by presenting virtual content at optical infinity and asking the user to focus their attention on the virtual content.

Figure 14:
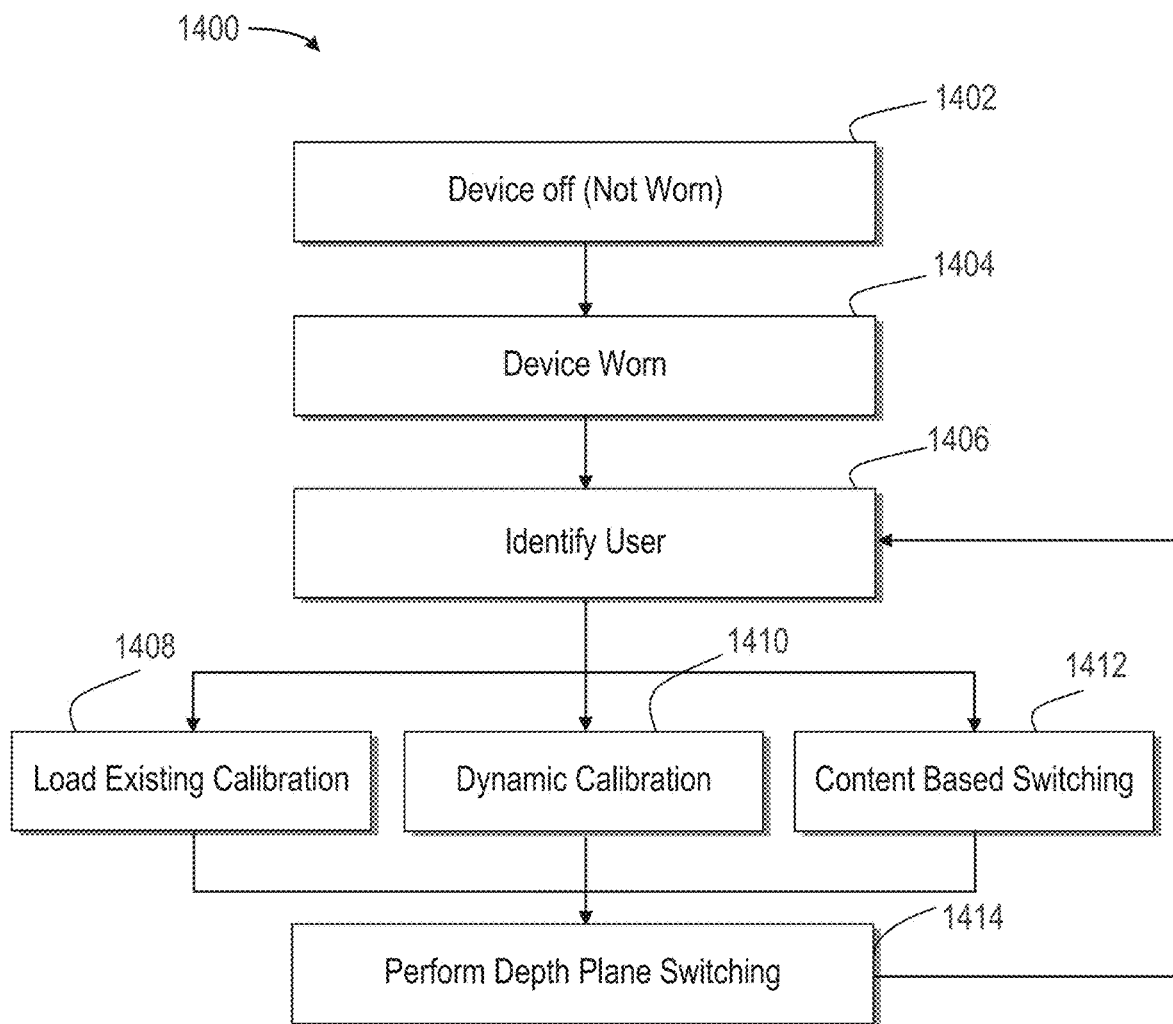
FIG. 14 is a process flow diagram of an example of a method for depth plane selection using an existing calibration, a dynamic calibration, and/or a content-based switching scheme.

FIG. 14 is a process flow diagram of an example method 1400 for depth plane selection using an existing calibration, a content-based switching scheme, and/or a dynamic calibration. The method 1400 may be performed by the wearable system described herein. Embodiments of the method 1400 can be used by the wearable system to render content on a depth plane that generally reduces or minimizes any vergence-accommodation mismatches, which could otherwise lead to user discomfort and fatigue.

At block 1402, the wearable system may determine that it is not being worn by a user. The wearable system may determine that it is not being worn using one or more sensors such as eye tracking systems like eye cameras 324. As an example, the wearable system may determine that it is not being worn by a user based on a determination there are no eyes in eye tracking images captured by eye cameras 324. In particular, the wearable system may determine, after failing to detect eyes in the eye tracking images for at least a given period of time (e.g., a predetermined period of time, a dynamically determined period of time, etc.), that the wearable system is not being worn by a user.

Upon detection of the one or more of the user's eyes in eye tracking images such as those captured by cameras 324, the method 1400 may move to block 1404. In block 1404, the wearable system may determine that it is being worn. In some embodiments, some or all of the determinations associated with block 1402 and/or block 1406 may be made based at least in part on data from one or more other sensors of the wearable system, such as IMUs, accelerometers, gyroscopes, proximity sensors, touch sensors, and the like. For example, in these embodiments, the wearable system may monitor data from one or more IMUs, accelerometers, and/or gyroscopes for an indication that the wearable system has been placed on or removed from the user's head, may monitor data from one or more proximity sensors and/or touch sensors to detect the physical presence of the user, or both. For example, the wearable system may compare data received from one or more of these sensors, and the wearable system may have threshold values associated with the respective sensors. In one example, the wearable system may then determine that the device has been removed from the user's head based upon values from one or more proximity sensors meeting or exceeding a threshold value, optionally in conjunction with data from IMUs, accelerometers, and/or gyroscopes indicating sufficient movement (e.g., exceeding a threshold value) to support the conclusion that the device has been removed.

At block 1406, the wearable system may attempt to identify the current user by performing an identification process. As one example, the wearable system may estimate the IPD of the current user to determine if the current user's IPD matches a calibrated user's IPD (e.g., if the two IPDs are within some threshold of each other). In some embodiments, the wearable system may determine that the current user is a calibrated user if the calibrated IPD and the current user's IPD are within a threshold of, e.g., 0.5 mm, 1.0 mm, 1.5 mm, or 2.0 mm, of the calibrated user's IPD. In general, larger thresholds may facilitate faster determinations and help to ensure that calibrated users are identified and their calibration parameters used; for example, larger thresholds are biased towards finding that the current user is the calibrated user. In at least some embodiments, the wearable system may be able to determine a current user's IPD with relatively high accuracy (e.g., 95%) within a relatively short time frame (e.g., 5-7 seconds of eye tracking data, which may correspond to between about 150 and 200 frames of eye tracking images).

If there is a match between the IPD of the current user and the IPD of the calibrated user, the wearable system may assume that the current user is the calibrated user and load an existing calibration at block 1408. The existing calibration may be calibration parameters or data generated during a calibration process with the calibrated user wearing the wearable system. In the event that the current user is not actually the calibrated user, but merely has a similar IPD, the calibration data loaded at block 1408 may be an acceptable calibration that provides reasonable performance for the current user, while allowing the current user to use the wearable system without performing a more detailed calibration.

In some embodiments, the wearable system may identify the current user using measures other than (or in addition to) the user's IPD. As examples, the wearable system may ask the user for a username and/or password, the wearable system may perform iris scanning (e.g., comparing a current image of the user's iris with a reference image to determine whether there is a match, with a match being interpreted to mean that the current user is a calibrated user), voice recognition (e.g., by comparing a current sample of the user's voice with a reference voice file, with a match being interpreted to mean that the current user is a calibrated user), or some combination of these and other authentication or identification techniques. In some embodiments, two or more identification processes may be performed to increase the accuracy of the determination of whether or not the current user is a calibrated user. For example, the current user may be assumed to be a calibrated user, but may be determined to not be a calibrated user if all of the performed identification processes failed to identify the current user as a calibrated user. As another example, the results from the various performed identification processes may be aggregated into a combined score and the current user may be assumed to be a calibrated user unless the combined score exceeds a predetermined threshold value.

In some embodiments, if the display system includes multiple calibration files for multiple users, then additional criteria may be needed to select the appropriate calibration file. For example, the user may be prompted to select the appropriate calibration file, and/or multiple ones of the identification schemes disclosed herein may be utilized.

In some embodiments, multiple identification schemes may be utilized to increase the accuracy of user identification. For example, it will be appreciated that IPD is a relatively coarse identification criteria. In some embodiments, IPD may be used as a first criteria to identify whether the current user is likely a calibrated user, and then a more precise or accurate identification scheme may be utilized (e.g., iris scanning). Such a multistep identification scheme advantageously may conserve processing resources since the more accurate identification scheme may be more resource intensive. Consequently, processing resources may be saved by delaying use of the more accurate resource-intensive identification scheme until the IPD determination indicates that a calibrated user is present.

With continued reference to FIG. 14, if the current user's IPD does not match the calibrated user's IPD, then the wearable may perform a dynamic calibration in block 1410. A dynamic calibration may, as discussed herein, involve monitoring eye tracking data to estimate how a user's interpupil distance changes as a function of their vergence distance. As one example, the dynamic calibration may involve estimating a user's maximum IPD and then using the maximum IPD together with a current interpupil distance to estimate a current vergence distance.

In block 1412, the wearable system may implement content-based switching. With content-based switching, depth plane selection is based on the depth of whatever virtual content the user is determined to be looking at (e.g., the most important or interesting content being displayed, which may be identified by content creators; based on a gaze of the user's eyes, etc.). In at least some embodiments, block 1412 may be performed whenever selected by content creators or other designers of the wearable system and regardless of whether or not the current user is a calibrated user. In various embodiments, content-based switching in block 1412 may be performed when there is no calibrated user. In such embodiments, block 1406 may be skipped, if desired. In addition, in some embodiments, the content-based switching of block 1412 may be performed whether or not block 1408 and/or 1410 (and blocks related to these blocks) are performed or available to the display system; for example, in some embodiments, the display system may perform only block 1412 for determining depth plane switching.

As described herein, each virtual object may be associated with location information, such as three-dimensional location information. The wearable system may present each virtual object to the user based on the location information. For example, the location information for a particular virtual object may indicate X, Y, and Z coordinates at which the object is to be presented (e.g., a center or centroid of the object may be presented at the coordinates). Thus, the wearable system may obtain information indicating a depth plane at which each virtual object is to be presented.

As will be described in more detail below with respect to FIGS. 16A-18, the wearable system may assign a respective volume of space (also referred to herein as a "zone" or marker) as surrounding each object. These volumes of space may preferably not overlap. The wearable system may identify a gaze of the user, and identify a zone which includes the user's gaze. For example, the gaze may indicate a three-dimensional location at which the user is fixating (e.g., an approximate three-dimensional location). The wearable system may then cause presentation of virtual content at a depth plane associated with the virtual object included in the identified zone. Thus, in some embodiments, once the display system makes a determination as to which object the user is looking at, switching between depth planes may occur based on the location or depth plane associated with virtual object rather than the fixation point of the user's eyes.

In block 1414, the wearable system may perform depth plane switching. The depth plane switching of block 1414 may be performed with the configuration parameters loaded or generated in blocks 1408, 1410, or 1412. In particular, if the current user is a calibrated user, then block 1414 may perform depth plane switching according to the configuration parameters generated during calibration with that user. If the current user is not identified as a calibration user and dynamic calibration was performed in block 1410, then block 1412 may involve depth plane switching according to calibration parameters generated in block 1410 as part of dynamic calibration. In at least some embodiments, the calibration parameters generated at block 1410 may be a user's IPD and the depth plane switching in block 1414 may be based on the user's IPD. If the wearable system is implementing content-based switching in block 1412 (which may occur when there is no calibrated user and/or when a content creator or user prefers to utilize content-based switching), the depth plane switching may be performed according to the depth of the content the user is assumed to be looking at.

With continued reference to FIG. 14, it will be appreciated that the display system may be configured to continually confirm the identity of the user. For example, after block 1414, the display system may be configured to return to block 1406 to identify the user. In some instances, the display system may lose track of a calibrated user that was previously detected at block 1406 to be wearing the display device. This may occur, for example, because the calibrated user has taken off the display device, or may be due to latency issues, or sensing errors that erroneously indicate that the display device is no longer being worn by the user, even where the calibrated user is still wearing the display device. In some embodiments, even when the display device detects that the calibrated user is no longer wearing the display device, the display system may continue to use the calibrated user's calibration profile for a predetermined amount of time or for a predetermined number of frames before switching to the content-based depth plane switching scheme or the dynamic calibration scheme of blocks 1412 and 1410, respectively. As discussed herein, the display system may be configured to continuously perform block 1406 and may continue to not detect the calibrated user. In response to determining that the calibrated user has gone undetected for the predetermined amount of time or the predetermined number of frames, then the system may switch to the content-based depth plane switching scheme or the dynamic calibration scheme of blocks 1412 and 1410, respectively. Advantageously, because the calibrated user is typically the most likely user of the display device, by continuing to use the calibrated user's calibration profile, the calibrated user may not experience a significant degradation in user experience in the event that the system erroneously fails to detect the calibrated user.

Figure 15:
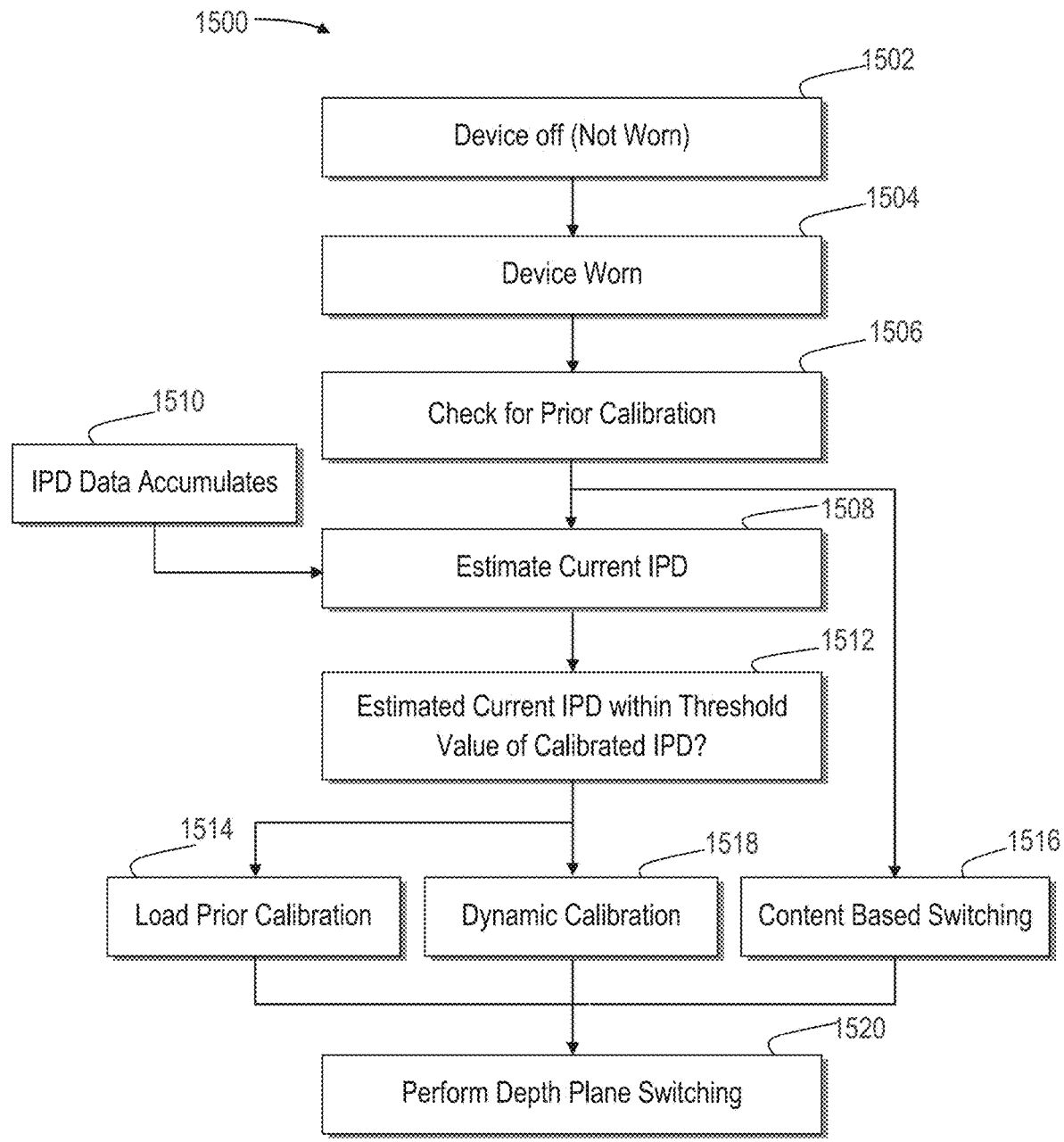
FIG. 15 is a process flow diagram of an example of a method for depth plane selection based at least partly on a user's interpupillary distance.

Another example of a method for depth plane selection is shown in FIG. 15. FIG. 15 is a process flow diagram of an example method 1500 for depth plane selection based on a user's interpupillary distance. The method 1500 may be performed by the wearable system described herein. Embodiments of the method 1500 can be used by the wearable system to render content on a depth plane that generally reduces or minimizes any vergence-accommodation mismatches, which could otherwise lead to user discomfort and fatigue.

At block 1502, the wearable system may determine that it is not being worn by a user. As an example, the wearable system may determine it is not being worn after failing to detect a user's eyes via eye tracking systems for more than a threshold period of time (such as 5 seconds, 10 seconds, 20 seconds, etc.).

At block 1504, the wearable system may determine that is it being worn by a user. The wearable system may determine it is being worn using one or more sensors. As an example, the wearable system may include a proximity sensor or a touch sensor that is triggered when the wearable system is placed on a user's head and may determine the system is being worn based on signals from such sensors. As another example, the wearable system may determine it is worn after identifying the presence of a user's eyes in eye tracking images. In some instances, the wearable system may be able to distinguish between 1) failure to detect a user's eyes because the user has shut their eyes and 2) failure to detect a user's eyes because the user has removed the wearable system. Thus, when the wearable system detects a user's closed eyes, the wearable system may decide the device is being worn. In some embodiments, some or all of the determinations associated with block 1502 and/or block 1504 may be similar to or substantially the same as those associated with block 1402 and/or block 1404 as described above with reference to FIG. 14, respectively.

At block 1506, the wearable system may check to see if it has been previously calibrated to any users. Block 1506 may involve, in various embodiments, obtaining the IPD of the calibrated user(s), as part of identifying whether or not the current user is the calibrated user (or one of the calibrated users, if there are multiple calibrated users). In some embodiments, the wearable system may implement content-based switching, as discussed herein, and may activate content-based switching at block 1516 if the wearable system has not been previously calibrated to any users (or if any such calibrations have been deleted or removed from the wearable system). The wearable system may also implement content-based switching for specific content and/or upon request by users or content creators. In other words, content creators or users may be able to specify or request the use of content-based switching, even when the wearable system has been previously calibrated and even when the wearable system has been calibrated for the current user.

At block 1508, the wearable system may estimate a current user's IPD and, at block 1510, the wearable system may accumulate eye tracking data on the current user's IPD. The IPD data accumulated in block 1510 may be measurements of the user's interpupil distance over time, measurements of the user's left and right centers of rotation of time, an indication of the maximum interpupil distance measured over time, or any other relevant data. In at least some embodiments, the wearable system may be able to determine a current user's IPD in block 1508 with relatively high accuracy (e.g., 95%) within a relatively short time frame (e.g., 5-7 seconds of eye tracking data, which may correspond to between about 150 and 200 frames of eye tracking images).

In some embodiments, the wearable system may estimate a user's IPD as a particular percentile (e.g., the $95^{th}$ percentile) of all IPD values collected (e.g., during dynamic calibration at block 1518 and/or during the accumulation of IPD data at block 1510). For example, for the $95^{th}$ percentile, the largest 5% of the measured IPD values may be excluded, and then the largest remaining measured IPD value may be taken as the user's IPD. The IPD value calculated in this manner may be referred to herein as IPD_95. One benefit of calculating a user's IPD value in this manner is that outlying values, which may be greater than the user's anatomical IPD, can be excluded. Without being limited by theory, it is believed that with there is a sufficient number of measured IPD values near or at the user's anatomical IPD that the IPD_95 value to accurately reflects the user's anatomical IPD. As an example, if roughly 10% of the IPD measures are close to the user's anatomical IPD, then the IPD_95 value should still reflect the user's anatomical IPD value even though the largest 5% values were excluded. If desired, other IPD calculations, which may involve excluding a different percentage of the largest measured IPD values may be used. As examples, an IPD_100 value may be used in which no IPD values are excluded or an IPD_98 value may be used in which only the largest 2% of values are excluded (which may be preferable in a system with eye tracking systems that produce relatively few outlying IPD measurements). As additional examples, an IPD_90 value may be used, an IPD_85 value may be used, or other IPD value with a desired percentage of the measured values excluded.

At block 1512, the wearable system may determine if the estimated IPD of the current user is within a threshold value of the IPD of the calibrated user (or of one of the IPDs of one of the calibrated users, if there are multiple such users). The threshold value may be, as examples, 0.5 mm, 1.0 mm, 1.5 mm, 2.0 mm, or 2.5 mm. As one particular example, the threshold value may be 1.0 mm, which may be sufficiently large that a calibrated user is recognized as a calibrated user quickly and accurately, while non-calibrated users can generally be identified as non-calibrated users. In general, it may be preferable to falsely identify non-calibrated users as calibrated users, than to risk failing to identify calibrated users as calibrated users. In other words, false negatives in user identification for calibration may be worse than false positives, as the desire for optimal performance for calibrated users may outweigh minor sacrifices for non-calibrated or guest users, and as the calibrated users may be more likely or more frequent users of a given display system.

If the current user's IPD is within the threshold of the calibrated user's IPD, the wearable system may assign the current user as the calibrated user and may load the associated calibration parameters in block 1514. As an example, the calibration parameters loaded in block 1514 may include the calibrated user's IPD, a visual-optical axis offset parameter, and other available calibration parameters.

If the current user's IPD is not within the threshold of the calibrated user's IPD, the wearable system may assume that the current user is a guest user and may perform dynamic calibration in block 1518 (or content-based switching in block 1516). At block 1518, the wearable system may activate dynamic calibration (e.g., dynamically generate calibration parameters), which may include an on-the-fly calibration based on the estimated IPD of the current user, as discussed herein.

At block 1516, the wearable system may implement content-based switching under circumstances as discussed herein, such as when no prior calibration data is available. At this block, as discussed herein, depth plane selection may be made according to the depth associated with virtual content being displayed as opposed to tracking the vergence depth of the user. Content-based depth plane switching is further discussed regarding FIGS. 16-17B.

In block 1520, the wearable system may perform depth plane switching. The depth plane switching of block 1520 may be performed with the configuration parameters loaded or generated in blocks 1514, 1516, or 1518. In particular, if the current user is a calibrated user, then block 1520 may perform depth plane switching according to the configuration parameters generated during calibration with that user. If the current user is not identified as a calibration user and dynamic calibration was performed in block 1518, then block 1520 may involve depth plane switching according to calibration parameters generated in block 1520 as part of dynamic calibration. In at least some instances, the calibration parameters generated at block 1518 may be a user's IPD and the depth plane switching in block 1520 may be based on the user's IPD. If the wearable system is implementing content-based switching in block 1516 (which may occur when there is no calibrated user and/or when a content creator or user selects utilization of content-based switching), the depth plane switching of block 1520 may be performed according to the depth of the content the user is determined to be looking at.

Content-Based Switching

As described herein, the wearable system may present virtual content via a particular depth plane. As the virtual content is updated, for example as virtual objects move and/or are replaced with different virtual objects, the wearable system may select different depth planes at which to the present the virtual content. As additional nonlimiting examples, as a user of the wearable system focuses on different virtual objects, or at different locations with the user's field of view, the wearable system may select different depth planes at which to present the virtual content.

An example scheme to select a depth plane, referred to herein as content-based switching, is further discussed below with reference to FIGS. 16A-17B. In content-based switching, the wearable system may select a depth plane at which to present virtual content-based on a determination of which virtual object the user is likely looking. In some embodiments, this determination may be made depending on whether the user is fixating within a particular zone. For example, the wearable system may associate a zone with each virtual object to be presented as virtual content to the user. A zone may be, for example, a volume of space surrounding a virtual object. The volume of space may be a sphere, cube, hyperrectangle, pyramid, or any arbitrary three-dimensional polygon (e.g., a polyhedron). As will be described, the zones are preferably non-overlapping and, thus, the space encompassed by each zone may only be associated with a single virtual object.

In some embodiments, the wearable system may monitor a gaze of the user, for example, to identify locations at which the user is viewing (e.g., within the user's field of view). For an example gaze, the wearable system may identify a zone which includes a location being viewed by the user. In this example, having identified the zone and having only one virtual object in that zone, the wearable system may select a depth plane corresponding to the virtual object included in the identified zone. The wearable system may then present the virtual content at the selected depth plane, which is the depth plane associated with the virtual object.

Advantageously, the wearable system may utilize higher latency eye tracking, or otherwise less accurate eye tracking schemes than may be required if depth plane switching were dependent upon accurately determining the depth of the fixation point. In some embodiments, for scenarios with multiple virtual objects displayed at disparate depths, statistical probability or spatial correlation may be utilized to distinguish what content a user is likely to be observing or directing attention to. Thus, the wearable system may determine a fixation area or fixation volume (e.g., rather than a precise fixation point), and select a depth plane based on the fixation area or volume. In some embodiments, weighted factors such as a last application utilized, or degree to which the user's gaze changed, can adjust the statistical probability and, thus, the size/shape of the zone. In some embodiments, the size/shape of the zone is correlated with the statistical probability that a user is fixating within a particular volume; for example, where there is a large amount of uncertainty (e.g., where the uncertainty exceeds a threshold due to noise, low tolerances in the eye-tracking system, the tracking particulars of an application that was most-recently used, the speed of changes in the user's gaze, etc.) the size of the zone may increase, and where there is less uncertainty, the size of the zone may decrease.

As will be described in FIG. 16A, in some embodiments, the zones may encompass a respective angular distance (e.g., extending from a user's eyes to an infinite distance from the user). In this example, the wearable system may therefore require accuracy only sufficient to place the user's gaze within particular portions of an X and Y plane.

In some embodiments, the display system may transition from performing content-based depth plane switching to performing depth plane switching based on a dynamic calibration. Such a transition may occur, for example, when data obtained for performing the content-based depth plane switching scheme is determined to be unreliable, or where content is provided at a range of different depths spanning multiple depth planes. As noted herein, the amount of calculated uncertainty in the determination of the zone in which a user fixating may vary based on various factors such noise, tolerances of the eye-tracking system, the tracking particulars of an application that was most-recently used, the speed of changes in the user's gaze, etc. In some embodiments, the display system may be configured to transition to depth plane switching based on dynamic calibration when the uncertainty (e.g., the uncertainty associated with determining a position of a user's fixation point) exceeds a threshold value. In some other embodiments, particular virtual content may span across multiple depth planes. For content spanning across a threshold number of depth planes (e.g., three depth planes), the display system may be configured to transition to depth plane switching based on dynamic calibration.

In some embodiments, the display system may be configured to transition performing content-based depth plane switching to performing depth plane switching based on dynamic calibration in response to determining that the uncertainty associated with the depth of virtual content exceeds a threshold value. For example, the display system may determine that the depth or location information for virtual content that is being made available by a particular application that is running on the display system is relatively unreliable (e.g., the particular application indicates that the depth or location of mixed reality virtual content relative to the user is static even when the user's position changes or the user moves beyond a predetermined level of position change or movement, respectively) and, in turn, may transition to depth plane switching based on dynamic calibration. Such a transition may facilitate a more comfortable and/or realistic viewing experience.

Although described primarily within the context of depth plane switching, it is to be understood that one or more of the techniques described herein with reference to FIG. 14 and/or FIG. 15 may be leveraged in any of a variety of different display systems that are capable of outputting light to an eye of a user with different amounts of wavefront divergence. For example, in some embodiments, one or more of the techniques described herein with reference to FIG. 14 and/or FIG. 15 may be leveraged in a head-mounted display system that includes one or more variable focus elements (VFEs). For example, one or more of the lenses 458, 456, 454, 452 (FIG. 4) may be VFEs, as discussed herein. In these embodiments, the head-mounted display system may control operation of its one or more VFEs in real-time based at least in part on whether a wearer of the head-mounted display system is determined to be a calibrated user or a guest user. That is, the head-mounted display system may control or adjust an amount of wavefront divergence with which light is output to the wearer (the focal distance of the light) based at least in part on whether a wearer of the head-mounted display system is determined to be a calibrated user or a guest user. Examples of architectures and control schemes for variable focus eyepieces are disclosed in U.S. Publication No. 2016/0110920, published Apr. 21, 2016 and in U.S. Publication No. 2017/0293145, published Oct. 12, 2017, each of which is incorporated by reference herein in its entirety. Other configurations are possible.

Figure 16A:
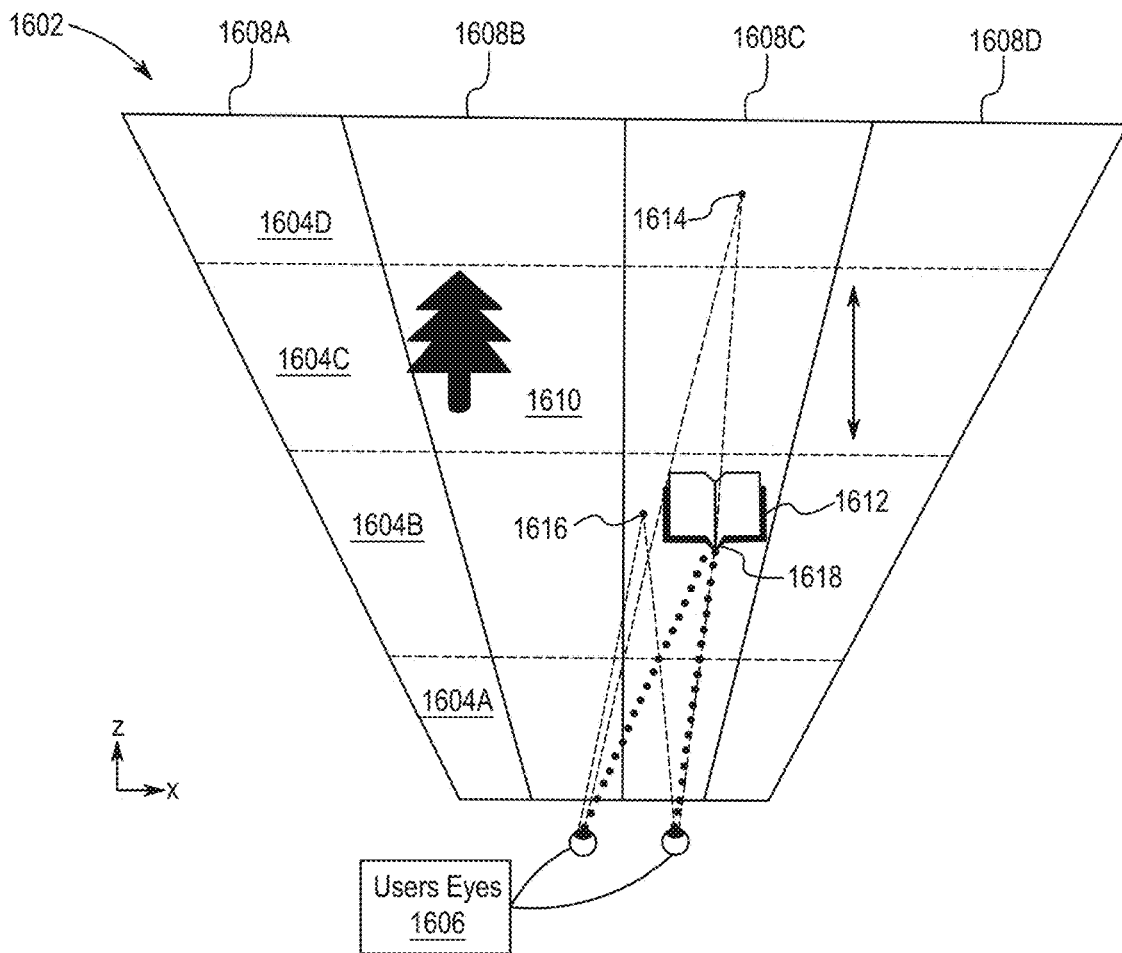
FIG. 16A illustrates an example of a top-down view of a representation of a user viewing content presented by a display system configured to switch depth planes by detecting user fixation within one of a plurality of zones that segment the user's field of view along the horizontal axis.

FIG. 16A illustrates a representation of a user's field of view 1602. The user's field of view 1602 (a three-dimensional frustum in the illustrated embodiment) may include a plurality of depth planes 1604A-D extending in a z-direction from the user's eyes 1606. The field of view 1602 may be separated into different zones 1608A-D. Each zone may therefore encompass a particular volume of space included in the field of view 1602. In this example, each zone encompasses a volume of space that preferably includes all of the different depth planes 1604A-D. For example, zone 1608A may extend along the z-direction from the user's eyes 1606 to, for example, an infinite distance from the eyes 1606. Along an orthogonal direction, such as the x-direction, zone 1608A may extend from an extremity of the field of view 1602 until the border between zones 1608A and 1608B.

In the illustrated embodiment, zone 1608B includes tree virtual object 1610. Tree virtual object 1610 is illustrated as being presented at depth plane C 1604C. For example, the tree virtual object 1610 may be associated with location information (e.g., stored, or otherwise accessible to, the wearable system). As described above, this location information may be utilized to identify a three-dimensional location at which the tree virtual object 1610 is to be presented. As illustrated, the display system may also display a book as virtual object 1612. Zone 1608C includes the book virtual object 1612. Thus, the wearable system is presenting virtual content comprising the tree virtual object 1610 and the book virtual object 1612.

The user's eyes 1606 may move about the field of view 1602, for example fixating on, or viewing, different locations with the field of view 1602. If the user's eyes 1606 fixate on the tree virtual object 1610, or on the depth plane C, the wearable system may determine to select depth plane C 1604C to present the virtual content. Similarly, if the user's eyes 1606 fixate on the book virtual object 1612, more on the depth plane B, the wearable system may determine to select depth plane B 1604B to present the virtual content. As described in, at least, FIG. 14, the wearable system may utilize different schemes to cause selection of depth planes.

With respect to content-based switching, the wearable system may identify a zone which includes a location being fixated upon by the user's eyes 1606. The wearable system may then select a depth plane corresponding to the virtual object included in the identified zone. For example, FIG. 16A illustrates an example fixation point 1614. The wearable system may determine, based on the user's eyes 1606, that the user is viewing fixation point 1614. The wearable system may then identify that fixation point 1614 is included in zone 1608C. Since this zone 1608C includes the book virtual object 1612, the wearable system may cause presentation of the virtual content at depth plane C 1604C. Without being limited by theory, this is believed to provide a comfortable viewing experience, since the only virtual object that may be fixate upon in the zone 1608C is the book virtual object 1612 and, as such, it would be appropriate to switch to the depth plane of that book virtual object 1612.

Consequently, if the user adjusts fixation to fixation point 1616 or 1618, the wearable system may maintain presentation at depth plane C 1604B. However, if the user adjusts fixation to within zone 1608B, the wearable system may select depth plane C 1604C at which the present the virtual content. While the example of FIG. 16A includes four zones, it should be understood that fewer zones, or a greater number of zones, may be utilized. Optionally, the number of zones may be the same as the number of virtual objects, with a unique zone for each virtual object, and, in some embodiments, the number of zones may vary dynamically as the number virtual objects changes (preferably so long as the zones can extend from the front to the back of the display frustum without more than one object occupying the same zone e.g., without two or more objects being roughly in the same line of sight relative of the user). For example, two zones may be utilized in the example of FIG. 16A, which has two virtual objects that do not have overlapping lines of sight to the user. Optionally, the wearable system may dynamically adjust a volume of space encompassed by each zone. For example, as accuracy of gaze detection increases or decreases the volumes of space may be increased, decreased, or the zones adjusted in number.

Figure 16B:
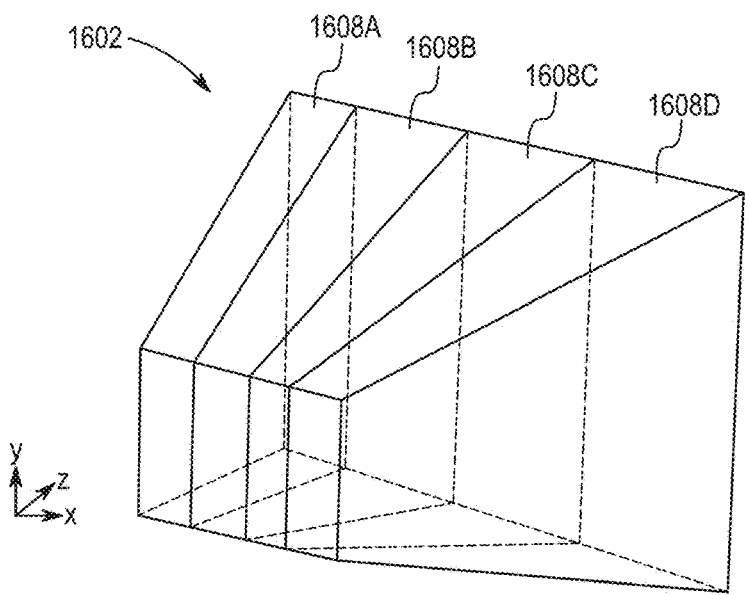
FIG. 16B illustrates an example of a perspective view of the representation of FIG. 16A.

FIG. 16B illustrates an example, shown in perspective view, of the volume of space encompassed by each zone of FIG. 16A. As illustrated, each zone 1608A, 1608B, 1608C, and 1608D extends from the front of the display frustum 1602 to the back in the z-direction. As illustrated, on the x-y axis, the zones extend vertically to segment or divide the field of view along the x-axis. In some other embodiments, on the x-y axis, the zones may extend horizontally to segment the field of view along the y-axis. In such embodiments, the illustrated frustum may be effectively rotated 90° on the x-y plane. In yet other embodiments, on the x-y axis, the zones may segment or divide the field of view on both the x and the y axes, thereby forming a grid on the x-y axis. In all these embodiments, each zone still preferably extends from the front to the back of the display frustum 1602 (e.g., from the nearest plane that display system may display content to the furthest plane).

Figure 17A:
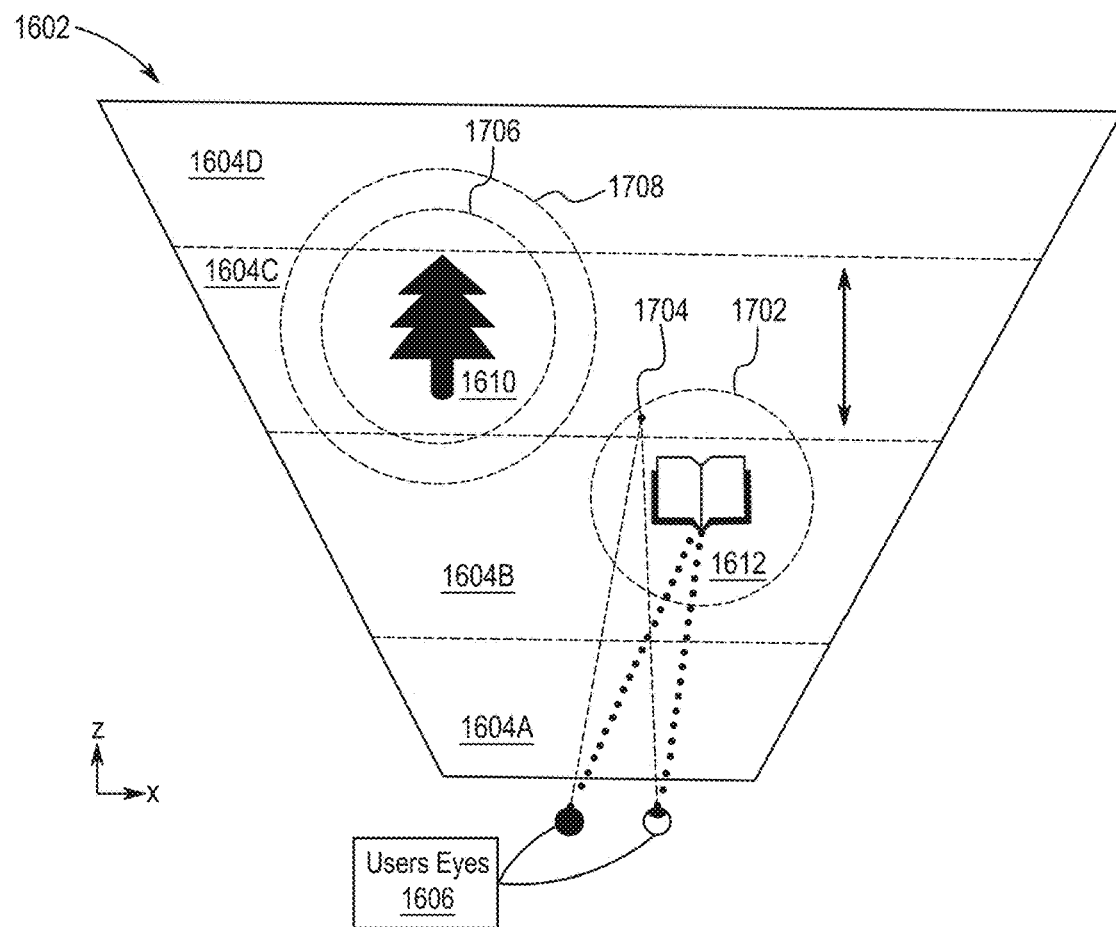
FIG. 17A illustrates an example of a top-down view of a representation of a user viewing content presented by a display system configured to switch depth planes by detecting user fixation within discrete marker volumes within the display frustum.

FIG. 17A illustrates another representation of a user's field of view 1602 for content-based switching. In the example of FIG. 17A, as in FIG. 16A, the user's field of view 1602 includes depth planes A-D 1604A-D. However, the volume of space associated with each virtual object is different from that of FIGS. 16A-B. For example, the zone 1702 in which book virtual object 1612 is located is illustrated as encompassing an enclosed shape, such as a spherical volume of space, a cylindrical volume of space, a cube, a polyhedron, etc. Preferably, the zone 1702 extends, on the z-axis, less than the entire depth of the display frustum 1602. Advantageously, such an arrangement of zones allows differentiation between objects that may be in similar lines of sight to the user.

Optionally, the wearable system may adjust the zones of FIG. 17A based on the eye tracking accuracy exceeding one or more thresholds. For example, the sizes of the zones may decrease as confidence in tracking accuracy increases. As another example, it will be appreciated that each virtual object has an associated zone. The wearable system may adjust the zones of FIG. 17A to avoid overlapping zones. For example, if a new virtual object is to be displayed within a zone corresponding to a different virtual object, then the zones for one or both virtual objects may be decreased in size to avoid overlap. For example, if the book virtual object 1612 in FIG. 17A is moved in front of the tree virtual object 1610 (e.g., in zone 1608A), the wearable system may adjust the zones in FIG. 17A to adhere closer to the virtual objects (e.g., as illustrated in FIG. 17A) to prevent overlap.

With continued reference to FIG. 17A, the tree virtual object 1610 is illustrated as being included in a first zone 1706 and a second zone 1708. Optionally, the first zone 1706 may represent a relatively small volume of space surrounding the tree virtual object 1610. The second zone 1708 may represent a current volume of space surrounding the tree virtual object 1610. For example, as virtual objects move around within the field of view 1602, the volume of space encompassed by a zone may be adjusted (e.g., in real-time). In this example, the adjustment may ensure that each zone does not overlap with any other zone. Thus, if the book virtual object 1612 moves closer to the tree virtual object 1610, the wearable system may reduce the volume of space of the zone surrounding the tree virtual object 1610, the book virtual object 1612, or both. For example, the second zone 1708 may be reduced to be closer in volume to the first zone 1706.

Figure 17B:
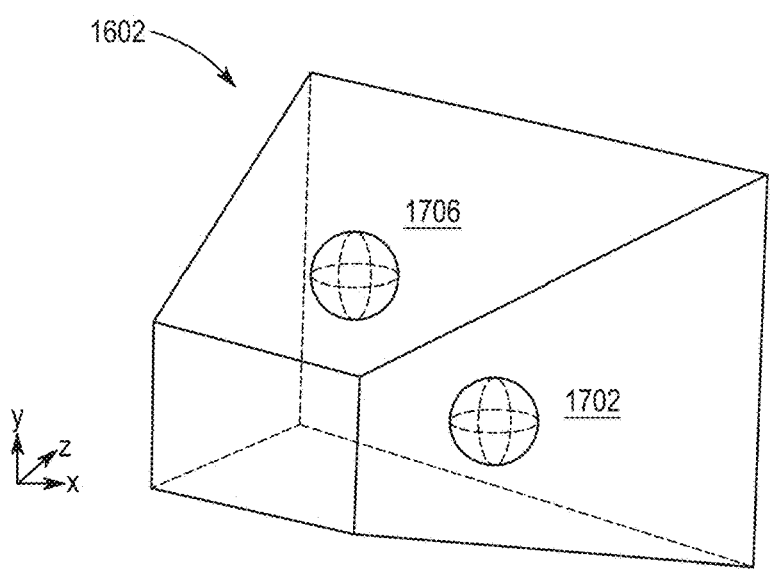
FIG. 17B illustrates an example of a perspective view of the representation of FIG. 16A.

As noted herein, in content-based depth plane switching, the depth plane associated with a virtual object governs, rather than the fixation point. As example of this is illustrated with respect to fixation point 1704. As illustrated, the example zone 1702 of the book virtual object 1612 may encompass a volume of space which includes a portion defined by depth plane B 1604B and depth plane 1604C. In some cases, the wearable system determines that the user is fixating at point 1704 in depth plane C, and also identifies this fixation point 1704 as being included in zone 1702. Because the depth plane associated with the book virtual object 1612 governs the depth plane switching, the wearable system switches to the depth plane B of the book virtual object 1612 rather than the depth plane C of the fixation point 1704. FIG. 17B illustrates an example of a perspective view of the representation of FIG. 17A.

Figure 18:
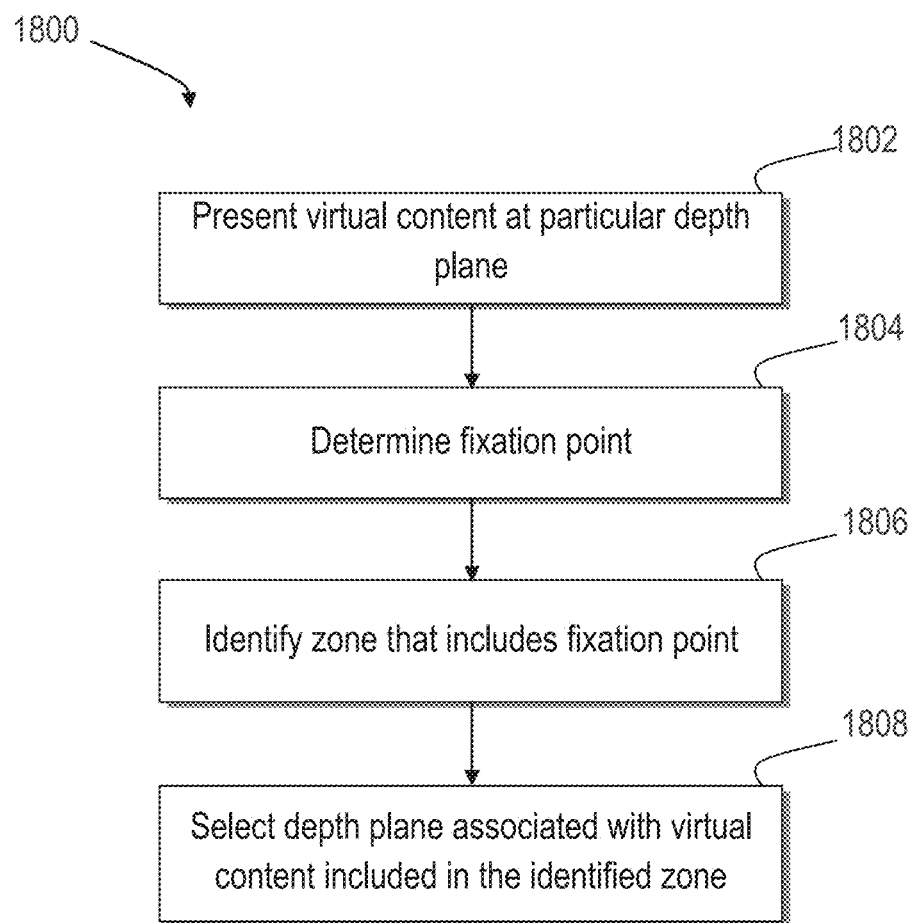
FIG. 18 illustrates a flowchart of an example process to select a depth plane based on content-based switching.

FIG. 18 illustrates a flowchart of an example process to select a depth plane based on content-based switching. For convenience, the process 1800 will be described as being performed by a wearable system of one or more processors (e.g., the wearable system, such as wearable system 200, described above).

At block 1802, the wearable system presents virtual content at a particular depth plane. As described above, depth planes may be utilized to provide accommodation cues to a user of the wearable system. For example, each depth plane may be associated with an amount of wavefront divergence of light presented by the wearable system to the user. The virtual content may comprise one or a plurality of virtual objects.

At block 1804, the wearable system determines a fixation point. The wearable system may utilize sensors, such as cameras, to estimate a three-dimensional location at which the user is fixating. These cameras may update at a particular rate, such as 30 Hz, 60 Hz, and so on. The wearable system may determine vectors extending from the user's eyes (e.g., from the center or pupil of the eye), and estimate a three-dimensional location at which the vectors intersect. In some embodiments, the fixation point may be estimated based on IPD, with a predefined change in IPD from a maximum IPD being assumed to correlate with fixation at a particular depth plane. In addition, optionally in addition to IPD, the gaze of the user may be determined to further locate the approximate position of the fixation point. This estimated location may have certain error associated with it, and the wearable system may therefore determine a volume of space in which the fixation point likely lies relative to virtual content.

At block 1806, the wearable system identifies a zone that includes the fixation point. As discussed regarding FIGS. 16A-17B, the wearable system may associate a zone with each virtual object. For example, a zone may include a particular (e.g., single) virtual object. Preferably, the zones for different virtual objects do not overlap.

At block 1808, the wearable system selects a depth plane associated with virtual content included in the identified zone. The wearable system may identify the virtual content associated with the zone identified in block 1806. The wearable system may then obtain information indicating a depth plane at which the virtual content is to be presented. For example, the virtual content may be associated with location information, indicating a three-dimensional location. The wearable system may then identify a depth plane associated with the three-dimensional location. This depth plane may be selected to present the virtual content.

Figure 19:
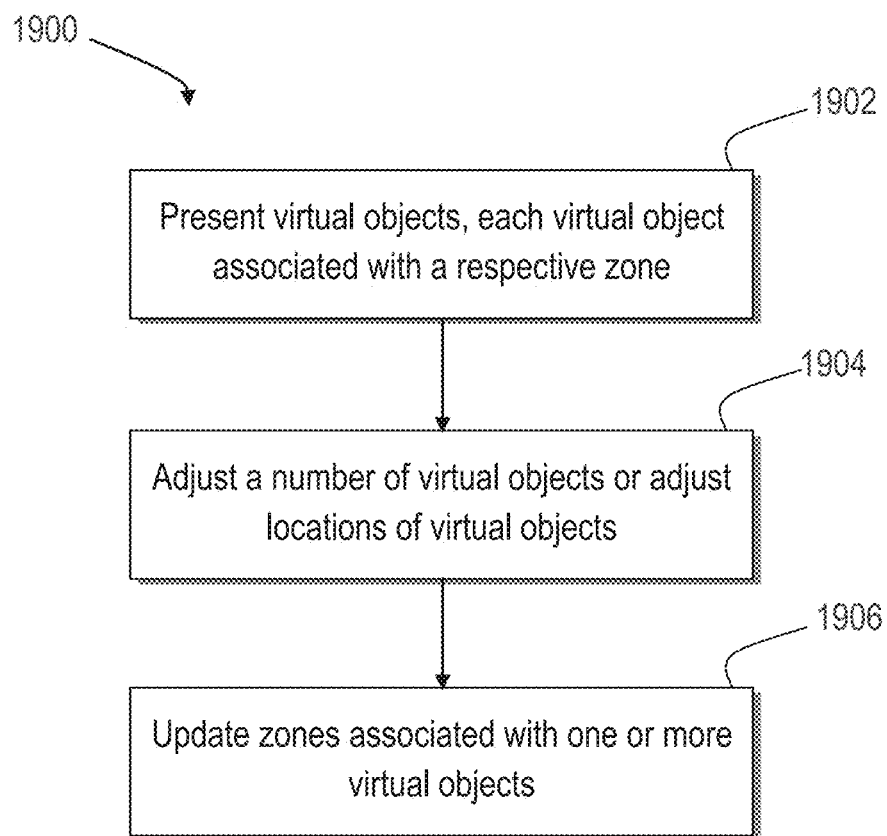
FIG. 19 illustrates a flowchart of another example process to adjust zones based on content-based switching.

FIG. 19 illustrates a flowchart of an example process to adjust zones based on content-based switching. For convenience, the process 1800 will be described as being performed by a wearable system of one or more processors (e.g., the wearable system, such as wearable system 200, described above).

At block 1902, the wearable system presents virtual objects. The wearable system may, as described herein, have zones associated with presented virtual objects. For example, a zone may encompass a volume of space and include a particular virtual object (e.g., a single virtual object). The zones may be any shape or polyhedron, and may extend infinitely in one or more directions in some embodiments. Examples of zones are illustrated in FIGS. 16A-17B.

At block 1904, the wearable system adjusts a number of virtual objects or adjusts locations of the virtual objects. The wearable system may present additional virtual objects, for example at block 1902 5 virtual objects may be presented. At block 1904, 8 virtual objects may be presented. Optionally, the wearable system may update locations of the virtual objects. For example, a virtual object presented in block 1902 may be a bee. The virtual object may thus travel about the user's field of view.

At block 1906, the wearable system updates the zones associated with one or more virtual objects. With respect to the example of additional virtual objects being presented, the virtual objects may become closer together. Since each zone may only be allowed to include a single virtual object, in some embodiments, the increase in the number of virtual objects may require an adjustment to the zones. For example, FIG. 16A illustrates two virtual objects. If additional virtual objects are included, they may be included in a zone in which either of the two virtual objects are also included. Thus, the wearable system may adjust the zones—for example, adjust a volume of space assigned to each zone (e.g., reduce the volume of space). In this way, each zone may include a single virtual object. With respect to the example of virtual objects moving, a moving virtual object may get closer to another virtual object. Thus, the moving virtual object may extend into a zone associated with the other virtual object. Similar to the above, the wearable system may adjust the zones to ensure that each virtual object is included in its own zone.

As an example of updating, the wearable system may associate zones with the virtual objects identified in block 1902. For example, the zones may be similar to the zones 1608A-1608D illustrated in FIG. 16A. The wearable system may adjust the zones to encompass smaller volumes of space. For example, the wearable system may update the zones to be similar to the zones 1702, 1706 illustrated in FIG. 17A.

As another example of updating, the zones may be similar to the zones of FIG. 17A. With respect to FIG. 17A, if the book virtual object 1612 moves closer to the tree virtual object 1610, a zone 1708 surrounding the tree virtual object 1610 may include the book virtual object 1612. Thus, the wearable system may update the zone 1708 to reduce the volume of space it encompasses. For example, the zone 1708 may be adjusted to be zone 1706. As another example, zone 1708 may be adjusted to be closer to zone 1706. As escribed in FIG. 17A, zone 1706 may optionally reflect a minimum zone around the tree virtual object 1610.

Figure 20:
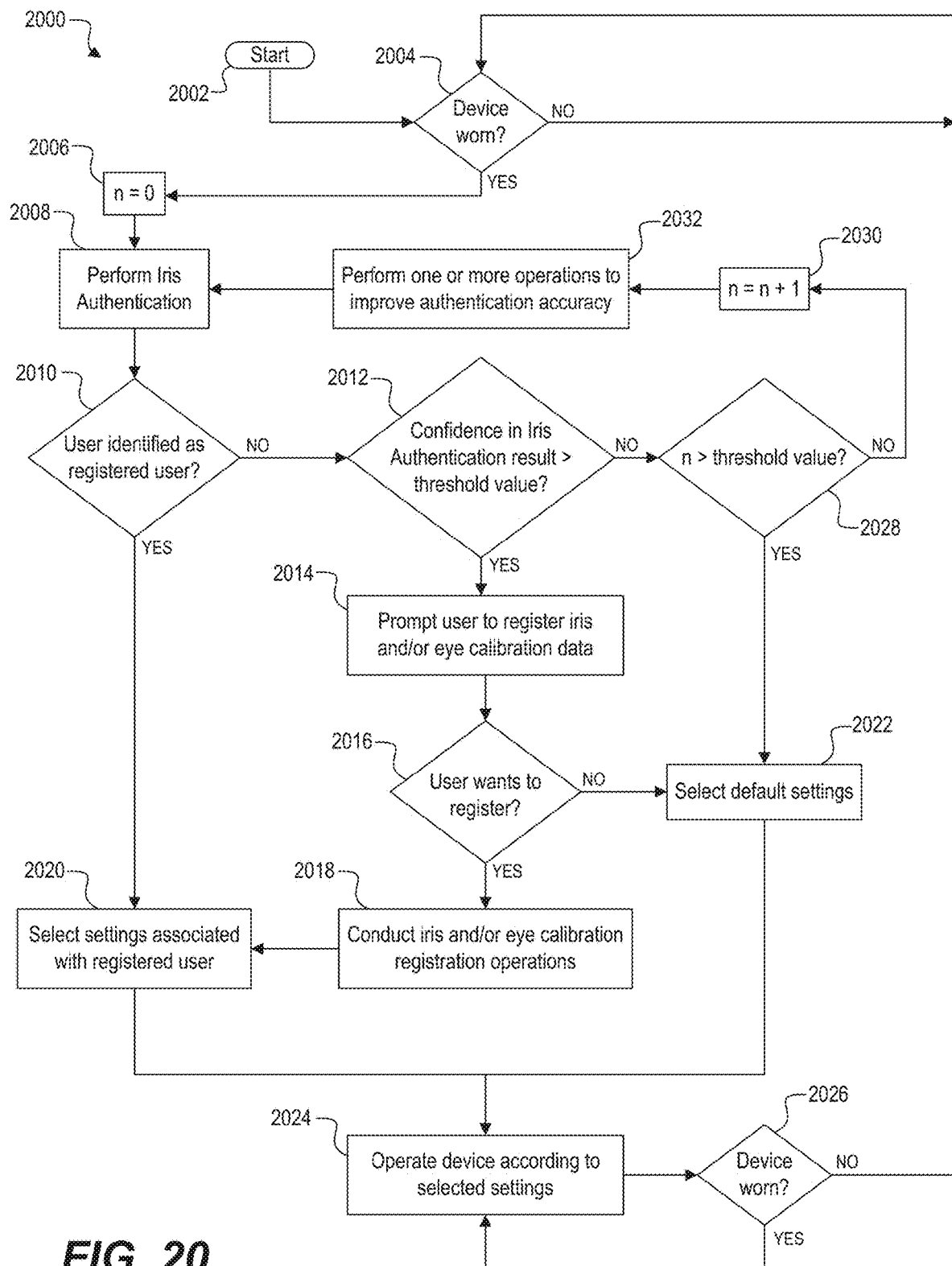
FIG. 20 illustrates a flowchart of an example process for operating a head-mounted display system based on user identity.

FIG. 20 illustrates a flowchart of an example process for operating a head-mounted display system based on user identity. For convenience, the method 2000 will be described as being performed by a wearable system of one or more processors (e.g., the wearable system, such as wearable system 200, described above). In various implementations of the method 2000, the blocks described below can be performed in any suitable order or sequence, and blocks can be combined or rearranged, or other blocks can be added. In some implementations, the method 2000 may be performed by a head-mounted system that includes one or more cameras that are configured to capture images of one or both eyes of a user and one or more processors coupled to the one or more cameras. In at least some of such implementations, some or all of the operations of method 2000 may be performed at least in part by the one or more processors of the system.

At blocks 2002 through 2006 (i.e., blocks 2002, 2004, and 2006), the method 2000 may begin with the wearable system determining whether it is not being worn by a user. The wearable system may determine that it is not being worn using one or more sensors such as eye tracking systems like eye cameras 324. In some embodiments, some or all of the operations associated with block 2004 may be similar to or substantially the same as those associated with one or more of blocks 1402, 1404, 1502, and/or 1504 as described above with reference to FIGS. 14 and 15. In some examples, the method 2000 may remain in a holding pattern until the wearable system determines, at block 2004, that it is being worn by the user. In response to a determination, at block 2004, that the wearable system is being worn by the user, the method 2000 may proceed to block 2008.

At block 2008, the method 2000 may include the wearable system performing one or more iris authentication operations. In some embodiments, some or all of the operations associated with block 2008 may be similar to or substantially the same as those associated with one or more of blocks 1406 and/or 1506 as described above with reference to FIGS. 14 and 15, respectively, for implementations in which iris scanning or authentication is employed. In some examples, one or more of the operations associated with block 2008 may include the wearable system presenting a virtual target to the user (e.g., by way of one or more displays), capturing one or more images of one or both of the user's eyes while the virtual target is being presented to the user (e.g., by way of one or more eye tracking cameras), generating one or more iris codes or tokens based on the one or more images, evaluating the one or more generated iris codes or tokens against a set of one or more predetermined iris codes or tokens that are associated with registered users, and generating an authentication result based the evaluation. In at least some of these examples, an iris of each of one or both of the user's eyes may be shown in some or all of the one or more images. In some implementations, the virtual target may be presented with the intention of catching the user's attention or otherwise guiding the user's eye gaze in a certain direction and/or toward a certain location in three-dimensional space. As such, the virtual target may, for example, include multi-colored and/or animated virtual content, may be presented to the user with along with accompanying audio, haptic feedback, and/or other stimuli, or a combination thereof. In at least some of these implementations, the virtual target may be presented to the user along with one or more prompts instructing or suggesting that the user look at or otherwise fixate on the virtual target. In some embodiments, instead of or in addition to generating and evaluating one or more iris codes or tokens, one or more of the operations associated with block 2008 may include the wearable system may evaluate at least one of the one or more images with one or more reference images to determine whether there is a match, and generating an authentication result based the evaluation. Examples of iris imaging, analysis, recognition, and authentication operations are disclosed in U.S. patent application Ser. No. 15/934,941 filed on Mar. 23, 2018, published on Sep. 27, 2018 as U.S. Publication No. 2018/0276467, U.S. patent application Ser. No. 15/291,929 filed on Oct. 12, 2016, published on Apr. 20, 2017 as U.S. Publication No. 2017/0109580, U.S. patent application Ser. No. 15/408,197 filed on Jan. 17, 2017, published on Jul. 20, 2017 as U.S. Publication No. 2017/0206412, and U.S. patent application Ser. No. 15/155,013 filed on May 14, 2016, published on Dec. 8, 2016 as U.S. Publication No. 2016/0358181, each of which is incorporated by reference herein in its entirety. In some embodiments, at block 2008, the method 2000 may include the wearable system performing one or more of the iris imaging, analysis recognition, and authentication operations described in the aforementioned patent applications. In addition, in some implementations, one or more of the iris imaging, analysis recognition, and authentication operations described in the aforementioned patent applications may be performed in association with one or more other logical blocks of method 2000, such as one or more of blocks 2010, 2012, and 2018 described below. Other configurations are possible.

At block 2010, the method 2000 may include the wearable system determining whether the authentication results (e.g., as obtained through performing one or more iris authentication operations at block 2008) indicate whether the user currently wearing the wearable system is a registered user. In some examples, a registered user may be similar to or substantially the same as a calibrated user (e.g., a user with which a pre-existing calibration profile is associated). In some implementations, at block 2010, the method 2000 may further include the wearable system determining whether a calibration profile exists for the current user of the device. In some embodiments, some or all of the operations associated with block 2004 may be similar to or substantially the same as those associated with one or more of blocks 1406 and/or 1506 as described above with reference to FIGS. 14 and 15, respectively.

In response to the wearable system determining, at block 2010, that the user currently wearing the wearable system is indeed a registered user, the method 2000 may proceed to block 2020. At block 2020, the method 2000 may include the wearable system selecting settings associated with the registered user. In some embodiments, some or all of the operations associated with block 2020 may be similar to or substantially the same as those associated with one or more of blocks 1408 and/or 1514 as described above with reference to FIGS. 14 and 15, respectively.

On the other hand, the method 2000 may proceed from block 2010 to block 2012 in response to the wearable system (i) determining, at block 2010, that the user currently wearing the wearable system is not a registered user or (ii) failing to determine, at block 2010, that the user currently wearing the wearable system is a registered user. At block 2012, the method 2000 may include the wearable system determining whether a confidence value associated with the authentication results exceeds a predetermined threshold value. In some embodiments, at block 2012, the method 2000 may include the wearable system generating or otherwise obtaining a confidence value associated with the authentication results, and comparing the confidence value against a predetermined threshold value. In some implementations, the confidence value obtained at block 2012 may indicate of a level of confidence that the user currently wearing the wearable system is not a registered user. In some examples, the confidence value may be determined based at least in part on whether or not any iris codes or tokens were successfully generated or otherwise extracted at block 2008. A variety of different factors and environmental conditions may impact the wearable system's ability to successfully generate or otherwise extract one or more iris codes or tokens at block 2008. Examples of such factors and conditions may include the fit or registration of the wearable system relative to the current user, the position and/or orientation of the iris of each of one or both of the user's eyes relative to the position and/or orientation of the one or more cameras at the time the one or more images were captured, lighting conditions, or a combination thereof. As such, it follows that such factors and conditions may also impact the degree of confidence with which the wearable system may able to determine that the current user is not a registered user.

In response to the wearable system determining, at block 2012, that the confidence value associated with the authentication results does indeed exceed the predetermined threshold value, the method 2000 may proceed to block 2014. In some examples, such a determination at block 2012 may indicate that the wearable system has determined that the user currently wearing the wearable system is not a registered user with a relatively high degree of confidence. At block 2014, the method 2000 may include the wearable system presenting a prompt to the user (e.g., by way of one or more displays) suggesting that the user enroll in iris authentication and/or participate in one or more eye calibration procedures for generating a calibration profile for the user. In some embodiments, such a prompt may request that the user indicate whether they agreed to proceed with the suggested registration procedures. At block 2016, the method 2000 may include the wearable system receiving user input responsive to the prompt and determining whether the received user input indicates that the user has agreed to proceed with the suggested registration procedures. In some examples, at block 2016, the method 2000 may monitor received user input(s) and/or pause until the wearable system receives user input responsive to the prompt indicating whether the user has agreed to proceed with the suggested registration procedures.

In response to the wearable system determining, at block 2016, that the user input received responsive to the prompt indicates that the user has indeed agreed to proceed with some or all of the suggested registration procedures, the method 2000 may proceed to block 2018. At block 2018, the method 2000 may include the wearable system conducting some or all of the suggested registration procedures in accordance with the user input received responsive to the prompt. In some embodiments, conducting such registration procedures may include the wearable system performing one or more operations associated with iris authentication enrollment and/or eye calibration. As described in further detail below, in some embodiments, such registration procedures associated with block 2018 may include one or more procedures for generating an eye tracking calibration profile for the current user, one or more operations for enrolling the current user in iris authentication, a combination thereof. Upon successful completion of the registration procedures associated with block 2018, the method 2000 may proceed to block 2020.

On the other hand, the method 2000 may proceed from block 2016 to block 2022 in response to the wearable system (i) determining, at block 2016, that the user input received responsive to the prompt indicates that the user has not agreed to proceed with some or all of the suggested registration procedures or (ii) failing to determine, at block 2016, that the user input received responsive to the prompt indicates that the user has agreed to proceed with some or all of the suggested registration procedures. At block 2022, the method 2000 may include the wearable system selecting default settings. In some embodiments, some or all of the operations associated with block 2022 may be similar to or substantially the same as those associated with one or more of blocks 1410, 1412, 1508-1512, 1516, and/or 1518 as described above with reference to FIGS. 14 and 15.

In response to the wearable system determining, at block 2012, that the confidence value associated with the authentication results does not exceed the predetermined threshold value, the method 2000 may proceed to from block 2012 to block 2028. In some examples, such a determination at block 2012 may indicate that the wearable system has relatively little confidence in its determination that the user currently wearing the wearable system is not a registered user. At block 2028, the method 2000 may include the wearable system determining whether it has attempted to authenticate the current user (e.g., by performing one or more iris authentication operations at block 2008) more than a predetermined threshold quantity of times. In response to the wearable system determining, at block 2028, that it has indeed attempted to authenticate the current user more than the predetermined threshold quantity of times, the method 2000 may proceed to block 2022.

In response to the wearable system determining, at block 2028, that it has not yet attempted to authenticate the current user more than the predetermined threshold quantity of times, the method 2000 may proceed to blocks 2030 through 2032. At block 2032, the method 2000 may include the wearable system performing one or more operations to attempt to improve the accuracy and/or reliability of the one or more iris authentication operations performed in connection with block 2008, so as to enable determinations regarding the user's identity to be made with an increased degree of confidence. As mentioned above, a variety of different factors and environmental conditions may impact the wearable system's ability to successfully generate or otherwise extract one or more iris codes or tokens. Through performing the one or more operations associated with block 2032, the wearable system may attempt to counteract or otherwise compensate for one or more such factors and conditions. As such, at block 2032, the method 2000 may include the wearable system performing one or more operations so as to increase the likelihood of successfully generating or otherwise extracting iris codes or tokens from images of one or both of the user's eyes. In some implementations, at block 2032, the method 2000 may include the wearable system performing one or more fit- or registration-related operations, one or more operations for changing the position of the virtual target subsequently presented at block 2008, one or more operations for determining whether or not the user's eyes are visible, or a combination thereof.

In some embodiments, such one or more fit- or registration-related operations may correspond to one or more of those described above with reference to registration observer 620 and/or block 1170 of FIG. 11. That is, in these embodiments, the wearable system may perform one or more operations to evaluate and/or attempt to improve the fit or registration of the wearable system relative to the user. To do so, the wearable system may provide the user with feedback and/or suggestions for adjusting the fit, positioning, and/or configuration (e.g., nose pads, head pads, etc.) of the wearable system. Additional examples of fit- and registration-related operations are disclosed in U.S. Provisional Application No. 62/644,321 filed on Mar. 16, 2018, U.S. application Ser. No. 16/251,017 filed on Jan. 17, 2019, U.S. Provisional Application No. 62/702,866 filed on Jul. 24, 2018, and International Patent Application No. PCT/US2019/043096 filed on Jul. 23, 2019, each of which is incorporated by reference herein in its entirety. In some embodiments, at block 2032, the method 2000 may include the wearable system performing one or more of the iris fit- and registration-related operations described in the aforementioned patent applications. Other configurations are possible.

As mentioned above, in some implementations, the method 2000 may include the wearable system performing one or more operations for changing the position of the virtual target subsequently presented at block 2008. In these examples, the method 2000 may proceed from block 2032 to block 2008 and, in performing one or more iris authentication operations in connection with block 2008, presenting the virtual target for the user at one or more locations different from the location at which the virtual target was presented to the user in a previous iteration of method 2000. In some examples, the virtual target may be presented to the user in a manner so as to increase the chances of capturing head-on images of the iris of each of one or both of the user's eyes. That is, in such examples, the virtual target may be presented to the user at one or more locations in three-dimensional space that, in order for the user to look at and/or continue to fixate on, may require the user to reorient one or both of their eyes toward the one or more cameras. In some embodiments, one or more other characteristics of the virtual target (e.g., size, shape, color, etc.) may be altered. As also mentioned above, in some implementations, at block 2032, the method 2000 may include the wearable system performing one or more operations for determining whether or not the user's eyes are visible. In some such implementations, the method 2000 may proceed to block 2022 in response to the wearable system (i) determining, at block 2032, that the user's eyes are not visible or (ii) failing to determine, at block 2032, that the user's eyes are visible.

Upon reaching and performing the operations associated with block 2020 or block 2022, the method 2000 may proceed to block 2024. At block 2024, the method 2000 may include the wearable system operating according to the settings selected at block 2020 or block 2022. In some embodiments, some or all of the operations associated with block 2024 may be similar to or substantially the same as those associated with one or more of blocks 1414 and/or 1520 as described above with reference to FIGS. 14 and 15, respectively. In some implementations, in transitioning from block 2020 or block 2022 to block 2024, the method 2000 may include the wearable system entering an "unlocked" state or otherwise granting the current user access to certain features. At block 2026, the method 2000 may include the wearable system determining whether it is not being worn by a user. In some embodiments, some or all of the operations associated with block 2004 may be similar to or substantially the same as those associated with one or more of blocks 1402, 1404, 1502, 1504, and/or 2004 as described above with reference to FIGS. 14, 15, and 20.

In response to a determination, at block 2026, that the wearable system is being worn by the user, the method 2000 may proceed to block 2024. That is, upon reaching blocks 2024-2026, the wearable system may continue to operate according to the settings selected at block 2020 or block 2022 until the wearable system determines, at block 2026, that it is no longer being worn by the user. In response to a determination, at block 2026, that the wearable system is no longer being worn by the user, the method 2000 may transition back to block 2004. In some implementations, in transitioning from block 2026 to block 2004, the method 2000 may include the wearable system entering a "locked" state or otherwise restricting access to certain features. In some embodiments, in transitioning from block 2026 to block 2004, the method 2000 may include the wearable system suspend or discontinue performance of one or more of the operations described above with reference to 2024.

As mentioned above, in some embodiments, at block 2018, the method 2000 may include the wearable system conducting registration procedures, which may include performing one or more operations for generating an eye tracking calibration profile for the current user, one or more operations for enrolling the current user in iris authentication, a combination thereof. In some implementations, at block 2018, the method 2000 may include the wearable system performing a calibration for the current user or otherwise performing one or more operations for generating an eye tracking calibration profile for the current user. The calibration may include various processes and may include determining how the user's eyes move as the user focuses on objects at different locations and depths. In some embodiments, the wearable system may be configured to monitor the gaze of a user's eyes and determine a three dimensional fixation point at which the user is fixating. The fixation point may be determined based upon, among other things, the distance between the user's eyes and the gaze direction of each eye. It will be appreciated that these variables may be understood to form a triangle with the fixation point at one corner of the triangle and the eyes at the other corners. It will also be appreciated that a calibration may be performed to accurately track the orientations of the user's eyes and determine or estimate the gaze of those eyes to determine the fixation point. The calibration may also include identifying the IPD of the user (e.g., the distance between the user's pupils when the user is focused on optical infinity). The calibration may also include determining the user's pupil distance when the user is focused at objects closer than optical infinity, such as an object in the near field (e.g., less than 2.0 meters) and objects in an intermediate field (e.g., between about 2.0 and 3.0 meters). Based on such calibration data, the wearable system may be able to determine the depth the user is looking at by monitoring the pupil distance of the user. In other words, when the user's pupil distance is at its maximum (e.g., is equal to or close to the user's IPD), the wearable system may be able to infer that the user's vergence distance is at or near optical infinity. In contrast, when the user's pupil distance is near its minimum, the wearable system may be able to infer that the user's vergence distance is close to the user, at a distance determined by the calibration. Thus, after undergoing a full calibration, the wearable system may store a calibration file and/or calibration information for the current user. Further details regarding calibration and eye tracking may be found in U.S. patent application Ser. No. 15/993,371 filed on May 30, 2018, published on Dec. 6, 2018, as U.S. Publication No. 2018/0348861, U.S. Provisional Application No. 62/714,649 filed on Aug. 3, 2018, U.S. Provisional Application No. 62/875,474 filed on Jul. 17, 2019, and U.S. application Ser. No. 16/530,904 filed on Aug. 2, 2019, each of which is incorporated by reference herein in its entirety. In some embodiments, at block 2018, the method 2000 may include the wearable system performing one or more of the calibration and eye tracking operations described in the aforementioned patent applications. Other configurations are possible.

In some implementations, at block 2018, the method 2000 may include the wearable system performing one or more operations for enrolling the current user in iris authentication. In some examples, such operations may include the wearable system presenting a virtual target to the user (e.g., by way of one or more displays), capturing one or more images of one or both of the user's eyes while the virtual target is being presented to the user (e.g., by way of one or more eye tracking cameras), generating a representation of an iris of each of one or both of the user's eyes (e.g., one or more iris codes or tokens) based on the one or more images, and storing the generated representation(s). In some implementations, instead of or in addition to generating and storing a representation of an iris of each of one or both of the user's eyes (e.g., one or more iris codes or tokens), such operations may include storing at least one of the one or more images as a reference or template image. In some implementations, the wearable system may perform one or more of the operations associated with block 2032 when performing one or more operations for enrolling the current user in iris authentication, such as one or more of those associated with block 2018, so as to increase the likelihood of successfully generating or otherwise extracting iris codes or tokens from images of one or both of the user's eyes. In some embodiments, the wearable system may perform one or more such operations for enrolling the current user in iris authentication concurrently with the aforementioned calibration procedure for the current user. In other embodiments, the wearable system may perform one or more such operations for enrolling the current user in iris authentication and the aforementioned calibration procedure for the current user at separate times.

In some examples, at block 2018, the method 2000 may include the wearable system storing the calibration file or calibration information and the generated representation(s) (e.g., one or more iris codes or tokens) in association with one another. In some embodiments, instead of or in addition to storing the calibration file or calibration information and the generated representation(s) in association with one another, at block 2018, the method 2000 may include the wearable system storing the calibration file or calibration information and at least one of the one or more images in association with one another. In some embodiments, some or all of the operations associated with block 2018 may be performed independent from the method 2000. For example, the wearable system may perform one or more operations for enrolling a user in iris authentication and/or one or more operations associated for performing a calibration for a user at the request of the user or when the wearable system is initially turned on or set up.

In some embodiments, in response to the wearable system determining, at block 2012, that the confidence value associated with the authentication results does not exceed the predetermined threshold value, the method 2000 may proceed to from block 2012 to one or more logical blocks other than block 2028. For example, in these embodiments, in response to the wearable system determining, at block 2012, that the confidence value associated with the authentication results does not exceed the predetermined threshold value, the wearable system may present the current user with one or more alternative authentication options. For instance, the wearable system may provide the current user with the option to verify their identity by providing a pin, password, and/or other credentials as input to the wearable system. In some of these embodiments, the method 2000 may proceed to block 2020 upon successfully identifying the current user as a registered user using one or more of the aforementioned alternative authentication options. Similarly, in some of these embodiments, the method 2000 may proceed to block 2016 upon failing to successfully identify the current user as a registered user using one or more of the aforementioned alternative authentication options. At such a juncture, the method 2000 may either proceed to block 2022 or proceed to one or more logical blocks similar to block 2018 in which the wearable system conducts one or more operations for registering the current user.

In some examples, such one or more operations for registering the current user may include one or more procedures for generating an eye tracking calibration profile for the current user, one or more operations for enrolling the current user in iris authentication, one or more operations for enrolling the current user in one or more of the aforementioned alternative authentication options, or a combination thereof. In some embodiments, at block 2018, the method 2000 may further include the wearable system performing one or more operations for enrolling the current user in one or more of the aforementioned alternative authentication options. In these embodiments, information generated or otherwise obtained by the wearable system in connection with performing one or more operations for enrolling the current user in one or more of the aforementioned alternative authentication options may be In these embodiments, at block 2018, the method 2000 may include the wearable system storing information generated or otherwise obtained by the wearable system in connection with performing one or more operations for enrolling the current user in one or more of the aforementioned alternative authentication options in association with calibration files or information for the current user, one or more iris representations (e.g., iris codes or tokens) generated for the current user, one or more images of one or both of the user's eyes, or a combination thereof. Additional information, such as that which is manually supplied by the user at block 2018 (e.g., name, email address, interests, user preferences, etc.), may also be stored in association with one or more of the aforementioned pieces of information. Other configurations are possible.

Computer Vision to Detect Objects in Ambient Environment

As discussed above, the display system may be configured to detect objects in or properties of the environment surrounding the user. The detection may be accomplished using a variety of techniques, including various environmental sensors (e.g., cameras, audio sensors, temperature sensors, etc.), as discussed herein.

In some embodiments, objects present in the environment may be detected using computer vision techniques. For example, as disclosed herein, the display system's forward-facing camera may be configured to image the ambient environment and the display system may be configured to perform image analysis on the images to determine the presence of objects in the ambient environment. The display system may analyze the images acquired by the outward-facing imaging system to perform scene reconstruction, event detection, video tracking, object recognition, object pose estimation, learning, indexing, motion estimation, or image restoration, etc. As other examples, the display system may be configured to perform face and/or eye recognition to determine the presence and location of faces and/or human eyes in the user's field of view. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more of these computer vision techniques may also be used together with data acquired from other environmental sensors (such as, e.g., microphone) to detect and determine various properties of the objects detected by the sensors.

As discussed herein, the objects in the ambient environment may be detected based on one or more criteria. When the display system detects the presence or absence of the criteria in the ambient environment using a computer vision algorithm or using data received from one or more sensor assemblies (which may or may not be part of the display system), the display system may then signal the presence of the object.

Machine Learning

A variety of machine learning algorithms may be used to learn to identify the presence of objects in the ambient environment. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using pre-defined thresholds or data values.

The criteria for detecting an object may include one or more threshold conditions. If the analysis of the data acquired by the environmental sensor indicates that a threshold condition is passed, the display system may provide a signal indicating the detection the presence of the object in the ambient environment. The threshold condition may involve a quantitative and/or qualitative measure. For example, the threshold condition may include a score or a percentage associated with the likelihood of the reflection and/or object being present in the environment. The display system may compare the score calculated from the environmental sensor's data with the threshold score. If the score is higher than the threshold level, the display system may detect the presence of the reflection and/or object. In some other embodiments, the display system may signal the presence of the object in the environment if the score is lower than the threshold. In some embodiments, the threshold condition may be determined based on the user's emotional state and/or the user's interactions with the ambient environment.

In some embodiments, the threshold conditions, the machine learning algorithms, or the computer vision algorithms may be specialized for a specific context. For example, in a diagnostic context, the computer vision algorithm may be specialized to detect certain responses to the stimulus. As another example, the display system may execute facial recognition algorithms and/or event tracing algorithms to sense the user's reaction to a stimulus, as discussed herein.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:
1. A wearable system comprising:
   a display configured to present virtual image content to an eye of a user;

a camera configured to capture an image of the eye of the user; and one or more processors configured to:

capture, via the camera, the image of the eye of the user;

determine, based on the captured image, whether the user is a registered user; and present the virtual image content, via the display, to the eye of the user, wherein:

said presenting the virtual image content comprises presenting image light to the eye of the user, the image light having an amount of wavefront divergence corresponding to a depth plane at a distance from the user, the amount of wavefront divergence is determined based at least in part on an identity of the user, and in accordance with a determination that the user is not a registered user, the amount of wavefront divergence is determined based at least in part on default settings.

2. The wearable system of claim 1, wherein said determining whether the user is a registered user comprises performing one or more of an iris scanning operation and an iris authentication operation.

3. The wearable system of claim 1, wherein said determining whether the user is a registered user comprises determining the identity of the user.

4. The wearable system of claim 1, wherein:

in accordance with a determination that the user is a registered user, the amount of wavefront divergence is determined based at least in part on settings associated with the registered user.

5. The wearable system of claim 1, wherein the one or more processors are further configured to:

in accordance with the determination that the user is not a registered user:

perform one or more of registering the user via iris authentication and generating a calibration profile for the user;

determine settings for the user based at least in part on information obtained via the one or more of said registering the user and said generating the calibration profile; and determine the amount of wavefront divergence based at least in part on the settings determined for the user.

6. The wearable system of claim 1, wherein the one or more processors are further configured to:

present, via the display, a virtual target to the user, concurrently with said capturing the image of the eye via the camera.

7. The wearable system of claim 1, wherein the one or more processors are further configured to:

capture, via the camera, a second image of the eye of the user, wherein whether the user is a registered user is determined further based on the second image.

8. A method comprising:

capturing, via a camera of a wearable system, an image of an eye of a user;

determining, based on the captured image, whether the user is a registered user; and presenting virtual image content, via a display of the wearable system, to the eye of the user, wherein:

said presenting the virtual image content comprises presenting image light to the eye of the user, the image light having an amount of wavefront divergence corresponding to a depth plane at a distance from the user, the amount of wavefront divergence is determined based at least in part on an identity of the user, and in accordance with a determination that the user is not a registered user, the amount of wavefront divergence is determined based at least in part on default settings.

9. The method of claim 8, wherein said determining whether the user is a registered user comprises performing one or more of an iris scanning operation and an iris authentication operation.

10. The method of claim 8, wherein said determining whether the user is a registered user comprises determining the identity of the user.

11. The method of claim 8, wherein:

in accordance with a determination that the user is a registered user, the amount of wavefront divergence is determined based at least in part on settings associated with the registered user.

12. The method of claim 8, further comprising:

in accordance with the determination that the user is not a registered user:

performing one or more of registering the user via iris authentication and generating a calibration profile for the user;

determining settings for the user based at least in part on information obtained via the one or more of said registering the user and said generating the calibration profile; and determining the amount of wavefront divergence based at least in part on the settings determined for the user.

13. The method of claim 8, further comprising:

presenting, via the display, a virtual target to the user, concurrently with said capturing the image of the eye via the camera.

14. The method of claim 8, further comprising:

capturing, via the camera, a second image of the eye of the user, wherein whether the user is a registered user is determined further based on the second image.

15. A non-transitory computer-readable medium storing instructions that, when executed by one or more processors of a wearable system, cause the one or more processors to perform a method comprising:

capturing, via a camera of the wearable system, an image of an eye of a user;

determining, based on the captured image, whether the user is a registered user; and presenting virtual image content, via a display of the wearable system, to the eye of the user, wherein:

said presenting the virtual image content comprises presenting image light to the eye of the user, the image light having an amount of wavefront divergence corresponding to a depth plane at a distance from the user, the amount of wavefront divergence is determined based at least in part on an identity of the user, and in accordance with a determination that the user is not a registered user, the amount of wavefront divergence is determined based at least in part on default settings.

16. The non-transitory computer-readable medium of claim 15, wherein said determining whether the user is a registered user comprises performing one or more of an iris scanning operation and an iris authentication operation.

17. The non-transitory computer-readable medium of claim 15, wherein said determining whether the user is a registered user comprises determining the identity of the user.

18. The non-transitory computer-readable medium of claim 15, wherein the method further comprises:
in accordance with the determination that the user is not a registered user:
performing one or more of registering the user via iris authentication and generating a calibration profile for the user;
determining settings for the user based at least in part on information obtained via the one or more of said registering the user and said generating the calibration profile; and
determining the amount of wavefront divergence based at least in part on the settings determined for the user.

19. The non-transitory computer-readable medium of claim 15, wherein the method further comprises:
presenting, via the display, a virtual target to the user, concurrently with capturing the image of the eye via the camera.

20. The non-transitory computer-readable medium of claim 15, wherein the method further comprises:
capturing, via the camera, a second image of the eye of the user,
wherein whether the user is a registered user is determined further based on the second image.

* * * * *